(12) United States Patent
Kitamura et al.

(10) Patent No.: US 8,014,521 B2
(45) Date of Patent: Sep. 6, 2011

(54) CRYPTOGRAPHIC COMPUTATION METHOD, CRYPTOGRAPHIC SYSTEM, AND COMPUTER PROGRAM

(75) Inventors: Izuru Kitamura, Kanagawa (JP);
Masanobu Katagi, Kanagawa (JP);
Tsuyoshi Takagi, Hokkaido (JP)

(73) Assignee: Sony Corporation, Tokyo (JP)

( * ) Notice: Subject to any disclaimer, the term of this patent is extended or adjusted under 35 U.S.C. 154(b) by 1041 days.

(21) Appl. No.: 11/576,305

(22) PCT Filed: Sep. 26, 2005

(86) PCT No.: PCT/JP2005/017650
§ 371 (c)(1),
(2), (4) Date: Apr. 30, 2007

(87) PCT Pub. No.: WO2006/035732
PCT Pub. Date: Apr. 6, 2006

(65) Prior Publication Data
US 2008/0095357 A1    Apr. 24, 2008

(30) Foreign Application Priority Data

Sep. 30, 2004 (JP) .................. P2004-287166
Jan. 24, 2005 (JP) .................. P2005-015071
Apr. 18, 2005 (JP) .................. P2005-119587

(51) Int. Cl.
*H04L 9/28* (2006.01)
(52) U.S. Cl. .......................... 380/30; 380/28
(58) Field of Classification Search .............. 380/28, 380/30; 708/490–492
See application file for complete search history.

(56) References Cited

U.S. PATENT DOCUMENTS

| | | | | |
|---|---|---|---|---|
| 6,377,969 | B1 * | 4/2002 | Orlando et al. | 708/492 |
| 7,003,537 | B1 * | 2/2006 | Tamura | 708/492 |
| 7,079,650 | B1 | 7/2006 | Knudsen | |
| 7,634,087 | B2 * | 12/2009 | Boneh et al. | 380/28 |
| 2004/0039768 | A1 * | 2/2004 | Arita | 708/492 |
| 2006/0140398 | A1 * | 6/2006 | Avanzi | 380/30 |

FOREIGN PATENT DOCUMENTS

JP    2000206879    7/2000

(Continued)

OTHER PUBLICATIONS

N. Koblitz. "Hyperelliptic Curve Cryptosystems" J. Cryptology, vol. 1, No. 3, p. 139-150, 1989—NOTE: provided in IDS.*

(Continued)

*Primary Examiner* — Jeffrey D Popham
*Assistant Examiner* — Sunita Reddy
(74) *Attorney, Agent, or Firm* — K&L Gates LLP

(57) ABSTRACT

A system and method for achieving secure and fast computation in hyperelliptic cryptography is realized. Fast scalar multiplication is achieve by executing computing operations including halving as computing processing in scalar multiplication with respect to a divisor D in hyperelliptic curve cryptography. For example, computing operations including halving are executed in scalar multiplication with respect to a divisor D on a hyperelliptic curve of genus 2 in characteristic 2 having $h(x)=x^2+x+h_0$, $f_4=0$ as parameters, a hyperelliptic curve of genus 2 in characteristic 2 having $h(x)=x^2+h_1x+h_0$, $f_4=0$ as parameters, or a hyperelliptic curve of genus 2 in characteristic 2 having $h(x)=x$ as a parameter. Further, reduced complexity and faster computation are realized through the application of a table that records which of $k_1$, $k_1'$, $(k_0, k_0')$ is correct on the basis of a computed value of $[\frac{1}{2}^iD]$ with respect to a fixed divisor D, and through a reduction in the number of inversion operations.

19 Claims, 8 Drawing Sheets

FOREIGN PATENT DOCUMENTS

| | | |
|---|---|---|
| JP | 2003-504695 | 2/2003 |
| JP | 2003-216028 | 7/2003 |
| JP | 2003216028 | 7/2003 |
| JP | 2004-205868 | 7/2004 |
| JP | 2004-205869 | 7/2004 |
| JP | 2004-205870 | 7/2004 |
| JP | 2004205869 | 7/2004 |
| JP | 2004205870 | 7/2004 |
| WO | 01/04742 A1 | 1/2001 |
| WO | 01/34473 A1 | 5/2001 |
| WO | 0135573 | 5/2001 |

OTHER PUBLICATIONS

Inversion operation-free arithmetic on genus 2 hyperelliptic curves. Cryptology eprint Archive, 2002/147, IACR, 2002—NOTE: provided in IDS.*

Efficient Arithmetic on Genus 2 Hyperelliptic Curves over Finite Fields via Explicit Formulae, Dec. 15, 2003. NOTE: provided in IDS.*

International Search Report and International Search Opinion dated Dec. 20, 2005 from the Japanese Patent Office.

Written Opinion corresponding to International Application No. PCT/JP2005/017650 filed on Sep. 26, 2005.

N. Koblitz. "Hyperelliptic Curve Cryptosystems." J. Cryptology, vol. 1, No. 3, pp. 139-150, 1989.

D.G. Cantor. "Computing in the Jacobian of Hyperelliptic Curve." Math. Comp., vol. 48, No. 177, pp. 95-101, 1987.

D. Mumford. "Tata Lectures on Theta II." Progress in Mathematics, No. 43, Birkhauser, 1984.

K. Matsuo, J. Chao and S. Tsujii. "Fast Genus Two Hyperelliptic Curve Cryptosystems." Technical Report ISEC2001-31, IEICE Japan, 2001.

M. Takahashi. "Improving Harley Algorighms for Jacobians of Genus2 Hyperelliptic Curves." SCIS2002.

T. Lange. "Inversion-free Arithmetic on Genus2 Hyperelliptic Curves." Cryptology ePrint Archive, 2002/147, IACR, 2002.

T. Sugizaki, K. Matsuo, J. Chao and S. Tsujii. "An Extension of Harley Addition Algorithm for Hyperelliptic Curves Over Finite Fields of Characteristic Two." ISEC2002-9, IEICE, 2001.

T. Lange. "Efficient Arithmetic on Genus2 Hyperelliptic Curves Over Finite Fields Via Explicit Formulae." Cryptology ePrint Archive, 2002/121, IACR, 2002.

J. Kuroki, M. Gonda. K. Masuo. J. Chao and S. Tsujii. Fast Genus Three Hyperelliptic Curve Cryptosystems. SCIS2002.

J. Pelzl, T. Wollinger, J. Guajardo and C. Paar. "Hyperelliptic Curve Cryptosystems: Closing the Performance Gap to Elliptic Curves." CryptologyePrint Archive, 2003/026, IACR, 2003.

Y. Miyamoto, H. Doi, K. Matsuo, J. Chao and S. Tsujii. "A Fast Addit Ion Algorithm of Genus Two Hyperelliptic Curves." SCIS2002.

N. Takahashi, H. Morimoto and A. Miyaji. "Efficient Exponentiationon Genus Two Hyperelliptic Curves (ii)." ISEC2002-145, IEICE, 2003.

T. Lange. "Weighed Coordinate on Genus2 Hyperellipitc Curve." Cryptology ePrint Archive, 2002/153, IACR, 2002.

K. Nagao. "Improving Group Law Algorithms for Jacobians of Hyperelliptic Curves." ANTS-IV, LNCS 1838, pp. 439-448, Springer-Verlag, 2000.

E. Knudsen. "Elliptic Scalar Multiplication Using Point Halving." ASIACRYPTO '99, LNCS 1716, pp. 135-149, Springer-Verlag, 1999.

J. Pelzl, T. Wollinger, J. Guajardo and C. Paar. Hyperelliptic Curve Cryptosystems: Closing the Performance Gap to Elliptic Curves. CryptologyePrint Archive, 2003/026, IACR, 2003.

K. Fong, D. Hankerson, J. Lopez and A. Menezes. "Field Inversion and Point Halving Revised." Technical Report CORR2003-18, http://www.cacr.math.uwaterloo.ca/techreports/2003/corr2003.

S. Dquesne. "Montgomery Scalar Multiplication for Genus2 Curves." ANTS-VI, LNCS 3076, pp. 153-168, 2004.

T. Lange. "Montgomery Addition for Genus Two Curves." ANTS-VI, LNCS 3076, pp. 309-317, 2004.

T. Lange. "Efficient Doubling on Genus Two Curves Over Binary Fields." SAC 2004, pre-proceedings, pp. 189-202, 2004.

Japanese Office Action issued on Feb. 8, 2011, for corresponding Japanese Appln. No. 2005-119587.

* cited by examiner

CRYPTOGRAPHIC COMPUTATION METHOD, CRYPTOGRAPHIC SYSTEM, AND COMPUTER PROGRAM

CROSS REFERENCE TO RELATED APPLICATIONS

The present application claims priority to Japanese Patent Document Nos. P2004-287166 filed on Sep. 30, 2004, P2005-015071 filed on Jan. 24, 2005, and P2005-119587 filed on Apr. 18, 2005, the contents of which are herein incorporated by reference.

TECHNICAL FIELD

The present invention relates to a cryptographic computation method, a cryptographic system, and a computer program. More particularly, the present invention relates to a cryptographic computation method, a cryptographic system, and a computer program, which realize faster scalar multiplication in hyperelliptic curve cryptography.

BACKGROUND ART

With the recent advances in network communication and electronic business transaction, it is becoming increasingly important to ensure the security of communications. One of the methods used to ensure security is cryptography. At present, communications are carried out by using a variety of cryptographic techniques.

For example, there has been put into practical use a system in which a cryptographic module is embedded in a small device such as an IC card, and data transmission/reception is performed between the IC card and a reader/writer as a data reading/writing device, thereby carrying out authentication processing, or encryption/decryption of the transmitted/received data.

IC cards executing cryptographic processing, for example, are widely used in a variety of gates such as the entrance gate of a train station or in shopping centers, and the demands for smaller size and faster processing speed are becoming increasingly stringent.

Cryptographic schemes are roughly divided into a common key scheme and a public key scheme. The common-key scheme is also referred to as symmetric cryptography. In the common key scheme, the sender and the recipient both own a common key. A typical application of the common key scheme is DES (Data Encryption Standard). The characteristic feature of a DES algorithm is that both encryption and decryption can be executed using substantially the same algorithm.

A scheme adopting a configuration in which, as opposed to the above-mentioned common key scheme, the key owned by the sender and that owned by the recipient are different is the public key scheme or asymmetric cryptography. Unlike common key cryptography in which a common key is used for encryption and decryption, public-key cryptography proves advantageous in terms of key management because only one specific person needs to own a secret key that must be kept in secret. In comparison to common key cryptography, however, public key cryptography involves lower data processing speed. As such, in general, the public key cryptography is frequently used for the distribution of secret keys, digital signatures, or other such applications involving low data volume. Typical known examples of public key cryptography includes RSA (Rivest-Shamir-Adleman) cryptography and ECC (Elliptic Curve Cryptography).

Elliptic curve cryptography uses an elliptic curve $y^2=x^3+ax+b$ (where $4a^3+27b^2\neq 0$) over a prime field, an elliptic curve $y^2+xy=x^3+ax^2+b$ (where $b\neq 0$) over two extension fields, or the like. A set including an infinity point (O) added to a point on each of these curves forms a finite group for the addition, and the infinity point O becomes the unit element thereof. In the following description, the addition of points in the finite group is represented by the operator +. The addition P+Q of two different points P, Q in the finite group is referred to as the "point addition", and the addition P+P=2P of two points P in the finite group is referred to as the "point doubling". An operation of adding the point P to itself k times, that is, an operation of finding a point P+P+ . . . +P=kP, is referred to as the "scalar multiplication of a point".

As is commonly known, the scalar multiplication of a point can be computed with point addition and point doubling. The addition of points, the doubling of a point, and the scalar multiplication of a point in affine coordinates (x, y) or projective coordinates (X, Y, Z) on an elliptic curve over the prime field and an elliptic curve over two extension fields are described in IEEE P1363/D13 Standard Specifications for Public Key Cryptography.

An example of a scheme in which elliptic curve cryptography is generalized is HECC (Hyper-Elliptic Curve Cryptography) system proposed by Koblitz and Cantor. The hyperelliptic curve cryptography is described in Non-Patent Documents 1 and 2.

In elliptic curve cryptography, if P denotes a point on an elliptic curve defined over a finite field Fq, and Q denotes a point kP(k∈Z), that is, a point obtained as a result of the scalar multiplication of the point P, the problem of finding k from Q can be solved as a discrete logarithmic problem. On the other hand, in hyperelliptic curve cryptography, if $D_1$ denotes be a divisor equal to a formal sum of points and $D_2$ denotes a divisor defined as a scalar multiplication $kD_1$, then the problem of finding k from $D_2$ can be treated as a discrete logarithmic problem in a Jacobian variety on a hyperelliptic curve as a public key cryptography problem.

In the case of a hyperelliptic curve, a value characterizing the curve is a genus g. Let q be equal to $p^n$ ($q=p^n$) where p denotes a prime number and n denotes a positive integer. In this case, a hyperelliptic curve C defined over the finite field Fq as a curve of the genus g is defined by the following equation:

$$y^2+h(x)y=f(x)$$

where h(x), f(x)∈Fq[x], f(x) is the monic polynomial of degree 2g+1.

The opposite point −P to a point P=(x, y) on the hyperelliptic curve C is defined as −P=(x, y+h(x)). A point for which P=−P is referred to as a ramification point.

As is commonly known, assuming the same level of security as elliptic curve cryptography, the processing size (the number of bits) of a definition field of hyperelliptic curve cryptography can be reduced to 1/g times the processing size of a definition field of elliptic curve cryptography. The small processing size proves advantageous in terms of implementation, which is regarded as one of the benefits of hyperelliptic curve cryptography.

Next, the basic principles of hyperelliptic curve cryptography will be described. As described above, in hyperelliptic curve cryptography, the problem of finding k from $D_2$ can be treated as a discrete logarithmic problem in a Jacobian variety on the hyperelliptic curve and as such can be treated as a problem in public key cryptography where $D_1$ is a divisor equal to a formal sum of points, and $D_2$ is a divisor defined as a scalar multiplication $kD_1$.

In this case, a divisor is equal to a formal sum of points and can be expressed by the form:

$$D = \sum_i m_i P_i \quad \text{[Formula 1]}$$

Further, a semi reduced divisor can be expressed by the form:

$$D = \sum_i m_i P_i - \left(\sum_i m_i\right) P_\infty, \; m_i \geq 0 \quad \text{[Formula 2]}$$

However, for $P_i=(x_i, y_i)$ and $I \neq j$, a relation $P_i \neq P_j$ holds true. $\Sigma m_i$ in the above equation is referred to as the weight of the divisor D. Further, a semi reduced divisor having a weight not exceeding the genus g is referred to as a reduced divisor.

Using the polynomials U and V∈Fq[x], any semi reduced devisor D in a Jacobian variety on the hyperelliptic curve can be expressed as D=(U, V). This expression is referred to as a Mumford expression. The Mumford expression is described in, for example, Non-Patent Document 3.

$U = \Pi(x-x_i)^{m_i}$ $V(x_i) = y_i$ $V(x)^2 + V(x)h(x) - f(x) \equiv 0 \bmod U(x), \deg V < \deg U$ [Formula 3]

By using the Mumford expression, any reduced divisor D for a genus 2 can be expressed by a set of polynomials each having elements over the finite field set in the coefficients of the polynomial and having an order not exceeding 2. That is, the reduced divisor can be expressed as $(U,V) = (x^2 + u_1 x + u_0, v_1 x + v_0)$, or $(U,V) = (x + x_0, y_0)$.

Further, the zero element is expressed as $(U,V) = (1, 0) = O$

Next, the scalar multiplication of a divisor used in hyperelliptic curve cryptography will be described. The scalar multiplication of a divisor can be carried out as a combination of the addition of the divisor, which is referred to as an addition algorithm, and the doubling of the divisor. Major addition algorithms will be described below.

The first proposed practical algorithm is a Cantor algorithm. The Cantor algorithm is described in, for example, Non-Patent Documents 1 and 2. This Cantor algorithm is applicable to a divisor on a hyperelliptic curve of any genus. However, the drawback of this Cantor algorithm is that in comparison to an elliptic curve algorithm, the algorithm is complicated and has high complexity.

Harley proposed an algorithm in which, by limiting the algorithm to hyperelliptic curves of genus 2, a case-by-case differentiation is made depending on the weight of a divisor, and optimization is performed for each individual case to achieve a reduction in complexity. Since then, this Harley algorithm has been the subject of recent extensive studies on the improvement and extension of computation algorithms in the HECC (Hyper-Elliptic Curve Cryptography).

(a) In accordance with the Harley algorithm, the definition field is used as a prime field and the Mumford expression is adopted as an expression of a divisor on a curve with a genus 2. Examples of studies aimed at reducing the complexity of this algorithm include those disclosed in Non-Patent Document 4, Non-Patent Document 5, Non-Patent Document 6, and the like.

(b) In addition, an example of processing in which the definition field is extended with respect to two extension fields is reported in each of Non-Patent Document 7 and Non-Patent Document 8.

(c) Further, Non-Patent Documents 11, 12, 6 and 13 disclose studies according to which a reduction in complexity is accomplished by using the Mumford expression to express a divisor and adopting the weighted coordinates.

Processing using the Harley algorithm will be described with reference to FIG. 1. It should be noted that the present invention relates to a hyperelliptic curve of genus 2 defined over a finite field of a characteristic 2. In the following description, it is assumed that the genus of the curve is 2, and the characteristic of the definition field is 2.

FIG. 1A is a diagram showing a processing example of the addition of divisors, $D_1+D_2$, where $D_1$ and $D_2$ each denote a divisor with a genus 2. It should be noted that divisors $D_1$ and $D_2$ are expressed as follows: $D_1=(U_1,V_1)$, $D_2=(U_2,V_2)$. First, a case-by-case differentiation is made depending on the weight values of the divisors. That is, depending on the values of the respective weights of $[D_1+D_2]$, the processing is differentiated for the following cases:

(1) weight 2+weight 2
(2) weight 2+weight 1
(3) Exceptional Processing 1

Next, in the case of addition of a weight 2 to a weight 2 itself, that is, in the case (1): weight 2+weight 2, if the greatest common denominator $\gcd(U_1, U_2)$ for the two divisors $D_1=(U_1,V_1)$ and $D_2=(U_2,V_2)$ is 1 ($\gcd(U_1, U_2)=1$), the two divisors $D_1=(U_1,V_1)$ and $D_2=(U_2,V_2)$ do not include a common point or points opposite to each other. In this case, addition processing according to (1a) HarleyADD, that is, the Harley algorithm is carried out. The processing of (1a) HarleyADD is processing referred to as Most Frequent Case disclosed in, for example, Non-Patent Document 7. The Most Frequent Case is a case occurring with a high probability in the addition processing to find the sum of $D_1+D_2$ of divisors for a genus 2.

The processing of (1a) HarleyADD occurs with a very high probability. The probability with which some other exceptional processing occurs is very low. If the conditions of the most frequent case are not satisfied, that is, if the greatest common denominator $\gcd(U_1, U_2)$ for the two divisors $D_1=(U_1,V_1)$ and $D_2=(U_2,V_2)=1$ is not satisfied, (1b) Exceptional Processing 2 is carried out.

Also for the case (2) of weight 2+weight 1, in the same way, it is checked as to whether or not $\gcd(U_1, U_2)=1$. If $\gcd(U_1, U_2)=1$ is satisfied, $$\text{ExHarADD}^{2+1 \to 2} \quad (2a)$$

is carried out, and if $\gcd(U_1, U_2)=1$ is not satisfied, (2b) Exceptional Processing 3 (2b) is carried out.

Exceptional processing 1 in the case (3) is carried out for cases of weight setting other than those of the cases (1) and (2) mentioned above.

It should be noted that the algorithm of the addition processing for a genus 2 described above is disclosed in detail in Non-Patent Document 8 (Table 1, 2).

The flow of doubling operation for a genus 2 is shown in FIG. 1(B). The doubling operation is processing represented as D+D=2D. Let $D_1=(U_1,V_1)$ be the input, and $D_2=[2]D_1$ be the output.

As in the case of addition, different kinds of processing are carried out depending on the weight of the devisor D, as follows:

(4): weight 2
(5): weight 1
(6): weight 0

In the case (4) of weight 2, it is checked as to whether or not the divisor includes a ramification point. If no ramification point is included, the processing of (4a) HarleyDBL is carried out. If the divisor includes a ramification point, (4b) Exceptional Processing 6 is carried out. The algorithm of the HarleyDBL processing is disclosed as being the most frequent case in, for example, Non-Patent Document 7. The algorithm of the HarleyDBL processing is shown below.

Algorithm 1 *HarleyDBL* [Formula 4]

Input: $D_1 = (U_1, V_1)$

Output: $D_2 = (U_2, V_2)$ $U_i(x) = x^2 + u_{i1}x + u_{i0}$, $V_i(x) = v_{i1}x + v_{i0}$, $gcd(h, U_1) = 1$ 1. $U_1' \leftarrow U_1^2$
2. $S \leftarrow h^{-1}(f + hV_1 + V_1^2)/U_1, \bmod U_1$
3. $V_1' \leftarrow SU_1 + V_1$
4. $U_2' \leftarrow (f + hV_1' + V_1'^2)/U_1'$
5. $U_2 \leftarrow MakeMonic(U_2')$
6. $V_2 \leftarrow V_1' + h \bmod U_2$
7. return $D_2 = (U_2, V_2)$ As will be described later, this processing occurs with a very high probability. The probability of the occurrence of some other exceptional processing is very low. As described above, if the conditions of the most frequent case are not satisfied, Exceptional Processing 6 is carried out.

In the case of weight 1 as well, it is checked whether or not $gcd(U_1, U_2)=1$, and the processing of (5a), $ExHarDBL^{1+1 \rightarrow 2}$, or Exceptional Processing 7 as the processing (5b) is carried out. The algorithm of $ExHarDBL^{1+1 \rightarrow 2}$ is disclosed in Non-Patent Document 8[4.12. (a)].

As described above, HarleyADD and HarleyDBL are referred to as the most frequent case. If a divisor is generated at random and is subjected to addition or doubling, the processing of HarleyADD or HarleyDBL occurs with a very high probability. It should be noted that description about HarleyADD and HarleyDBL becoming the most frequent case is given in, for example, Non-Patent Document 14.

In accordance with Non-Patent Document 14, the probability of the occurrence of processing other than the above-mentioned most frequent case is $O(1/q)$ where q denotes the number of elements in the definition field. Since $q^g$ is a large number with a required size of about 160 in secure cryptographic applications, in practice, it can be regarded that only HarleyADD or HarleyDBL occurs.

Thus, when the addition algorithm of HECC (Hyper-Elliptic Curve Cryptography) is implemented as cryptographic computation means such as an IC card by using the Harley algorithm or an improved algorithm thereof, it is often the case that only
    HarleyADD, and
    HarleyDBL
are implemented, and other types of complicated exceptional processing that has almost zero probability of occurrence are not executed. Examples of the method applied to exceptional processing in this case include execution of a Cantor algorithm that does not require case-by-case differentiation depending on the weight value. Since the larger the genus, the greater the load of the complicated exceptional processing, this implementation method is specially described in Non-Patent Documents 9 and 10.

Next, scalar multiplication of a divisor in the algorithm of HECC (Hyper-Elliptic Curve Cryptography) will be described. In the algorithm of the HECC (Hyper-Elliptic Curve Cryptography), scalar multiplication of a divisor is carried out as a combination of hyperelliptic addition and hyperelliptic doubling. The algorithm of the scalar multiplication will be described by taking the basic binary method and basic double-and-add-always method as examples.

As described above, in elliptic curve cryptography, assuming that P denotes a point on an elliptic curve defined over a finite field Fq, Q denotes a point $kP(k \in Z)$, that is, a point obtained as a result of the scalar multiplication of the point P, the problem of finding k from Q can be solved as a discrete logarithmic problem. On the other hand, in hyperelliptic curve cryptography, assuming that $D_1$ denotes a divisor equal to a formal sum of points and $D_2$ denotes a divisor defined as a scalar multiplication $kD_1$, the problem of finding k from $D_2$ can be treated as a discrete logarithmic problem in a Jacobian variety on the hyperelliptic curve as a public key cryptography problem.

In this case, the binary expression of a scalar value: d as a multiplier to be applied to a scalar multiplication (D=dD) is given as follows:

$$d=(d_{l-1}, \ldots, d_0)$$

wherein $d_{l-1}=1$, and $d_{l-2}, \ldots, _0=1$ or 0.

As the algorithm for scalar multiplication, the computation algorithms of the basic binary method include the following:
    binary (left-to-right) method; and
    binary (right-to-left) method.

According to the binary (right-to-left) method, d is scanned from the least significant bits, and if $d_i=1$, $[2^i]D$ is added. The algorithm (Algorithm 2) of the binary (right-to-left) method is shown below.

Algorithm 2 binary (right-to-left) method [Formula 5]

Input $D_0$

Output $D = dD_0$ $T \leftarrow D_0$ $D \leftarrow O$ for *i* from 0 to $l-1$

{ if $d_i = 1$ then $D \leftarrow D + T$ // Addition *HarleyADD*

$T \leftarrow 2T$ //Doubling *HarleyDBL*

} return $D$

On the other hand, according to the binary (left-to-right) method, d is scanned from the most significant bits, D is doubled for every bit, and if $d_i=1$, a base point is added. The algorithm (Algorithm 3) of the binary (left-to-right) method is shown below.

Algorithm 3 binary (left-to-right) method  [Formula 6]

Input $D_0$

Output $D = dD_0$ $D \leftarrow D_0$ for $i$ from $l-2$ downto $0$

{

$D \leftarrow [2]D$//Doubling HarleyDBL if $d_i = 1$ then $D \leftarrow$ $D + D_0$//Addition HarleyADD

} return $D$

Next, base-point generation processing will be described. When applying scalar multiplication to cryptography, divisors $D_0$ necessary for the inputs are divided into the following two types:

(1): a divisor determined in advance; and (2): a divisor undeterminable in advance and generated at random.

In the case of type (1) of a divisor determined in advance, the input divisor is referred to as a base point.

A general algorithm for generating a base point is described as follows.

(a): g elements on a definition field Fq are selected at random and g points $P_i$ (where i=1, ..., g) on a hyperelliptic curve are generated.

(a1): The elements selected at random are each used as an x coordinate $x_i$ (where i=1 ... g). Then, a y coordinate corresponding to $x_i$ is determined so that every point (x, y) is positioned on the hyperelliptic curve.

(b): Let $D_0=(U(x), V(x))$ represent the divisor of the base point.

(b1): $U(x)=(x-x_1)(x-x_2) \ldots (x-x_g)$ (b2): Coefficients $v_i$ of an equation $V(x)=v_{g-1}x^{g-1}+v_{g-2}x^{g-2}+\ldots+v_0$ are determined. If the generated points are all different from each other, for example, the coefficients $v_i$ can be found from an equation $V(x_i)=y_i$. (c): The divisors generated in accordance with the above algorithm are each a divisor with a weight of g.

If the computation of scalar multiplication is applied to cryptography, a divisor $D_0$ required for the input, that is, a base point is generated. If divisors determined in advance are applied to the generation of a base point, it is possible to find a divisor with a weight of g as a divisor usable as a base point by carrying out the processing (a) to (c) described above.

Further, with regard to elliptic curve cryptography, halving of a rational point has been proposed. For example, halving of a rational point in elliptic curve cryptography is disclosed in Non-patent Document 15, Patent Document 1, and Patent Document 2. In the disclosed processing, when computing the scalar multiplication of a rational point, instead of using addition and doubling, addition and halving are used.

Halving in elliptic curve cryptography can be computed generally faster than doubling. As a result, scalar multiplications using halving can be computed fast. Non-patent Document 16 reports that in the case of a software implementation with the [Intel PentiumIII 800 MHz] from Intel Corporation as a processor, with respect to a definition field Fq, $q=2^{163}$, halving is approximately 2.1 times faster than doubling, and with respect to a definition field Fq, $q=2^{233}$, halving is approximately 2.6 times faster than doubling. Since hyperelliptic curve cryptography represents the generalization of elliptic curve cryptography, there may be cases where the operations used in elliptic curve cryptography can be extended to hyperelliptic curve cryptography. For example, Non-patent Documents 17 and 18 disclose a case where the Montgomery method, which realizes fast computation since a y-coordinate is not used for computation in elliptic curve cryptography, is extended to hyperelliptic curve cryptography. It is anticipated that if halving faster than doubling can be realized also in hyperelliptic curve cryptography, the scalar multiplication of a divisor, too, can be computed faster than in the related art. However, the use of such halving operation is not known in the related art. It should be noted that Non-patent Document 19 is an example of a published document presenting a fast computation technique using doublings.

[Patent Document 1] E. Knudsen. COMPUTING METHOD FOR ELLIPTIC CURVE CRYPTOGRAPHY, WO 01/04742 A1, 18 Jan. 2001

[Patent Document 2] R. Schroeppel. Elliptic curve point ambiguity resolution apparatus and method, WO 01/35573 A1, 17 May 2000

[Non-patent Document 1] N. Koblitz. Hyperelliptic curve cryptosystems. J. Cryptology, vol. 1, No. 3, pp. 139-150, 1989.

[Non-patent Document 2] D. G. Cantor. Computing in the Jacobian of hyperelliptic curve. Math. Comp., Vol. 48, No. 177, pp. 95-101, 1987

[Non-patent Document 3] "D. Mumford, Tata lectures on theta II, Progress in Mathematics, no. 43, Birkhauser, 1984."

[Non-patent Document 4] K. Matsuo, J. Chao, and S. Tsujii. Fast Genus two hyperelliptic curve cryptosystems. Technical Report ISEC2001-31, IEICE Japan, 2001.

[Non-patent Document 5] M. Takahashi. Improving Harley algorithms for Jacobians of genus 2 hyperelliptic curves. SCIS2002. (Japanese).

[Non-patent Document 6] T. Lange. Inversion operation-free arithmetic on genus 2 hyperelliptic curves. Cryptology ePrint Archive, 2002/147, IACR, 2002.

[Non-patent Document 7] T. Sugizaki, K. Matsuo, J. Chao, and S. Tsujii. An extension of Harley addition algorithm for hyperelliptic curves over finite fields of characteristic two. ISEC2002-9, IEICE, 2001

[Non-patent Document 8] T. Lange, Efficient arithmetic on genus 2 hyperelliptic curves over finite fields via explicit formulae. Cryptology ePrint Archive, 2002/121, IACR, 2002.

[Non-patent Document 9] J. Kuroki, M. Gonda, K. Masuo, J. Chao and S. Tsujii. Fast genus three hyperelliptic curve cryptosystems. SCIS2002

[Non-patent Document 10] J. Pelzl, T. Wollinger, J. Guajardo, and C. Paar. Hyperelliptic curve Cryptosystems: Closing the Performance Gap to Elliptic Curves. Cryptology ePrint Archive, 2003/026, IACR, 2003.

[Non-patent Document 11] Y. Miyamoto, H. Doi, K. Matsuo, J. Chao and S. Tsujii. A fast addition algorithm of genus two hyperelliptic curves. SCIS2002. (Japanese).

[Non-patent Document 12] N. Takahashi, H. Morimoto and A. Miyaji. Efficient exponentiation on genus two hyperelliptic curves (II). ISEC2002-145, IEICE, 2003. (Japanese)

[Non-patent Document 13] T. Lange. Weighed coordinate on genus 2 hyperelliptic curve. Cryptology ePrint Archive, 2002/153, IACR, 2002.

[Non-patent Document 14] N. Nagao. Improving group law algorithms for Jacobians of hyperelliptic curves. ANTS-IV, LNCS 1838, pp. 439-448, Springer-Verlag, 2000.

[Non-patent Document 15] E. Knudsen. Elliptic Scalar Multiplication Using Point Halving. ASIACRYPTO '99, LNCS 1716, pp. 135-149, Springer-Verlag, 1999.

[Non-patent Document 16] K. Fong, D. Hankerson, J. Lopez, and A. Menezes. Field inversion operation and point halving revised. Technical Report CORR2003-18, www.cacr.math.uwaterloo.ca/techreports/2003/corr2003-18.pdf

[Non-patent Document 17] S. Dquesne. Montgomery Scalar Multiplication for Genus 2 Curves. ANTS-VI, LNCS 3076, pp. 153-168, 2004.

[Non-patent Document 18] T. Lange. Montgomery Addition for Genus Two Curves. ANTS-VI, LNCS 3076, pp. 309-317, 2004.

[Non-patent Document 19] T. Lange. Efficient Doubling on Genus Two Curves over Binary Fields, SAC 2004, pre-proceedings, pp. 189-202, 2004.

SUMMARY

As opposed to the ECC (Elliptic Curve Cryptography) algorithm which is now entering the commercialization phase, the HECC (Hyper-Elliptic Curve Cryptography) algorithm, which is an extended concept of the ECC (Elliptic Curve Cryptography) algorithm, is currently under study at the academic-society level as to the construction of fast algorithms and their implementation methods. Nevertheless, the computation time of the scalar multiplication based on the HECC (Hyper-Elliptic Curve Cryptography) algorithm is still only approaching to that of the ECC (Elliptic Curve Cryptography) algorithm, and a further increase in computation speed is being desired.

The present invention has been made in view of the above-mentioned circumstances, and accordingly it is an object of the present invention to provide a cryptographic computation method, a cryptographic system, and a computer program, which enable a reduction in the computation time of scalar multiplication in HECC (Hyper-Elliptic Curve Cryptography) to realize fast HECC (Hyper-Elliptic Curve Cryptography) processing.

It is another object of the present invention to provide a cryptographic computation method, a cryptographic system, and a computer program, which find algorithms, curve parameters, and definition fields that allow halving in elliptic curve cryptography to be extended to hyperelliptic curve cryptography to achieve fast computation, thereby realizing fast computing processing through computing processing to which having is applied to hyperelliptic curve cryptography.

According to a first aspect of the present invention, there is provided a cryptographic computation method for executing cryptographic computation based on hyperelliptic curve cryptography, including a computing step of executing computing operations including halving as computing processing, in computation of scalar multiplication with respect to a divisor D on a hyperelliptic curve.

Further, in an embodiment of the cryptographic computation method according to the present invention, the computing step is a step of executing computing operations including halving in scalar multiplication with respect to a divisor D on a hyperelliptic curve of genus 2 in characteristic 2 having a random parameter.

Further, in an embodiment of the cryptographic computation method according to the present invention, the computing step is a step of executing computing operations including halving in scalar multiplication with respect to a divisor D on a hyperelliptic curve of genus 2 in characteristic 2 having $h(x)=x^2+x+h_0$, $f_4=0$ as parameters.

Further, in an embodiment of the cryptographic computation method according to the present invention, the computing step is a step of executing computing operations including halving in scalar multiplication with respect to a divisor D on a hyperelliptic curve of genus 2 in characteristic 2 having $h(x)=x^2+h_1 x+h_0$, $f_4=0$ as parameters.

Further, in an embodiment of the cryptographic computation method according to the present invention, the computing step is a step of executing computing operations including halving in scalar multiplication with respect to a divisor D on a hyperelliptic curve of genus 2 in characteristic 2 having $h(x)=x$ as a parameter.

Further, in an embodiment of the cryptographic computation method according to the present invention, the cryptographic computation method further includes a table-lookup step of looking up a table that records which of $k_1, k_1', (k_0, k_0')$ is correct on the basis of a computed value of $[\frac{1}{2}^i D]$ with respect to a divisor D fixed in advance, and the computing step executes computing processing in which complexity of halving is reduced, by determination processing based on a lookup of the table.

Further, in an embodiment of the cryptographic computation method according to the present invention, the computing step includes a step of calculating a value of an inverse $1/k_1$ by multiplication and addition processing without performing an inversion, by application of the following relational expression:

$$1/k_1 = h_2 + k_1 u_{21},$$

which is derived from a halving computation algorithm in which

Input: $D_2=(U_2, V_2)$, and

Output: $D_1=(U_1, V_1)=[\frac{1}{2}]D_2$, where $U_i(x)=x^2+u_{i1}x+u_{i0}$, $V_i(x)=v_{i1}x+v_{i0}$, $\gcd(h, U_i)=1$, i=1, 2.

Further, in an embodiment of the cryptographic computation method according to the present invention, the cryptographic computation method executes computation according to an algorithm having a setting for not applying $1/u_{21}$ as an input value, in a halving computation algorithm in which Input: $D_2=(U_2, V_2)$; and Output: $D_1=(U_1, V_1)=[\frac{1}{2}]D_2$, where $U_i(x)=x^2+u_{i1}x+u_{i0}$, $V_i(x)=v_{i1}x+v_{i0}$, $\gcd(h, U_i)=1$, i=1, 2.

Further, in an embodiment of the cryptographic computation method according to the present invention, the cryptographic computation method is a computation method for executing scalar multiplication with respect to a divisor D on a hyperelliptic curve of genus 2 in characteristic 2 having $h(x)=x^2+h_1 x+h_0$, $f_4=0$ as parameters, and the computing step includes the step of setting, as an input value, $1/h_1^2$ that is a previously calculated value, and applying the previously calculated input value $1/h_1^2$ without executing processing of calculating an inverse $1/h_1^2$.

Further, according to a second aspect of the present invention, there is provided a cryptographic system which executes cryptographic computation based on hyperelliptic curve cryptography, including a computation executing section that executes computing operations including halving as computing processing, in computation of scalar multiplication with respect to a divisor D on a hyperelliptic curve.

Further, in an embodiment of the cryptographic system according to the present invention, the computation executing section is configured to execute computing operations including halving in scalar multiplication with respect to a divisor D on a hyperelliptic curve of genus 2 in characteristic 2 having a random parameter.

Further, in an embodiment of the cryptographic system according to the present invention, the computation executing section is configured to execute computing operations including halving in scalar multiplication with respect to a divisor D on a hyperelliptic curve of genus 2 in characteristic 2 having $h(x)=x^2+x+h_0$, $f_4=0$ as parameters.

Further, in an embodiment of the cryptographic system according to the present invention, the computation executing section is configured to execute computing operations including halving in scalar multiplication with respect to a divisor D on a hyperelliptic curve of genus 2 in characteristic 2 having $h(x)=x^2+h_1x+h_0$, $f_4=0$ as parameters.

Further, in an embodiment of the cryptographic system according to the present invention, the computation executing section is configured to execute computing operations including halving in scalar multiplication with respect to a divisor D on a hyperelliptic curve of genus 2 in characteristic 2 having $h(x)=x$ as a parameter.

Further, in an embodiment of the cryptographic system according to the present invention, the cryptographic system further includes a storage section that stores a table recording which of $k_1$, $k_1'$, $(k_0, k_0')$ is correct on the basis of a computed value of $[½^iD]$ with respect to a divisor D fixed in advance, and the computation executing section is configured to execute computing processing in which complexity of doubling is reduced, by determination processing based on a lookup of the table.

Further, in an embodiment of the cryptographic system according to the present invention, the computation executing section is configured to calculate a value of an inverse $1/k_1$ by multiplication and addition processing without performing an inversion, by application of the following relational expression:

$1/k_1 = h_2 + k_1 u_{21}$, which is derived from a halving computation algorithm in which Input: $D_2=(U_2,V_2)$, and Output: $D_1=(U_1,V_1)=[½]D_2$, where $U_i(x)=x^2+u_{i1}x+u_{i0}$, $V_i(x)=v_{i1}x+v_{i0}$, $\gcd(h, U_i)=1$, $i=1, 2$.

Further, in an embodiment of the cryptographic system according to the present invention, the computation executing section is configured to execute a halving computation algorithm in which Input: $D_2=(U_2,V_2)$, and Output: $D_1=(U_1,V_1)=[½]D_2$, where $U_i(x)=x^2+u_{i1}x+u_{i0}$, $V_i(x)=v_{i1}x+v_{i0}$, $\gcd(h, U_i)=1$, $i=1, 2$, and to execute computation according to an algorithm having a setting for not applying $1/u_{21}$ as an input value.

Further, in an embodiment of the cryptographic system according to the present invention, the computation executing section is configured to execute scalar multiplication with respect to a divisor D on a hyperelliptic curve of genus 2 in characteristic 2 having $h(x)=x^2+h_1x+h_0$, $f_4=0$ as parameters, and to execute computation to which, with $1/h_1^2$ that is a previously calculated value being set as an input value, the previously calculated input value $1/h_1^2$ is applied without executing processing of calculating an inverse $1/h_1^2$.

Further, according to a third aspect of the present invention, there is provided a computer program for causing cryptographic computation based on hyperelliptic curve cryptography to be executed on a computer, including a computing step of executing computing operations including halving as computing processing, in computation of scalar multiplication with respect to a divisor D on a hyperelliptic curve.

It should be noted that the computer program according to the present invention is a computer program that can be provided with respect to a computer system capable of executing a variety of program codes via a storage medium or communication medium that is provided in a computer-readable format, for example, a recording medium such as a CD, FD, or MO, or via a communication medium such as a network. By providing such a program in a computer-readable format, processing corresponding to that program is realized on the computer system.

Other objects, features, and advantages of the present invention will become apparent from the following detailed description of embodiments of the present invention and the accompanying drawings. It should be noted that the term system as used in this specification refers to a logical assembly of a plurality of devices, and is not limited to one in which devices of respective configurations are located within the same casing.

According to the configuration of the present invention, halving on elliptic curve cryptography is extended to hyperelliptic curve cryptography to thereby realize fast computation. In the case of cryptographic computation employing computations on a divisor on a hyperelliptic curve, a computing operation that puts a large load on the processing is the scalar multiplication of a divisor. Hence, by realizing faster scalar multiplication by the processing according to the present invention as described above, a considerable improvement can be achieved in terms of the processing of hyperelliptic curve cryptography.

According to the configuration of the present invention, in scalar multiplication with respect to a divisor D in hyperelliptic curve cryptography, faster scalar multiplication can be realized by executing computing operations including halving as computing processing. For example, fast computation is realized by executing computing operations including halving in scalar multiplication with respect to a divisor D on a hyperelliptic curve of genus 2 in characteristic 2 having $h(x)=x^2+x+h_0$, $f_4=0$ as parameters, a hyperelliptic curve of genus 2 in characteristic 2 having $h(x)=x^2+h_1x+h_0$, $f_4=0$ as parameters, or a hyperelliptic curve of genus 2 in characteristic 2 having $h(x)=x$ as a parameter.

According to the configuration of the present invention, a further reduction in the complexity of scalar multiplication of a divisor and hence faster computation can be achieved through the application of a table that records which of $k_1$, $k_1'$, $(k_0, k_0')$ is correct on the basis of a computed value of $[½^iD]$ with respect to a divisor D fixed in advance.

According to the configuration of the present invention, in scalar multiplication with respect to a divisor D in hyperelliptic curve cryptography, computing operations including halving are executed as computing processing, and an algorithm for reducing the number of inversion operations executed in the halving computation processing is applied, thereby making it possible to achieve a further reduction in the complexity of scalar multiplication of a divisor and hence faster computation.

Additional features and advantages of the present invention are described in, and will be apparent from, the following Detailed Description and the Figures.

DETAILED DESCRIPTION

Figure 1:
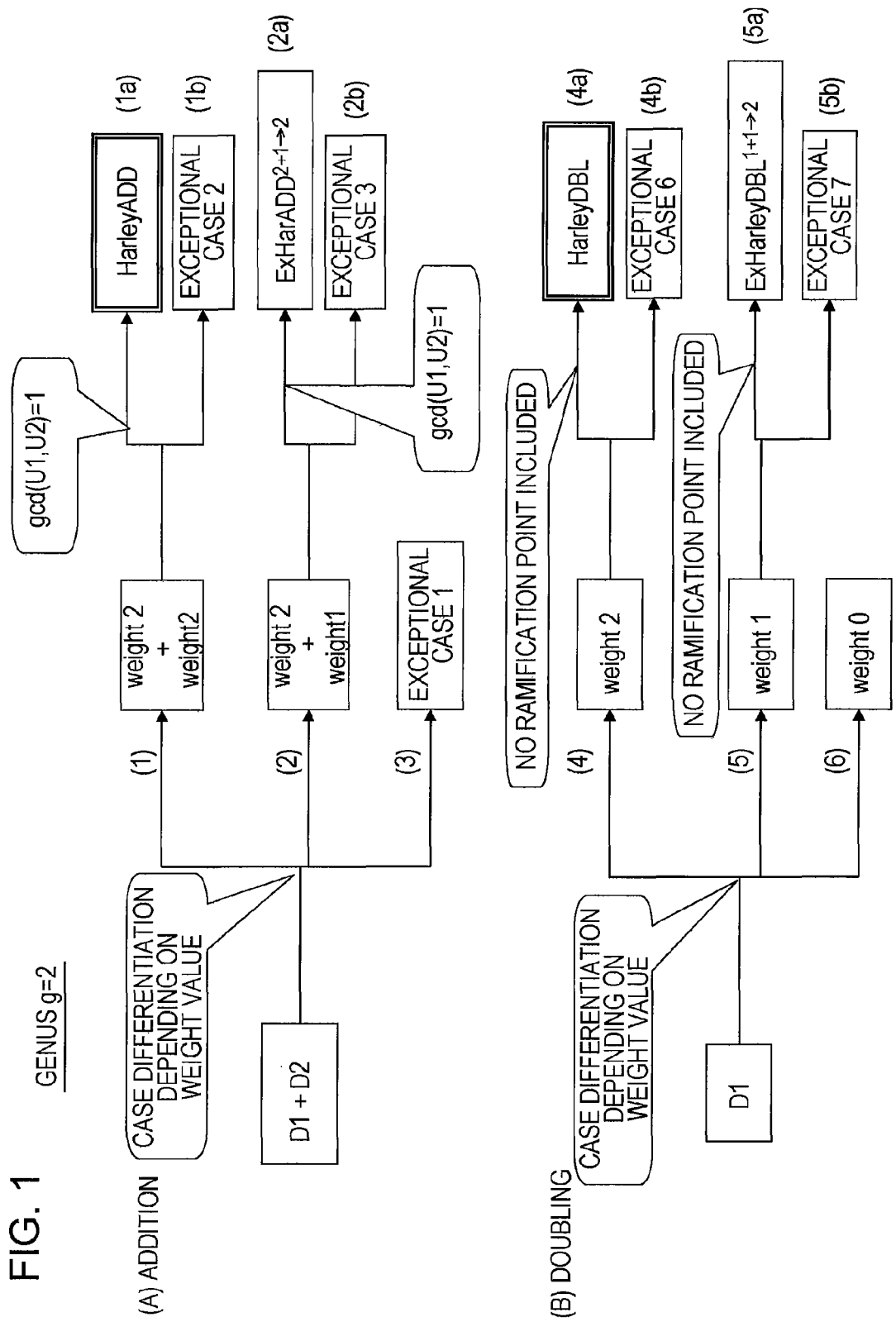
FIG. 1 is a diagram illustrating the algorithms for the processing of addition and doubling in scalar multiplication in hyperelliptic curve cryptography on a curve of genus 2.

A cryptographic system and a cryptographic computation method, and a computer program according to the present invention will be described below in detail with reference to the drawings.

The present invention provides a fast computing method with respect to HECC (Hyper-Elliptic Curve Cryptography) that represents the generalization of elliptic curve cryptography. As described above, in the case of a hyperelliptic curve, the value characterizing the curve is a genus g. It is assumed that p denotes a prime number, n denotes a positive integer, and q=p$^n$. In this case, a hyperelliptic curve C defined over the finite field Fq as a curve of the genus g is expressed by the following equation:

$$y^2+h(x)y=f(x),$$

where h(x), f(x)∈Fq[x], f(x) is the monic polynomial of degree 2g+1.

An opposite point −P to a point P=(x, y) on the hyperelliptic curve C is defined as −P=(x, y+h(x)). A point for which P=−P is referred to as a ramification point.

As is commonly known, assuming the same level of security as elliptic curve cryptography, the processing size (or the number of bits) of a definition field of the hyperelliptic curve cryptography can be reduced to 1/g times the processing size of a definition field of an elliptic curve cryptography. The small processing size proves advantageous in terms of implementation, which is considered to be one of the benefits of hyperelliptic curve cryptography.

Next, the basic principles of hyperelliptic curve cryptography will be described. As described above, in hyperelliptic curve cryptography, the problem of finding k from $D_2$ can be treated as a discrete logarithmic problem in a Jacobian variety on the hyperelliptic curve and as such can be treated as a problem in public key cryptography where $D_1$ is a divisor equal to a formal sum of points, and $D_2$ is a divisor defined as a scalar multiplication $kD_1$.

In this case, a divisor is equal to a formal sum of points and can be expressed by the form:

$$D = \sum_i m_i P_i \quad \text{[Formula 7]}$$

Further, a semi reduced divisor can be expressed by the form:

$$D = \sum_i m_i P_i - \left(\sum_i m_i\right) P_\infty, m_i \geq 0 \quad \text{[Formula 8]}$$

However, for $P_i=(x_i, y_i)$ and I≠j, a relation $P_i \neq P_j$ holds true.

$\Sigma m_i$ in the above equation is referred to as the weight of the divisor D. Further, a semi reduced divisor having a weight not exceeding the genus g is referred to as a reduced divisor.

Using the polynomials U and V∈Fq[x], any semi reduced devisor D in a Jacobian variety on the hyperelliptic curve can be expressed as D=(U, V). This expression is referred to as a Mumford expression.

$$U=\Pi(x-x_i)^{m_i}$$

$$V(x_i)=y_i$$

$$V(x)^2+V(x)h(x)-f(x)\equiv 0 \bmod U(x), \deg V < \deg U \quad \text{[Formula 9]}$$

By using the Mumford expression, any reduced divisor D for a genus 2 can be expressed by a set of polynomials each having elements over the finite field set in the coefficients of the polynomial and having an order not exceeding 2. That is, the reduced divisor can be expressed as $$(U,V)=(x^2+u_1x+u_0, v_1x+v_0), \text{ or}$$

$$(U,V)=(x+x_0, y_0).$$

Further, the zero element is expressed as $$(U,V)=(1,0)=O.$$

According to the present invention, halving operation in elliptic curve cryptography is extended to hyperelliptic curve cryptography, and algorithms, curve parameters, and definition fields that allow faster computation than doubling operation are found, thereby realizing computing processing to which halving operation, which is faster than doubling operation, is applied to hyperelliptic curve cryptography. In the following, the description of embodiments of the present invention is organized in two parts. First, techniques according to Processing Examples 1 to 6 below will be described in the first part.

Processing Example 1

Proposed Method A1

A method of computing the halving of a divisor D on a hyperelliptic curve of genus 2 in characteristic 2 with random parameters.

Processing Example 2

Proposed Method F1

A method of computing the halving of a divisor D on a hyperelliptic curve of genus 2 in characteristic 2 with parameters $h(x)=x^2+h_1x+h_0$, $f_4=0$.

Processing Example 3

Proposed Method B1

A method of computing the halving of a divisor D on a hyperelliptic curve of genus 2 in characteristic 2 with parameters $h(x)=x^2+x+h_0$, $f_4=0$.

Processing Example 4

Proposed Method E1

A method of computing the halving of a divisor D on a hyperelliptic curve of genus 2 in characteristic 2 with a parameter $h(x)=x$.

Processing Example 5

Proposed Method C1

When computing the halving of a divisor D on a hyperelliptic curve of genus 2 in characteristic 2 with random parameters, a hyperelliptic curve of genus 2 in characteristic 2 with parameters $h(x)=x^2+h_1x+h_0$, $f_4=0$, and a hyperelliptic curve of genus 2 in characteristic 2 with parameters $h(x)=x^2+x+h_0$, $f_4=0$, two candidates of the halved value arise. In this case, it is necessary to select the one with the correct value from the two candidates. When selecting the correct one, it is necessary to compute the trace, multiplication, and square root of a finite field. Which one of the two candidates is correct depends on the divisor D. Hence, if the divisor D is fixed, information as to which one of the two candidates is correct is retained in a table in advance, and this table is looked up when selecting the correct value, thereby omitting the above-mentioned extra computations.

Processing Example 6

Proposed Method D1

A method of computing the scalar multiplication of a divisor by using the method of computing the halving of a divisor as set forth in each of Processing Examples 1 to 5.

Further, the second part will be directed to the description of the following techniques that represent improvements over Processing Examples 1 to 3 and Processing Examples 5 and 6.

Processing Example 7

Proposed Method A2

A method of computing the halving of a divisor D on a hyperelliptic curve of genus 2 in characteristic 2 with random parameters.

Processing Example 8

Proposed Method F2

A method of computing the halving of a divisor D on a hyperelliptic curve of genus 2 in characteristic 2 with parameters $h(x)=x^2+h_1x+h_0$, $f_4=0$.

Processing Example 9

Proposed Method B2

A method of computing the halving of a divisor D on a hyperelliptic curve of genus 2 in characteristic 2 with parameters $h(x)=x^2+x+h_0$, $f_4=0$.

Processing Example 10

Proposed Method C2

When computing the halving of a divisor D on a hyperelliptic curve of genus 2 in characteristic 2 with random parameters, a hyperelliptic curve of genus 2 in characteristic 2 with parameters $h(x)=x^2+h_1x+h_0$, $f_4=0$, and a hyperelliptic curve of genus 2 in characteristic 2 with parameters $h(x)=x^2+x+h_0$, $f_4=0$, two candidates of the halved value arise. In this case, it is necessary to select the one with the correct value from the two candidates. When selecting the correct one, it is necessary to compute the trace, multiplication, and square root of a finite field. Which one of the two candidates is correct depends on the divisor D. Hence, if the divisor D is fixed, information as to which one of the two candidates is correct is retained in a table in advance, and this table is looked up when selecting the correct value, thereby omitting the above-mentioned extra computations.

Processing Example 11

Proposed Method D2

A method of computing the scalar multiplication of a divisor by using the method of computing the halving of a divisor as set forth in each of Processing Examples 7 to 10.

The respective processing examples mentioned above will be sequentially described below in detail.

Processing Example 1

Proposed Method A1

Processing Example 1 (Proposed Method A1) relates to a method of computing the halving of a divisor D on a hyperelliptic curve of genus 2 in characteristic 2 with random parameters.

Further, it is assumed that the order of the divisors used in the processing below is r. That is, the divisors have no ramification point. It is assumed that the input divisors are as follows:

$D_2=(U_2,V_2)$;

$U_2=u_{22}x^2+u_{21}x+u_{20}$; and $V_2=v_{21}x+v_{20}$, where:
$u_{22}=1$ if the weight of the divisor $D_2$ is 2; and
$u_{22}=1$, $u_{21}=1$, and $v_{21}=0$ if the weight of the divisor $D_2$ is 1.

Since no ramification point is included, as the halving operation, it suffices to consider four inversion operations of ExHarDBL$^{1+1\to2}$, ExHarDBL$^{2+2\to1}$, ExHarDBL$^{2+2\to2}$, and HarleyDBL. Those other than HarleyDBL represent exceptional cases.

Here, ExHarDBL$^{2+2\to2}$ represents a computation in the case where the weight of the input divisor is 2, and the weight of the output divisor is 1. Further, ExHarDBL$^{2+2\to2}$ represents a computation in the case where the weight of the input divisor is 2, and the coefficient of the first order term of $U_2$ satisfies $u_{21}=0$ and the weight of the output divisor is 2. However, while ExHarDBL$^{2+2\to2}$ can be computed by HarleyDBL, since halving as the inversion operation thereof becomes an exceptional case, ExHarDBL$^{2+2\to2}$ is herein treated as an exceptional case.

The halving operations corresponding to ExHarDBL$^{1+1\to2}$, ExHarDBL$^{2+2\to1}$, ExHarDBL$^{2+2\to2}$, and HarleyDBL mentioned above are defined as ExHEC_HLV$^{2\to1+1}$, ExHEC_HLV$^{1\to2+2}$, ExHEC_HLV$^{2\to2+2}$, and HEC_HLV, respectively.

Figure 2:
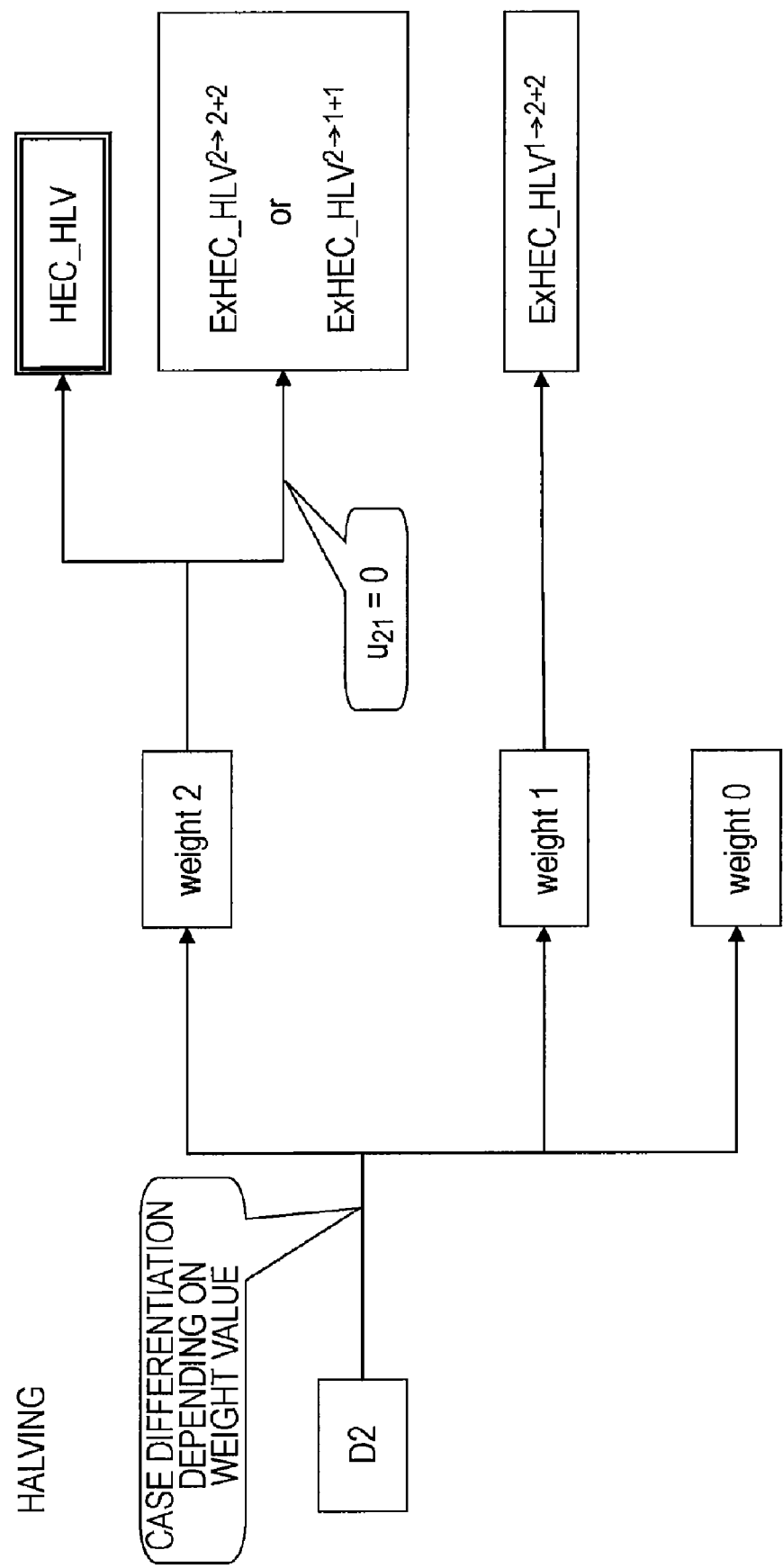
FIG. 2 is a diagram illustrating how doubling operation is differentiated on a case-by-case basis in hyperelliptic curve cryptography on a curve of genus 2.

When carrying out the halving operation of a divisor, first, a case-by-case differentiation is made depending on the input divisor as shown in FIG. 2. If the weight of the input divisor is 2, and the coefficient of the first order term of $U_2$ satisfies $u_{21} \neq 0$, the computation is performed by HEC_HLV. Further, if the weight of the input divisor is 2, and the coefficient of the term of $U_2$ satisfies $u_{21}=0$, the computation is performed by ExHEC_HLV$^{2 \to 2+2}$ or ExHEC_HLV$^{2 \to 1+1}$. Further, if the weight of the input divisor is 1, the computation is performed by ExHEC_HLV$^{1 \to 2+2}$. The algorithm of HEC_HLV will be described with reference to FIG. 3.

Figure 3:
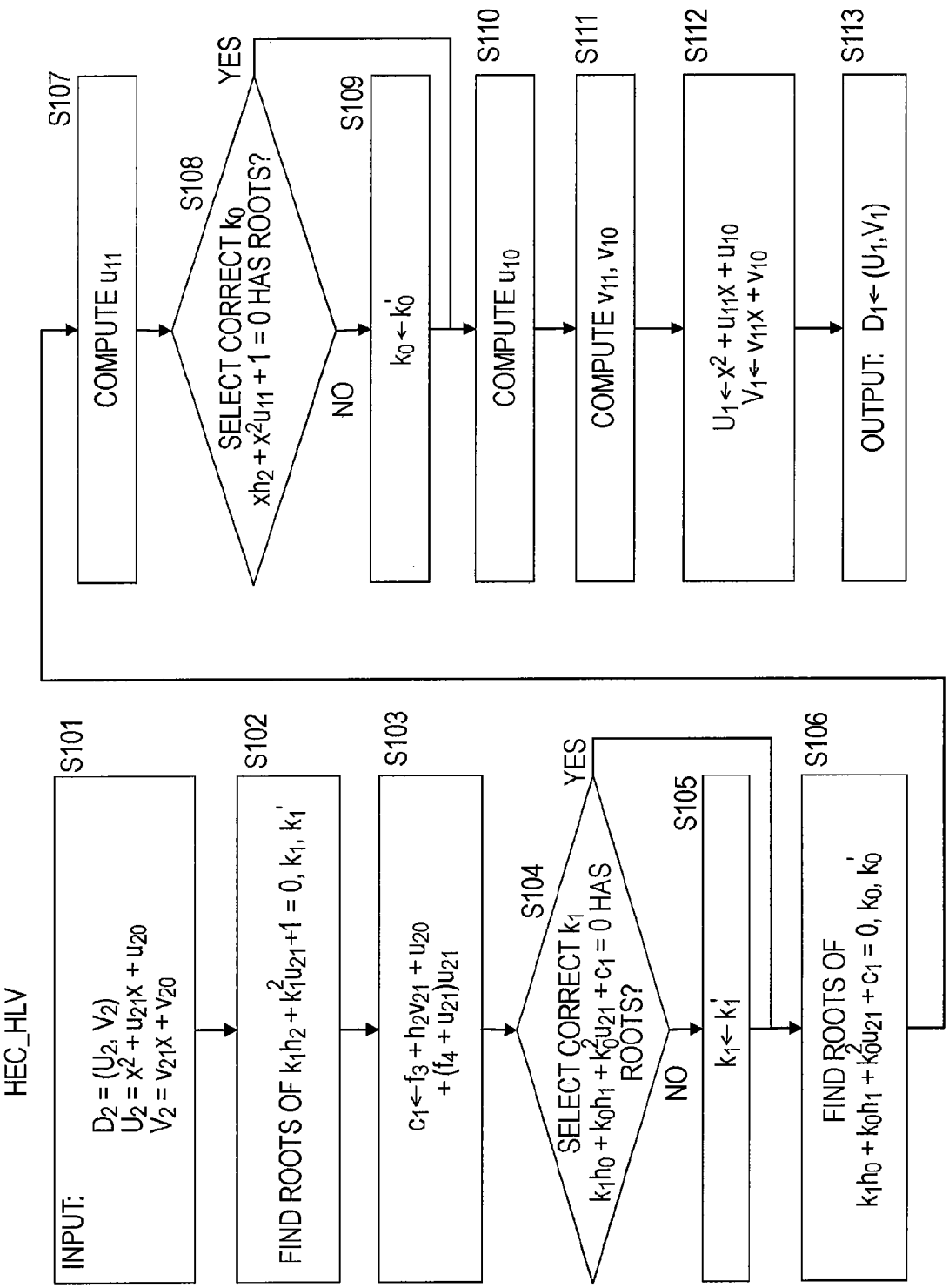
FIG. 3 is a flow chart illustrating the algorithm of HEC_HLV.

FIG. 3 is a flowchart showing the algorithm of HEC_HLV. In step S101, the inputs are defined as follows:

$$D_2 = (U_2, V_2);$$

$$U_2 = x^2 + u_{21}x + u_{20}; \text{ and}$$

$$V_2 = v_{21}x + v_{20}.$$

In step S102, the roots of $k_1 h_2 + k_1^2 u_{21} + 1 = 0$, $k_1$, $k_1'$ are found, and in step S103, $c_1 \leftarrow f_3 + h_2 v_{21} + u_{20} + (f_4 + u_{21}) u_{21}$ is set. In step S104, it is determined whether or not $k_1 h_0 + k_0 h_1 + k_0^2 u_{21} + c_1 = 0$ has roots. If it does not have roots, $k_1 \leftarrow k_1'$ is set in step S105, and if it has roots, the process advances to step S106 where the roots of $k_1 h_0 + k_0 h_1 + k_0^2 u_{21} + c_1 = 0$, $k_0$, $k_0'$ are found.

Next, the process advances to step S107 where $u_{11}$ is computed, and in step S108, it is determined whether or not $xh_2 + x^2 u_{11} + 1 = 0$ has roots. If it does not have roots, $k_0 \leftarrow k_0'$ is set in step S109, and if it has roots, the process advances to step S110 where $u_{10}$ is computed. Further, in step S111, $v_{11}$, $v_{10}$ are calculated, and in step S12, by setting as:

$$U_1 \leftarrow x_2 + u_{11}x + u_{10}; \text{ and}$$

$$V_1 \leftarrow v_{11}x + v_{10},$$

in step S113, the output $$D_1 \leftarrow (U_1, V_1)$$

is obtained.

The halving operation of a divisor is realized by the reverse operation of the algorithm for performing the doubling operation of a divisor, that is, Algorithm 1 [Algorithm 1 Harley DBL] below.

Algorithm 1 *HarleyDBL* [Formula 10]

Input: $D_1 = (U_1, V_1)$

Output: $D_2 = (U_2, V_2)$ $U_i(x) = x^2 + u_{i1}x + u_{i0}, V_i(x) = v_{i1}x + v_{i0}, \gcd(h, U_1) = 1$ 1. $U_1' \leftarrow U_1^2$
2. $S \leftarrow h^{-1}(f + hV_1 + V_1^2)/U_1 \bmod U_1$
3. $V_1' \leftarrow SU_1 + V_1$
4. $U_2' \leftarrow (f + hV_1' + V_1'^2)/U'$
5. $U_2 \leftarrow MakeMonic(U_2')$
6. $V_2 \leftarrow V_1' + h \bmod U_2$
7. return $D_2 = (U_2, V_2)$ In step 6 of Algorithm 1, there is a unique polynomial:

$$k(x) = k_1 x + k_0,$$

which satisfies:

$$V_1' + h = (k_1 x + k_0) U_2 + V_2.$$

This is transformed as follows.

$$V_1' = h + (k_1 x + k_0) U_2 + V_2.$$

Substituting this into the expression that appears in step 4, $$(f + hV_1' + V_1'^2),$$

results in the following:

$$U_2' U_1' = f + h(kU_2 + V_2) + k^2 U_2^2 + V_2^2 \quad \text{Expression (1)}.$$

In the above expression, since $(U_2, V_2)$ is known, from Expression (1), the relational expression between k and $U_1'$ can be obtained.

In this case, it is to be noted that $$U_2' = k_1^2 U_2.$$

The above equation (1) is expanded and rearranged to yield the following:

$$U_1' = x^4 + ((k_1 h_2 + k_1^2 u_{21} + 1)/k_1^2)x^3 + \quad \text{Expression (2)}$$
$$((k_1 h_1 + k_0 h_2 + k_1^2 u_{20} + k_0^2 + c_2)/k_1^2)x^2 +$$
$$((k_1 h_0 + k_0 h_1 + k_0^2 u_{21} + c_1)/k_1^2)x +$$
$$(k_0 h_0 + k_0^2 u_{20} + c_0)/k_1^2.$$

Here, $$c_2 = f_4 + u_{21},$$

$$c_1 = f_3 + h_2 v_{21} + u_{21} + c_2 u_{21}, \text{ and}$$

$$c_0 = f_2 + h_2 v_{20} + h_1 v_{21} + v_{21}^2 + c_2 u_{20} + c_1 u_{21}$$

are satisfied.

Further, from step 1, $$U_1' = U_1^2,$$

that is, the following expression holds:

$$U_1' = x^4 + u_{11}^2 x^2 + u_{10}^2 \quad \text{Expression (3)}$$

A relational expression is derived through comparison between the respective coefficients of Expressions (2) and (3) mentioned above, and halving operation can be computed by solving this relational expression. The algorithm prescribing the above-mentioned procedure is shown below as Algorithm 4 [Algorithm 4 Sketch HEC_HLV].

Algorithm 4 Sketch HEC_HLV [Formula 11]

Input: $D_2 = (U_2, V_2)$

Output: $D_1 = (U_1, V_1) = [1/2]D_2$ $U_i(x) = x^2 + u_{i1}x + u_{i0}, V_i(x) = v_{i1}x + v_{i0}, \gcd(h, U_1) = 1,$ $i = 1, 2$ 1. reconstruct $k_0, k_1$ 1.1 $V_1' \leftarrow V_2 + h + kU_2, k(x) = k_1 x + k_0$ 1.2 $U_1' \leftarrow (f + hV_1' + V_1'^2)/(k_1^2 U_2)$ 1.3 derive $k_0, k_1$ from $coeff(U_1', 3) = 0,$ $$coeff(U_1', 1) = 0$$

2. compute $u_{11}$ by substituting $k_0, k_1$ in $coeff(U_1', 2)$ 3. compute $u_{10}$ by substituting $k_0, k_1$ in $coeff(U_1', 0)$ -continued 4. $U_1 \leftarrow x^2 + u_{11}x + u_{10}$ 5. $V_1 \leftarrow V_2 + h + kU_2 \bmod U_1$ 6. return $D_1 = (U_1, V_1)$ Specifically, the following relational expressions can be obtained.

[Formula 12]

$$k_1 h_2 + k_1^2 u_{21} + 1 = 0 \qquad \text{Expression (4)}$$

$$k_1 h_0 + k_0 h_1 + k_0^2 u_{21} + c_1 = 0 \qquad \text{Expression (5)}$$

$$u_{11} = \sqrt{k_1 h_1 + k_0 h_2 + k_1^2 u_{20} + k_0^2 + c_2}/k_1 \qquad \text{Expression (6)}$$

$$u_{10} = \sqrt{k_0 h_0 + k_0^2 u_{20} + c_0}/k_1 \qquad \text{Expression (7)}$$

It is necessary to compute the correct values of $k_0$, $k_1$ from these relational expressions. This can be computed using the lemma as described below.

[Lemma 1]

It is assumed that that $h(x)$ is an irreducible polynomial. In this case, there is only one $k_1$ that satisfies the expressions (4) and (5). Further, the expression (5) has roots only for the correct $k_1$. Further, there is only one $k_0$ that allows the computation of the halved divisor $D_1$ in Algorithm 4. Further, the following expression:

$$xh_2 + x^2 u_{11} + 1 = 0$$

has roots only for the correct $k_0$.

The above-mentioned Lemma 1 was applied to Algorithm 4. The detailed computation method of halving is shown as Algorithm 5 [Algorithm 5 Sketch HEC_HLV] below.

[Expression 13]

Algorithm 5 HEC_HLV

Input: $D_2 = (U_2, V_2)$

Output: $D_1 = (U_1, V_1) = [1/2]D_2$ $U_i(x) = x^2 + u_{i1}x + u_{i0}$, $V_i(x) = v_{i1}x + v_{i0}$, $\gcd(h, U_i) = 1$, $i = 1, 2$ 1. Solve $k_1 h_2 + k_1^2 u_{21} + 1 = 0$ $\alpha \leftarrow h_2/u_{21}$, $\gamma \leftarrow 1/(u_{21}\alpha^2)/*1/(u_{21}\alpha^2) = u_{21}/h_2^2 */$ $k_1 \leftarrow H(\gamma)\alpha$, $k_1' \leftarrow k_1 + \alpha$ 2. Select correct $k_1$ by solving $k_1 h_0 + k_0 h_1 + k_0^2 u_{21} + c_1 = 0$ $c_2 \leftarrow f_4 + u_{21}$, $c_1 \leftarrow f_3 + h_2 v_{21} + u_{20} + c_2 u_{21}$ $c_0 \leftarrow f_2 + h_2 v_{20} + h_1 v_{21} + v_{21}^2 + c_2 u_{20} + c_1 u_{21}$ $\alpha \leftarrow h_1/u_{21}$, $\gamma \leftarrow (c_1 + k_1 h_0)/(u_{21}\alpha^2)$ if $Tr(\gamma) = 1$ then $k_1 \leftarrow k_1'$, $\gamma \leftarrow (c_1 + k_1 h_0)/(u_{21}\alpha^2)$ $k_0 \leftarrow H(\gamma)\alpha$, $k_1' \leftarrow k_1 + \alpha$ 3. Select correct $k_0$ by checking trace of $xh_2 + x^2 u_{11} + 1 = 0$ $u_{11} \leftarrow \sqrt{k_1 h_1 + k_0 h_2 + k_1^2 u_{20} + k_0^2 + c_2}/k_1$, $\gamma \leftarrow u_{11}/h_2^2$ if $Tr(\gamma) = 1$ then $k_0 \leftarrow k_0'$, $u_{11} \leftarrow \sqrt{k_1 h_1 + k_0 h_2 + k_1^2 u_{20} + k_0^2 + c_2}/k_1$ 4. Compute $U_1$ $u_{10} \leftarrow \sqrt{k_0 h_0 + k_0^2 u_{20} + c_0}/k_1$ -continued 5. Compute $V_1 = V_2 + h + kU_2 \bmod U_1$ $w \leftarrow h_2 + k_1 u_{21} + k_0 + k_1 u_{11}$ $v_{11} \leftarrow v_{21} + h_1 + k_1 u_{20} + k_0 u_{21} + u_{10} k_1 + u_{11} w$ $v_{10} \leftarrow v_{20} + h_0 + k_0 u_{20} + w$ 6. $U_1(x) \leftarrow x^2 + u_{11}x + u_{10}$, $V_1(x) \leftarrow v_{11}x + v_{10}$ 7. return $D_1 = (U_1, V_1)$ In Algorithm 5 [Algorithm 5] mentioned above, if $k_1'$, $k_0'$ are correct values (in other words, if $k_1$, $k_0$ are not correct values), the complexity of the algorithm is:

$32M + 5S + 6I + 3SR + 2H + 2T$.

Here, M, S, SR, H, and T mean multiplication, squaring, inversion, square root operation, half-trace (operation to find the root of a quadratic equation), and trace (determination as to whether roots exist for a quadratic equation), respectively. The complexity becomes the largest if these $k_1'$, $k_0'$ are correct values.

Next, if $k_1$, $k_0$ are correct values (in other words, if $k_1'$, $k_0'$ are not correct values), the complexity becomes the smallest, so the complexity can be reduced by 2M in step 2, and the complexity can be reduced by 2M+1SR in step 3. That is, the complexity in this case is $28M + 5S + 6I + 2SR + 2H + 2T$, and the complexity becomes the smallest.

Next, if $k_1$, $k_0'$ are correct values (in other words, if $k_1'$, $k_0$ are not correct values), the complexity can be reduced by 2M+1SR in step 3. That is, the complexity in this case becomes:

$30M + 5S + 6I + 2SR + 2H + 2T$.

Lastly, if $k_1'$, $k_0$ are correct values (in other words, if $k_1$, $k_0'$ are not correct values), the complexity can be reduced by 2M in step 2. That is, the complexity in this case becomes:

$30M + 5S + 6I + 3SR + 2H + 2T$.

Upon checking the probabilities with which the above-mentioned four cases occur by computer experiment, it was confirmed that they occur with substantially the same ratio. In the description that follows, it is assumed that the probabilities with which the above-mentioned four cases occur are substantially equal. The averaging of the complexities in the above-mentioned four cases yields $30M + 5S + 6I + 2.5SR + 2H + 2T$.

Next, the exceptional cases:

ExHEC_HLV$^{2 \to 1+1}$;

ExHEC_HLV$^{1 \to 2+2}$; and

ExHEC_HLV$^{2 \to 2+2}$ are considered. Since the probabilities with which these exceptional cases occur are so low as to be negligible, no evaluation on complexity will be made.

First, the algorithm of ExHEC_HLV$^{2 \to 1+1}$ will be described with reference to the flow of FIG. 4.

ExHEC_HLV$^{2\to1+1}$ is realized by a reverse operation of ExHarDBL$^{1+1\to2}$. Assuming that the input divisors for ExHarDBL$^{1+1\to2}$ are $$D_1=(U_1,V_1),\ U_1=x+u_{10},\ V_1=v_{10},$$

the output divisors:

$$D_2=(U_2,V_2)=2D_1,\ U_2=x^2+u_{20}x,\ V_2=v_{21}x+v_{20},$$

can be computed as follows:

$$U_2=x^2+u_{20}=(x+u_{10})^2,$$

$$v_{12}=(u_{10}^4+f_3u_{10}^2+f_1+h_1v_{10})/h(u_{10}),\text{ and}$$

$$v_{20}=v_{10}+v_{21}u_{10}.$$

Using these relational expressions, ExHEC_HLV$^{2\to1+1}$ is computed.

Figure 4:
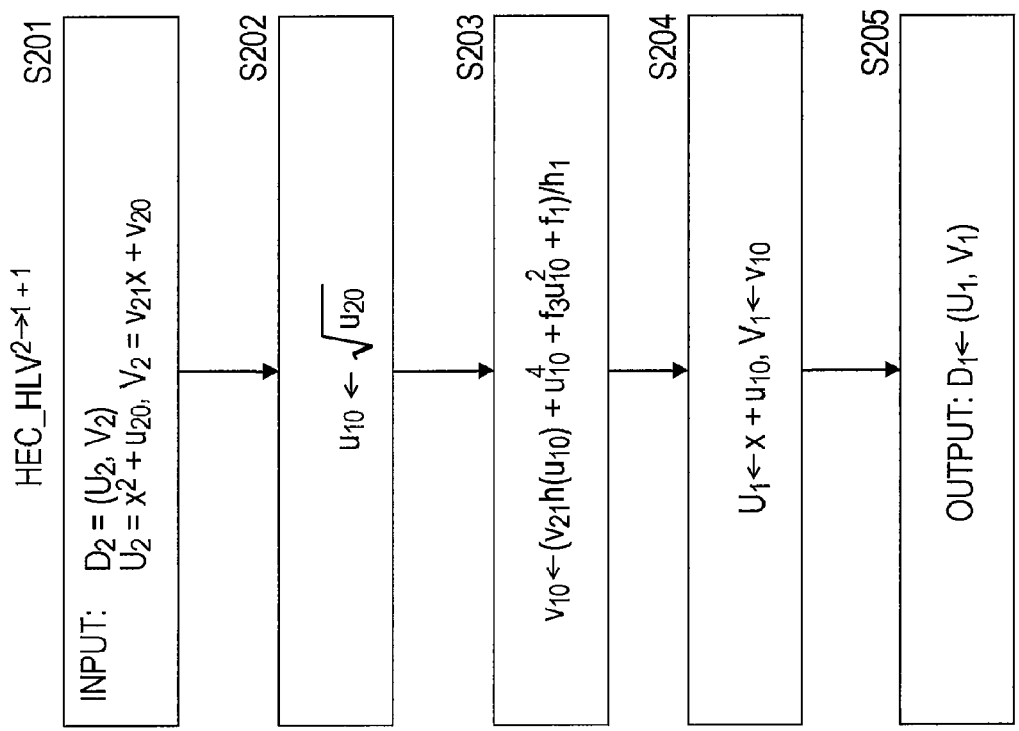
FIG. 4 is a flow chart illustrating the algorithm of HEC_HLV$^{2\rightarrow 1+1}$.

Let the input divisors be
$D_2=(U_2,V_2),\ U_2=x^2+u_{20}x,\ V_2=v_{21}x+v_{20}$ (flow of FIG. 4; step S201).
To obtain the output devisors $$D_1=(U_1,V_1)=[\tfrac{1}{2}]D_2,\ U_1=x+u_{10},\ V_1=v_{10},$$

in step S202, let $u_{10}=\sqrt{u_{20}}$, and
in step S203, let $v_{10}=(v_{21}(u_{10})+u_{10}^4+f_3u_{10}^2+f_1)/h_1$,
and in step S204, let $$U_1=x+u_{10},\ V_1=v_{10}.$$

Then, in step S205, the output divisor $$D_1=(U_1,V_1)$$

is obtained.

Next, the processing procedure for ExHEC_HLV$^{2\to2+2}$ will be described with reference to the flow of FIG. 5. In step S301, the input divisors are assumed to be $$D_2=(U_2,V_2),\ U_2=x^2+u_{20},\ V_2=v_{21}x+v_{20}.$$

In step S302, $k_1h_2+1=0$ is solved with respect to $k_1$ to yield $k_1\leftarrow 1/h_2$.
In step S303, let $$c_2\leftarrow f_4,\text{ and}$$

$$c_1\leftarrow f_3+h_2v_{21}+u_{20}+u_{21}c_2,$$

and in step S304,
$k_1h_0+k_0h_1=0$ is solved with respect to $k_0$ to give $k_0\leftarrow(k_1h_0+c_1)/h_1$.
Next, in step S305, $u_{11}$ is computed, and in step S306, it is determined whether or not $$xh_2+x^2u_{11}+1=0$$

has roots. If it does not has roots, in step S307, the output $D_1$ is determined (step S308) by $$D_1\leftarrow\text{HEC\_HLV}^{2\to1}(D_2)$$

On the other hand, if $$xh_2+x^2u_{11}+1=0$$

has roots, the process advances to step S309 where $u_{10}$ is computed, and further in step S310, $v_{11},v_{10}$ are computed. Then, in step S311, let $$U_1\leftarrow x^2+u_{11}x+u_{10},\text{ and}$$

$$V_1\leftarrow v_{11}x+v_{10},$$

and in step S312, the output $$D_1\leftarrow(U_1,V_1)$$

is obtained.

The processing of ExHEC_HLV$^{2\to2+2}$ is specifically carried out by the following procedure.

Supposing the input divisors are $$D_2=(U_2,V_2),\ U_2=x^2+u_{20},\ V_2=v_{21}x+v_{20},\text{ if}$$

$$U_2=x^2+u_{20},$$

that is, if the first order term of $U_2$ is 0, there are two output divisor candidates, which are represented as $$D_1=(x+\sqrt{u_{20}},V_2(\sqrt{u_{20}})),\text{ and}$$

$$D_1'=(x_2+u_{11}x+u_{10},v_{11}x+v_{10}).$$

If $D_1$ is correct, the computation is carried out using ExHEC_HLV$^{2\to1+1}$.

If $D_1$ is correct, the computation is carried out using ExHEC_HLV$^{2\to2+2}$.

The determination as to which of the algorithms is to be used is made on the basis of the following procedure.

1. assume that $D_1'$ is correct.

2. Compute $u_{11}$.

3. Compute the trace $\text{Tr}(h_2/u_{11}^2)$ of $xh_2+x^2u_{11}+1=0$. If $\text{Tr}(h_2/u_{11}^2)=0$, then $D_1'$ is correct, so computation is carried out using ExHEC_HLV$^{2\to2+2}$. Otherwise, that is, if $\text{Tr}(h_2/u_{11}^2)=1$, then $D_1$ is correct, so computation is carried out using ExHEC_HLV$^{2\to1+1}$.

The computation algorithm of ExHEC_HLV$^{2\to2+2}$ is shown below as Algorithm 6 [Algorithm 6].

Algorithm 6 ExHEC_HLV$^{2\to2+2}$ [Formula 14]

Input: $D_2 = (U_2, V_2) = (x^2 + u_{20}, v_{21}x + v_{20})$

Output: $D_1 = (U_1, V_1) = (x^2 + u_{11}x + u_{10},$ $$v_{11}x + v_{10}) = [1/2]D_2 gcd(h, U_i) = 1, i = 1, 2$$

1. Solve $k_1 h_2 + 1 = 0$ $k_1 \leftarrow 1/h_2$

2. Select correct $k_1$ by solving $k_1 h_0 +$ $$k_0 h_1 + k_0^2 + c_1 = 0$$

$c_2 \leftarrow f_4,\ c_1 \leftarrow f_3 + h_2 v_{21} + u_{20} + c_2 u_{21}$ $c_0 \leftarrow f_2 + h_2 v_{20} + (h_1 + v_{21})v_{21} + c_2 u_{20} + c_1 u_{21}$ $k_0 \leftarrow (k_1 h_0 + c_1)/h_1$ 3. Select correct algorithm by checking trace of $xh_2 +$ $$x^2 u_{11} + 1 = 0$$

$u_{11} \leftarrow \sqrt{k_1 h_1 + k_0 h_2 + k_1^2 u_{20} + k_0^2 + c_2}\ /k_1,\ \gamma \leftarrow u_{11}/h_2^2$ if $Tr(\gamma) = 1$ then $D_1 \leftarrow \text{ExHEC\_HLV}^{2\to l+1}(D_2)$, return $D_1$ 4. Compute $U_1$ $u_{10} \leftarrow \sqrt{k_0 h_0 + k_0^2 u_{20} + c_0}\ /k_1$ -continued 5. Compute $V_1 = V_2 + h + kU_2 \bmod U_1$ $w \leftarrow h_2 + k_1$ $v_{11} \leftarrow h_1 + k_1 u_{20} + k_0 + u_{11} w$ $v_{10} \leftarrow v_{20} + h_0 + k_0 u_{20} + u_{10} w$ 6. $U_1(x) \leftarrow x^2 + u_{11}x + u_{10}, V_1(x) \leftarrow v_{11}x + v_{10}$ 7. return $D_1 = (U_1, V_1)$ Next, the processing procedure for ExHEC_HLV$^{1\to 2+2}$ will be described with reference to the flow of FIG. 6. In step S401, the input divisors are assumed to be $D_2 = (U_2, V_2)$;

$U_2 = x + u_{20}$; and $V_2 = v_{20}$.

In step S402, let $c_3 \leftarrow (f_4 + u_{20})$, and in step S403, the root of $k_1 h_2 + k_1^2 u_{21} + c_3 = 0$, $k_1$, $k_1'$ are found, and in step S404, let $c_1 \leftarrow f_3 + c_3 u_{20}$, and $c_1 \leftarrow f_2 + h_2 v_{20} + c_2 u_{20}$, and in step S405, it is determined whether or not $k_1 h_0 + k_0 h_1 + k_0^2 + c_1 = 0$ has roots. If it does not have roots, the process advances to step S407 after $k_1 \leftarrow k_1'$ is set in step S406, and if it has roots, the process advances to step S407 as it is.

In step S407, the roots of $k_1 h_0 + k_0 h_1 + k_0^2 + c_1 = 0$, $k_0$, $k_0'$ are found. Then, the process advances to step S408 where $u_{11}$ is computed, and in step S409, it is determined whether or not $xh_2 + x^2 u_{11} + 1 = 0$ has roots. If it does not have roots, the process advances to step S411 after $k_0 \leftarrow k_0'$ is set in step S410, and if it has roots, the process advances to step S411 as it is, and $u_{10}$ is computed. Further, in step S412, $v_{11}$, $v_{10}$ are computed. In step S413, let $U_1 \leftarrow x^2 + u_{11}x + u_{10}$, and $V_1 \leftarrow v_{11}x + v_{10}$, and in step S414, the output $D_1 \leftarrow (U_1, V_1)$ is obtained.

While the computation procedure for ExHEC_HLV$^{1\to 2+2}$ is similar to that for HEC_HLV, a large difference resides in the weight of the input divisor. $f + hV_1' + V_1'^2$ of ExHEC_HLV$^{1\to 2+2}$ thus becomes a quintic monic polynomial. Hence, unlike in the case of HEC_HLV, $U_1' \leftarrow (f + hV_1' + V_1'^2)/U_2$ is not divided by $k_1^2$. The computation algorithm of ExHEC_HLV$^{1\to 2+2}$ is shown below as [Algorithm 7].

Algorithm 7 ExHEC_HLV$^{1\to 2+2}$ [Formula 15]

Input: $D_2 = (U_2, V_2) = (x + u_{20}, v_{20})$

Output $D_1 =$ $(U_1, V_1) = (x^2 + u_{11}x + u_{10}, v_{11}x + v_{10}) = [1/2]D_2$ $\gcd(h, U_i) = 1, i = 1, 2$ -continued 1. Solve $k_1 h_2 + k_1^2 u_{21} + c_3 = 0$ $c_3 \leftarrow f_4 + u_{20}, \alpha \leftarrow h_2, \gamma \leftarrow c_3/(u_{21}\alpha^2)$ $k_1 \leftarrow H(\gamma)\alpha, k_1' \leftarrow k_1 + \alpha$ 2. Select correct $k_1$ by solving $k_1 h_0 +$ $k_0 h_1 + k_0^2 + c_1 = 0$ $c_2 \leftarrow f_3 + c_3 u_{20}, c_1 \leftarrow f_2 + h_2 v_{20} + c_2 u_{20}$, $c_0 \leftarrow f_1 + h_1 v_{20} + c_1 u_{20}$ $\alpha \leftarrow h_1, \gamma \leftarrow (c_1 + k_1 h_0)/\alpha^2$ if $Tr(\gamma) = 1$ then $k_1 \leftarrow k_1', \gamma \leftarrow (c_1 + k_1 h_0)/\alpha^2$ $k_o \leftarrow H(\gamma)\alpha, k_1' \leftarrow k_1 + \alpha$ 3. Select correct $k_0$ by checking trace of $xh_2 +$ $x^2 u_{11} + 1 = 0$ $u_{11} \leftarrow \sqrt{k_1 h_1 + k_0 h_2 + k_1^2 u_{20} + c_2}$, $\gamma \leftarrow u_{11}/h_2^2$ if $Tr(\gamma) = 1$ then $k_0 \leftarrow k_0', u_{11} \leftarrow \sqrt{k_1 h_1 + k_0 h_2 + k_1^2 u_{20} + c_2}$ 4. Compute $U_1$ $u_{10} \leftarrow \sqrt{k_0 h_0 + k_0^2 u_{20} + c_0}$ 5. Compute $V_1 = V_2 + h + kU_2 \bmod U_1$ $w \leftarrow h_2 + k_1$ $v_{11} \leftarrow h_1 + k_1 u_{20} + k_0 + u_{11} w$ $v_{10} \leftarrow v_{20} + h_0 + k_0 u_{20} + u_{10} w$ 6. $U_1(x) \leftarrow x^2 + u_{11}x + u_{10}, V_1(x) \leftarrow v_{11}x + v_{10}$ 7. return $D_1 = (U_1, V_1)$ Processing Example 2

Proposed Method F1

Processing Example 2 (Proposed Method F1) relates to a method of computing the halving of a divisor D on a hyperelliptic curve of genus 2 in characteristic 2 with parameters $h(x) = x^2 + h_1 x + h_0$, $f_4 = 0$.

A close look at Algorithm 5 will reveal that Algorithm 5 contains a large number of multiplication operations by a coefficient $h(x)$ and inversion operations of the coefficient $h(x)$. This means that the complexities of multiplications and inversion operations can be reduced by manipulating the coefficient $h(x)$. It should be noted that according to the document (Non-patent Document 19: T. Lange. Efficient Doubling on Genus Two Curves over Binary Fields, SAC 2004, pre-proceedings, pp. 189-202, 2004.), $h_2 = 1$, $f_4 = 0$ are used to achieve fast computation. The complexity of Harley-DBL in the case where these parameters are used is 21M+5S+1I.

While the conditions for Processing Example 2 (Proposed Method F1) described here are also set in conformity with those mentioned above, since an irreducible polynomial is assumed for $h(x)$ due to Lemma 1, $h(x) = x^2 + h_1 x + h_0$, and $Tr(h_0/h_1^2) = 1$ are assumed (the necessary and sufficient condition for the quadratic equation $ax^2 + bx + c = 0$ to be an irreducible polynomial is $Tr(ac/b^2)=1$). The computation method in this case is shown in Algorithm 8 [Algorithm 8] HEC_HLV($h_2=1$, $f_4=0$).

Algorithm 8 HEC_HLV ($h_2 = 1$, $f_4 = 0$)    [Formula 16]

Input: $D_2 = (U_2, V_2)$, $invu = 1/u_{21}, 1/h_1^2$

Output: $D_1 = (U_1, V_1) = [1/2]D_2$, $invu = 1/u_{11}$ $U_i(x) = x^2 + u_{i1}x + u_{i0}$, $V_i(x) = v_{i1}x + v_{i0}$, $gcd(h, U_i) = 1$, $i = 1, 2$ 1. Solve $k_1 + k_1^2 u_{21} + 1 = 0$ $\alpha \leftarrow invu$, $k_1 \leftarrow H(u_{21})\alpha$, $k_1' \leftarrow k_1 + \alpha$ 2. Select correct $k_1$ by solving $k_1 h_0 +$ $k_0 h_1 + k_0^2 u_{21} + c_1 = 0$ $c_1 \leftarrow f_3 + v_{21} + u_{20} + u_{21}^2$ $c_0 \leftarrow f_2 + v_{20} + v_{21}(h_1 + v_{21}) + u_{21}(u_{20} + c_1)$ $w_0 \leftarrow u_{21}/h_1^2$, $\alpha \leftarrow h_1 \alpha$, $\gamma \leftarrow (c_1 + k_1 h_0)w_0$ if $Tr(\gamma) = 1$ then $k_1 \leftarrow k_1'$, $\gamma \leftarrow (c_1 + k_1 h_0)w_0$ $k_0 \leftarrow H(\gamma)\alpha$, $k_0' \leftarrow k_0 + \alpha$ 3. Select correct $k_0$ by checking trace of $x +$ $x^2 u_{11} + 1 = 0$ $w_0 \leftarrow k_1^2$, $w_1 \leftarrow w_0 u_{20} + k_1 h_1 + u_{21}$ $w_2 \leftarrow k_0 + \sqrt{w_1 + k_0}$, $w_3 \leftarrow k_0' + \sqrt{w_1 + k_0'}$, $w_4 \leftarrow w_2 w_3$ $w_1 \leftarrow 1/(w_4 k_1)$, $w_4 \leftarrow w_1 w_4$, $u_{11} \leftarrow w_2 w_4$ if $Tr(\gamma) = 1$ then $k_0 \leftarrow k_0'$, $u_{11} \leftarrow w_3 w_4$, $w_2 \leftrightarrow w_3$ $invu \leftarrow w_0 w_1 w_3$ 4. Compute $U_1$ $w_1 \leftarrow k_0 u_{20}$, $w_5 \leftarrow k_1 u_{21}$, $w_6 \leftarrow (k_0 + k_1)(u_{20} + u_{21})$ $u_{10} \leftarrow w_4 \sqrt{k_0(w_1 + h_0) + c_0}$ 5. Compute $V_1 = V_2 + h + kU_2 \bmod U_1$ $w_4 \leftarrow w_5 + k_0 + 1$, $w_5 \leftarrow w_1 + w_5 + w_6 + v_{21} + h_1$ $w_6 \leftarrow w_1 + v_{20} + h_0$, $w_7 \leftarrow k_1 u_{11} + w_4$ $w_1 \leftarrow w_7 u_{10}$, $w_3 \leftarrow (k_1 + w_7)(u_{10} + u_{11})$ $v_{11} \leftarrow w_1 + w_3 + w_4 + w_5 + w_7$ $v_{10} \leftarrow w_1 + w_6$ 6. $U_1(x) \leftarrow x^2 + u_{11}x + u_{10}$, $V_1(x) \leftarrow v_{11}x + v_{10}$ 7. return $D_1 = (U_1, V_1)$, $invu$ Further, in order to eliminate the number of inversion operations, a technique called Montgomery trick is used. According to this technique, for example, when it is desired to find the inverse of three finite field elements a, b, and c, first, the product of the three elements is found, and the inverse of this is found as w=1/(a*b*c) or the like. Then, to find the inverse of a, w*b*c is computed. For the inverses of b, c, likewise, w*a*c and w*a*b are computed, respectively.

Typically, the complexity of an inversion is several times higher than that of a multiplication (as will be described later, the results of software implementation indicate that complexity of an inversion found is about 8 times higher than that of a multiplication). Accordingly, to find the inverse of three elements, for example, if inversion operation is carried out three times in a straightforward fashion, assuming that I=8M, the resulting complexity is 24M. Conversely, if the above-mentioned Montgomery trick is used, the resulting complexity becomes I+8M=16M, thus enabling faster computation that three inversion operations.

According to Processing Example 2 (Proposed Method F1) being described, the inverse of $u_{11}$ is found using this Montgomery trick. The inverse of $u_{11}$ is given as an input for the next halving operation. Accordingly, Algorithm 8 allows computation of $[1/2^i]D$, and when performing the scalar multiplication of the divisor D, Algorithm 8 can be applied to the right-to-left method, that is, a method in which $[1/2^i]D$ is added. The scalar multiplication using halving operation will be described later. Further, the complexity required at this time is as follows.

(a) If $k_1$, $k_0$ are correct values: 24M+2S+1I+3SR+2H+2T
(b) If $k_1$, $k_0'$ are correct values: 26M+2S+1I+3SR+2H+2T
(c) If $k_1'$, $k_0$ are correct values: 25M+2S+1I+3SR+2H+2T
(d) If $k_1'$, $k_0'$ are correct values: 27M+2S+1I+3SR+2H+2T The averaging of all of the above-mentioned cases (a) to (d) yields 25.5 M+2S+1I+3SR+2H+2T.

The complexity of HarleyDBL was 21M+5S+1I. Here, according to the document [(Non-patent Document 15) E. Knudsen. Elliptic Scalar Multiplication Using Point Halving. ASIACRYPTO '99, LNCS 1716, pp. 135-149, Springer-Verlag, 1999.], it is known that when a finite field is defined by a normal basis, the complexities of S (squaring), SR (square root operation), H (half-trace (operation to find the root of a quadratic equation)), and T (trace (determination as to whether roots exist for a quadratic equation)) can be ignored, and only the complexities of M (multiplication) and I (inversion) need to be taken into account. Therefore, when using a normal basis, Algorithm 8 is slower than that of HarleyDBL by 4.5M.

Further, when a finite field is defined by a polynomial basis, according to the document [(Non-patent Document 16) K. Fong, D. Hankerson, J. Lopez, and A. Menezes. Field inversion operation and point halving revised. Technical Report CORR2003-18, www.cacr.math.uwaterloo.ca/techreports/2003/corr2003-18.pdf18], it is known that in comparison to the complexity of M (multiplication), generally, the complexities of SR (square root operation) and H (half-trace) (operation to find the root of a quadratic equation)) are about SR=H=0.5M. Further, the complexity of T (trace (determination as to whether roots exist for a quadratic equation)) can be ignored. Further, the complexity of S (squaring) is known to be only about several tenths of M (multiplication). However, it is also known that depending on the way in which the polynomial basis is chosen, the complexity of SR may become less than 0.5M. It should be noted that exceptional cases can be computed on the basis of the exceptional cases in Processing Example 1 (proposed Method A1) described above.

Processing Example 3

Proposed Method B1

Processing Example 3 (Proposed Method B1) relates to a method of computing the halving of a divisor D on a hyperelliptic curve of genus 2 in characteristic 2 with parameters $h(x)=x^2+x+h_0$, $f_4=0$.

As has been described with reference to Processing Example 2 (Proposed Method F1) mentioned above, a close look at the computation algorithm for halving described with reference to Processing Example 1 (Proposed Method A1), that is, Algorithm 5 [Algorithm 5 HEC_HLV] will reveal that Algorithm 5 contains a large number of multiplication operations by a coefficient h(x) and inversion operations of the coefficient h(x). This means that the complexities of multiplications and inversion operations can be reduced by manipulating the coefficient h(x). In the document [J. Pelzl, T. Wollinger, J. Guajardo, and C. Paar. Hyperelliptic curve Cryptosystems: Closing the Performance Gap to Elliptic Curves. Cryptology ePrint Archive, 2003/026, IACR, 2003], there is disclosed an example in which $h_2$, $h_1 \in \{0, 1\}$, $f_4=0$ is used to achieve fast computation.

The complexity of HarleyDBL in the case where these parameters are used is $18M+7S+1I$.

While the conditions for Processing Example 3 (Proposed Method B1) are also set in conformity with those mentioned above, since an irreducible polynomial is assumed for h(x) due to Lemma 1 mentioned above, $h(x)=x^2+x+h_0$, and $Tr(h_0)=1$ are set (the necessary and sufficient condition for the quadratic equation $ax^2+bx+c=0$ to be an irreducible polynomial is $Tr(ac/b^2)=1$).

The computation method in this case is shown below as Algorithm 10 [Algorithm 10 HEC_HLV($h_2=h_1=1$, $f_4=0$).

Algorithm 10 HEC_HLV($h_2 = h_1 = 1$, $f_4 = 0$)  [Formula 17]

Input: $D_2 = (U_2, V_2)$, $invu = 1/u_{21}$

Output: $D_1 = (U_1, V_1) = [1/2]D_2$, $invu = 1/u_{11}$ $U_i(x) = x^2 + u_{i1}x + u_{i0}$, $V_i(x) = v_{i1}x + v_{i0}$, $gcd(h, U_i) = 1$, $i = 1, 2$ 1. Solve $k_1 + k_1^2 u_{21} + 1 = 0$ $\alpha \leftarrow invu$, $k_1 \leftarrow H(u_{21})\alpha$, $k_1' \leftarrow k_1 + \alpha$ 2. Select correct $k_1$ by solving $k_1 h_0 +$ $k_0 + k_0^2 u_{21} + c_1 = 0$ $c_1 \leftarrow f_3 + v_{21} + u_{20} + u_{21}^2$ $c_0 \leftarrow f_2 + v_{20} + v_{21} + v_{21}^2 + u_{21}(u_{20} + c_1)$ $\gamma \leftarrow (c_1 + k_1 h_0)u_{21}$ if $Tr(\gamma) = 1$ then $k_1 \leftarrow k_1'$, $\gamma \leftarrow \gamma + h_0$ $k_0 \leftarrow H(\gamma)\alpha$, $k_0' \leftarrow k_0 + \alpha$ 3. Select correct $k_0$ by checking trace of $x +$ $x^2 u_{11} + 1 = 0$ $w_0 \leftarrow k_1^2$, $w_1 \leftarrow w_0 u_{20} + k_1 + u_{21}$ $w_2 \leftarrow k_0 + \sqrt{w_1 + k_0}$, $w_3 \leftarrow k_0' + \sqrt{w_1 + k_0'}$, $w_4 \leftarrow w_2 w_3$ $w_1 \leftarrow 1/(w_4 k_1)$, $w_4 \leftarrow w_1 w_4$, $u_{11} \leftarrow w_2 w_4$ if $Tr(u_{11}) = 1$ then $k_0 \leftarrow k_0'$, $u_{11} \leftarrow w_3 w_4$, $w_2 \leftrightarrow w_3$ -continued 4. Compute $U_1$ $w_0 \leftarrow w_0 w_1$, $w_1 \leftarrow k_0 u_{20}$, $w_5 \leftarrow k_1 u_{21}$, $w_6 \leftarrow (k_0 + k_1)(u_{20} + u_{21})$ $u_{10} \leftarrow w_4 \sqrt{k_0(w_1 + h_0) + c_0}$ 5. Compute $V_1 = V_2 + h + kU_2 \mod U_1$ $w_4 \leftarrow w_5 + k_0 + 1$, $w_5 \leftarrow w_1 + w_5 + w_6 + v_{21} + 1$, $w_6 \leftarrow w_1 + v_{20} + h_0$ $invu \leftarrow w_0 w_3$ $w_0 \leftarrow w_2 + w_4$, $w_1 \leftarrow w_0 u_{10}$, $w_3 \leftarrow (k_0 + k_1)(u_{10} + u_{11})$ $v_{10} \leftarrow w_1 + w_2 + w_3 + w_5$ $v_{11} \leftarrow w_1 + w_6$ 6. $U_1(x) \leftarrow x^2 + u_{11}x + u_{10}$, $V_1(x) \leftarrow v_{11}x + v_{10}$ 7. return $D_1 = (U_1, V_1)$, $invu$ Further, in order to eliminate the number of inversion operations, as in Processing Example 2 (Proposed Method F1) described above, the Montgomery trick is used to find the inverse of $u_{11}$. The inverse of $u_{11}$ will be given an input for the next halving operation.

The complexity according to this processing example is as follows.

(a) If $k_1$, $k_0$ are correct values: 19M+3S+1I+3SR+2H+2T
(b) If $k_1$, $k_0$' are correct values: 20M+3S+1I+3SR+2H+2T
(c) If $k_1$', $k_0$ are correct values: 19M+3S+1I+3SR+2H+2T
(d) If $k_1$', $k_0$' are correct values: 20M+3S+1I+3SR+2H+2T The averaging of all of the above-mentioned cases (a) to (d) yields $19.5M+3S+1I+3SR+2H+2T$.

The complexity of HarleyDBL was 18M+7S+1I. Here, as described above, according to the document [(Non-patent Document 15) E. Knudsen. Elliptic Scalar Multiplication Using Point Halving. ASIACRYPTO '99, LNCS 1716, pp. 135-149, Springer-Verlag, 1999.], it is known that when a finite field is defined by a normal basis, the complexities of S (squaring), SR (square root operation), H (half-trace) (operation to find the root of a quadratic equation)), and T (trace (determination as to whether roots exist for a quadratic equation)) can be ignored, and only the complexities of M (multiplication) and I (inversion) need to be taken into account.

Therefore, when using a normal basis, Algorithm 10 [Algorithm 10] described above is slower than the conventional algorithm [HarleyDBL] by 1.5M. Further, when a finite field is defined by a polynomial basis, according to the document [K. Fong, D. Hankerson, J. Lopez, and A. Menezes. Field inversion operation and point halving revised. Technical Report CORR2003-18, www.cacr.math.uwaterloo.ca/techreports/2003/corr2003-18.pdf18], it is known that generally, the complexities of SR and H are about SR=H=0.5M. Further, the complexity of T can be ignored. Further, it is known that the complexity of S is only about several tenths of M. However, it is also known that depending on the way in which the polynomial basis is chosen, the complexity of SR may become less than 0.5M.

The curve of Algorithm 10 [Algorithm 10] mentioned above is also subject to the constraint $h_0=1$. Since Algorithm 10 [Algorithm 10] mentioned above involves one multiplication operation of $h_0$, by setting as $h_0=1$, the complexity can be reduced by 1M. The complexity found by the averaging of all of the above-mentioned cases (a) to (d) is 18.5$M$+3$S$+1$I$+3$SR$+2$H$+2$T$.

On the other hand, the complexity of HarleyDBL is

15$M$+7$S$+1$I$.

It should be noted that exceptional cases can be computed on the basis of the exceptional cases in Processing Example 1 (proposed Method A1) described above.

Processing Example 4

Proposed Method E1

Processing Example 4 (Proposed Method E1) relates to a method of computing the halving of a divisor D on a hyperelliptic curve of genus 2 in characteristic 2 with a parameter h(x)=x.

As in Processing Case 3 (proposed Method B1), in Algorithm 5, by setting as h(x)=x, the complexity of the multiplication and inversion operations of elements on a finite field required for the halving operation of a divisor can be reduced. As a specific example, the algorithm in the case where f(x)=$x^5$+$f_1$x+$f_0$ is shown below as Algorithm 12 (Algorithm 12).

Algorithm 12 HEC_HLV($h(x) = x$, $f(x) = x^5 + f_1 x + f_0$)     [Formula 18]

Input: $D_2 = (U_2, V_2)$

Output: $D_1 = (U_1, V_1) = [1/2]D_2$ $U_i(x) = x^2 + u_{i1}x + u_{i0}$,
$V_i(x) = v_{i1}x + v_{i0}$,
$\gcd(h, U_i) = 1, i = 1, 2$ 1. Solve $k_1^2 u_{21} + 1 = 0$ $w_0 \leftarrow 1/u_{21}, k_1 \leftarrow \sqrt{w_0}$ 2. Solve $k_0 + k_0^2 u_{21} + c_1 = 0$ $c_1 \leftarrow u_{20} + u_{21}^2, w_1 \leftarrow c_1 u_{21}$ $c_0 \leftarrow v_{21} + v_{21}^2 + u_{21}u_{20} + w_1$ $invk_1 \leftarrow \sqrt{u_{21}}, w_2 \leftarrow H(w_1), w_3 \leftarrow w_2 + 1$ $k_0 \leftarrow w_0 w_2, k_0' \leftarrow k_0 + w_0$ 3. Compute $U_1$ $u_{11} \leftarrow \sqrt{invk_1 + k_0}, u_{10} \leftarrow \sqrt{(k_0 + c_1)u_{20} + c_0 u_{21}}$ if $Tr(u_{11}(u_{10} + invk_1 + k_0)) = 1$ then $k_0 \leftarrow k_0', w_2 \leftarrow w_3$, $u_{11} \leftarrow u_{11} + k_1, u_{10} \leftarrow u_{10} + \sqrt{w_0 + u_{20}}$ 4. Compute $V_1 = V_2 + h + kU_2 \bmod U_1$ $w_1 \leftarrow k_1(u_{21} + u_{11}) + k_0$ $v_{11} \leftarrow k_1(u_{20} + u_{10}) + w_2 + v_{21} + 1 + u_{11}w_1$ $v_{10} \leftarrow k_0 u_{20} + v_{20} + u_{10} w_1$ 5. $U_1(x) \leftarrow x^2 + u_{11}x + u_{10}, V_1(x) \leftarrow v_{11}x + v_{10}$ 6. return $D_1 = (U_1, V_1)$ As in Processing Example 3 (Proposed Method B1), the complexity of Algorithm 12 (Algorithm 12) mentioned above is evaluated. Unlike Processing Example 3 (Proposed Method B1), in the case of a hyperelliptic curve of the type where h(x)=x, since $k_1$ is uniquely determined in step 1, there is only a selection step for $k_0$ (step 3). The best case with the lowest complexity occurs when Trace in the if sentence in step 3 is 0, and the worst case occurs when Trace is 1. Since the both occur with the same probability, the average complexity is:

11.5$M$+2$S$+1$I$+4.5$SR$+1$H$+1$T$.

This complexity is lower than that of Processing Example 3 described above, and thus fast computation is realized. It should be noted that exceptional cases can be computed on the basis of the exceptional cases in Processing Example 1 (proposed Method A1) described above.

Processing Example 5

Proposed Method C1

Processing Example 5 (Proposed Method C1) relates to the method as described below. That is, when computing the halving of a divisor D on a hyperelliptic curve of genus 2 in characteristic 2 with random parameters, a hyperelliptic curve of genus 2 in characteristic 2 with parameters h(x)=$x^2$+$h_1$x+$h_0$, $f_4$=0, and a hyperelliptic curve of genus 2 in characteristic 2 with parameters h(x)=$x^2$+x+$h_0$, $f_4$=0, two candidates of the halved value arise. In this case, it is necessary to select the one with the correct value from the two candidates. When selecting the correct one, it is necessary to compute the trace, multiplication, and square root of a finite field. Which one of the two candidates is correct depends on the divisor D. Hence, if the divisor D is fixed, information as to which one of the two candidates is correct is retained in a table in advance, and this table is looked up when selecting the correct value, thereby omitting the above-mentioned extra computations.

Which one of $k_1$, $k_1'$ ($k_0$, $k_0'$) is correct depends on the input divisor D. Accordingly, if D is fixed, for example, when the base point is previously determined as in the case of Phase 1 of ECDH key exchange, ECDSA signature generation or verification, or the like, [$\frac{1}{2}^i$]D is computed and information as to which of $k_1$, $k_1'$ ($k_0$, $k_0'$) is correct is recorded in a table in advance.

For example, two tables $T_1$, $T_0$ of the same bit size as the order of the base point are prepared, and the binary expression of these tables is represented as:

$T_1 = (t_{1,r-1}, \cdots, t_{1,0})$, and $T_0 = (t_{0,r-1}, \cdots, t_{0,0})$.

When finding [$\frac{1}{2}^i$]D, if such information that if $k_1$ is correct, then $t_{1,i}$=0 or else if $k_1'$ is correct, then $t_{1,i}$=1; and if $k_0$ is correct, then $t_{1,i}$=0 or else if $k_0'$ is correct, then $t_{0,i}$=1, is stored in the tables, a bit string only about twice the size of the order of the base point suffices as the table size. By looking up these tables, the complexity of halving can be reduced.

The above-mentioned method as applied to Algorithm 8 [Algorithm 8] HEC_HLV($h_2$=1, $f_4$=0) is represented as Algorithm 9 [Algorithm 9] HEC_HLV($h_1$=1, $f_4$=0, with table-lookup). The complexity of the algorithm is 22$M$+2$SR$+1$I$+2$SR$+2$H$.

Algorithm 9 HEC_HLV($h_2 = 1, f_4 = 0$, table-lookup)     [Formula 19]

Input: $D_2 = (U_2, V_2), invu = 1/u_{21}, 1/h_1^2, t_0, t_1$

Output: $D_1 = (U_1, V_1) = [1/2]D_2, invu = 1/u_{11}$

-continued $U_i(x) = x^2 + u_{i1}x + u_{i0},$ $V_i(x) = v_{i1}x + v_{i0},$ $\gcd(h, U_i) = 1, i = 1, 2$ 1. Solve $k_1 + k_1^2 u_{21} + 1 = 0$ if $t_1 = 0$ then $k_1 \leftarrow H(u_{21})invu$ else $k_1 \leftarrow H(u_{21})invu + invu$ 2. Solve $k_1 h_0 + k_0 h_1 + k_0^2 u_{21} + c_1 = 0$ $c_1 \leftarrow f_3 + v_{21} + u_{20} + u_{21}^2$ $c_0 \leftarrow f_2 + v_{20} + v_{21}(h_1 + v_{21}) + u_{21}(u_{20} + c_1)$ $\alpha \leftarrow h_1 invu, \gamma \leftarrow (c_1 + k_1 h_0)u_{21}/h_1^2$ if $t_0 = 0$ then $k_0 \leftarrow H(\gamma)\alpha$ else $k_0 \leftarrow H(\gamma)\alpha + \alpha$ 3. Compute $U_1$ $w_0 \leftarrow k_1^2, w_1 \leftarrow w_0 u_{20} + k_1 h_1 + u_{21}, w_2 \leftarrow k_0 + \sqrt{w_1 + k_0}$ $w_1 \leftarrow 1/(w_2 k_1), w_3 \leftarrow w_1 w_2$ $u_{11} \leftarrow w_2 w_3, invu \leftarrow w_0 w_1$ $w_1 \leftarrow k_0 u_{20}, w_5 \leftarrow k_1 u_{21}, w_6 \leftarrow (k_0 + k_1)(u_{20} + u_{21})$ $u_{10} \leftarrow w_3 \sqrt{k_0(w_1 + h_0) + c_0}$ 4. Compute $V_1 = V_2 + h + kU_2 \bmod U_1$ $w_4 \leftarrow w_5 + k_0 + 1, w_5 \leftarrow w_1 + w_5 + w_6 + v_{21} + h_1$ $w_6 \leftarrow w_1 + v_{20} + h_0, w_7 \leftarrow k_1 u_{11} + w_4$ $w_3 \leftarrow (k_1 + w_7)(u_{10} + u_{11}), w_1 \leftarrow w_7 u_{10}$ $v_{11} \leftarrow w_1 + w_3 + w_4 + w_5 + w_7$ $v_{10} \leftarrow w_1 + w_6$ 5. $U_1(x) \leftarrow x^2 + u_{11}x + u_{10}, V_1(x) \leftarrow v_{11}x + v_{10}$ 6. return $D_1 = (U_1, V_1)$, $invu$ Specifically, the above-mentioned method as applied to Algorithm 10 [Algorithm 10 HEC_HLV($h_2=h_1=1$, $f_4=0$)] described above is represented as Algorithm 11 [Algorithm 11 HEC_HLV($h_2=h_1=1$, $f_4=0$, with table-lookup) below.

Algorithm 11 HEC_HLV $\begin{pmatrix} h_2 = h_1 = 1, \\ f_4 = 0, \text{with table-lookup} \end{pmatrix}$ [Formula 20]

Input: $D_2 = (U_2, V_2)$, $invu = 1/u_{21}, t_0, t_1$

Output: $D_1 = (U_1, V_1) = [1/2]D_2$, $invu = 1/u_{11}$ $U_i(x) = x^2 + u_{i1}x + u_{i0}, V_i(x) = v_{i1}x + v_{i0}, \gcd(h, U_1) = 1$ 1. Solve $k_1 + k_1^2 u_{21} + 1 = 0$ and select correct $k_1$ via $t_1$ $\alpha \leftarrow invu, k_1 \leftarrow H(u_{21})\alpha$ if $t_1 = 0$ then $k_1 \leftarrow k_1 + \alpha$ 2. Solving $k_1 h_0 + k_0 + k_0^2 u_{21} + c_1 = 0$ and select correct $k_0$ via $t_0$ $c_1 \leftarrow f_3 + v_{21} + u_{20} + u_{21}^2$ $c_0 \leftarrow f_2 + v_{20} + v_{21} + v_{21}^2 + u_{21}(u_{20} + c_1)$ $\gamma \leftarrow (c_1 + k_1 h_0)u_{21}$ $k_0 \leftarrow H(\gamma)\alpha$ if $t_1 = 0$ then $k_0 \leftarrow k_0 + \alpha$ 3. Compute $U_1$ $w_0 \leftarrow k_1^2, w_1 \leftarrow w_0 u_{20} + k_1 + u_{21}$ $w_2 \leftarrow k_0 + \sqrt{w_1 + k_0}$ $w_1 \leftarrow 1/(w_2 k_1), w_4 \leftarrow w_1 w_2$ $u_{11} \leftarrow w_2 w_4$ $w_0 \leftarrow w_0 w_1, w_1 \leftarrow k_0 u_{20},$ $w_5 \leftarrow k_1 u_{21}, w_6 \leftarrow (k_0 + k_1)(u_{20} + u_{21})$ $u_{10} \leftarrow w_4 \sqrt{k_0(w_1 + h_0) + c_0}$ 5. Compute $V_1 = V_2 + h + kU_2 \bmod U_1$ $w_4 \leftarrow w_5 + k_0 + 1,$ $w_5 \leftarrow w_1 + w_5 + w_6 + v_{21} + 1, w_6 \leftarrow w_1 + v_{20} + h_0$ $invu \leftarrow w_0$ $w_0 \leftarrow w_2 + w_4, w_1 \leftarrow w_0 u_{10}, w_3 \leftarrow (k_0 + k_1)(u_{10} + u_{11})$ $v_{10} \leftarrow w_1 + w_2 + w_3 + w_5$ $v_{11} \leftarrow w_1 + w_6$ 6. $U_1(x) \leftarrow x^2 + u_{11}x + u_{10}, V_1(x) \leftarrow v_{11}x + v_{10}$ 7. return $D_1 = (U_1, V_1)$, $invu = 1/u_{11}$ The complexity of Algorithm 11 [Algorithm 11 HEC_HLV ($h_2=h_1=1$, $f_4=0$, with table-lookup) is $18M+3S+1I+2SR+2H,$ and further, by setting $h_0=1$, the complexity can be reduced by 1M. The complexity in this case becomes $17M+3S+1I+2SR+2H.$ Further, the above-mentioned method as applied to Algorithm 12 [HEC_HLV($h(x)=x$, $f(X)=x^5+f_1x+f_0$)] described above is represented as Algorithm 13 [HEC_HLV($h(x)=x$, $f(X)=x^5+f_1x+f_0$, with table-lookup) below.

Algorithm 13 HEC_HLV $\begin{pmatrix} h(x) = x, f(x) = x^5 + f_1 x + f_0, \\ \text{with table-lookup} \end{pmatrix}$ [Formula 21]

Input: $D_2 = (U_2, V_2)$, $t_0$

Output: $D_1 = (U_1, V_1) = [1/2]D_2$ $U_i(x) = x^2 + u_{i1}x + u_{i0}, V_i(x) = v_{i1}x + v_{i0}, \gcd(h, U_1) = 1$ 1. Solve $k_1^2 u_{21} + 1 = 0$ $w_0 \leftarrow 1/u_{21}, k_1 \leftarrow \sqrt{w_0}$ 2. Solve $k_0 + k_0^2 u_{21} + c_1 = 0$ $c_1 \leftarrow u_{20} + u_{21}^2, w_1 \leftarrow c_1 u_{21}$ $c_0 \leftarrow v_{21} + v_{21}^2 + u_{21} u_{20} + w_1$ $invk_1 \leftarrow \sqrt{u_{21}}, w_2 \leftarrow H(w_1)$ if $t_0 = 0$ then $k_0 \leftarrow w_0 w_2$ else $k_0 \leftarrow w_0 w_2 + w_0, w_2 \leftarrow w_2 + 1$ 3. Compute $U_1$ $u_{11} \leftarrow \sqrt{invk_1 + k_0}, u_{10} \leftarrow \sqrt{(k_0 + c_1)u_{20} + c_0 u_{21}}$ -continued 4. Compute $V_1 = V_2 + h + kU_2 \mod U_1$ $w_1 \leftarrow k_1(u_{21} + u_{11}) + k_0$ $v_{11} \leftarrow k_1(u_{20} + u_{10}) + w_2 + v_{21} + 1 + u_{11}w_1$ $v_{10} \leftarrow k_0 u_{20} + v_{20} + u_{10}w_1$ 5. $U_1(x) \leftarrow x^2 + u_{11}x + u_{10}, V_1(x) \leftarrow v_{11}x + v_{10}$ 6. return $D_1 = (U_1, V_1)$ The complexity of the above-mentioned algorithm is $9.5M+3S+1I+3.5SR+1H,$ and thus faster computation can be realized.

Processing Example 6

Proposed Method D1

Processing Example 6 (Proposed Method D1) relates to a method of computing the scalar multiplication of a divisor by using the method of computing the halving of a divisor as set forth in each of Processing Examples 1 to 5.

A method of computing the scalar multiplication using halving of a rational point on an elliptic curve is described in the document [E. Knudsen. Elliptic Scalar Multiplication Using Point Halving. ASIACRYPTO '99, LNCS 1716, pp. 135-149, Springer-Verlag, 1999]. The computation method of scalar multiplication using halving of a divisor on a hyperelliptic curve is executed on the basis of the scalar multiplication disclosed in this document. It should be noted, however, that the right-to-left method, in which $[\frac{1}{2}^i]D$ is computed and added, is used. This algorithm is represented below as Algorithm 14 [Scalar Multiplication].

Algorithm 14 Scalar Multiplication [Formula 22]

Input: $D \in J(\mathbb{F}_{2^n})$ such that $2D \neq O, d \in \mathbb{Z}$, $r$: order of $D, m = \lfloor \log_2 r \rfloor$ Output: scalar multiplication $dD$ 1. $\sum_{i=0}^{m} \hat{d}_i 2^i \leftarrow 2^m d \mod r, \hat{d}_i \in \{0, 1\}$ 2. $\sum_{i=0}^{m} d_i / 2^i \leftarrow \sum_{i=0}^{m} \hat{d}_i 2^{i-m}, d \in \{0, 1\}$ 3. $Q \leftarrow O, R \leftarrow D, invu \leftarrow 1/u_1$ 4. for $i$ from 0 to $m$ do:

if $d_i = 1$ then $Q \leftarrow Q + R$ $(R, invu) \leftarrow \text{HEC\_HLV}(R, invu)$ 5. return $Q$ HEC_HLV appearing in step 4 of Algorithm 14 [Algorithm 14 Scalar Multiplication] mentioned above may be HEC_HLV of Algorithm 5 [Algorithm 5] described above using a random curve, HEC_HLV with constraints $h_2=1, f_4=0$ provided to the curve parameters of Algorithm 8 [Algorithm 8], HEC_HLV with the table-lookup method applied to the curve parameters of Algorithm 8 [Algorithm 8], HEC_HLV with constraints $h_2=h_1=1, f_4=0$ provided to the curve parameters of Algorithm 10 [Algorithm 10], HEC_HLV with constraints $h_2=h_1=h_0=1, f_4=0$ provided to the curve parameters of Algorithm 10 [Algorithm 10], or HEC_HLV with the table-lookup method applied to the curve parameters of Algorithm 10 [Algorithm 10]. Further, the above-mentioned HEC_HLV may be HEC_HLV of the curve parameters of Algorithm 12 [Algorithm 12], or HEC_HLV with the table-lookup method applied to Algorithm 12 [Algorithm 12].

[Verification of Increased Computation Speed]

Next, the complexity of the computation applied to each of Processing Examples 1 to 6 described above is found, and verification is made as to an increase in computation speed.

In the case of HEC_HLV($h_2=1, f_4=0$), the required complexity is, on average, $25.5M+2S+1I+3SR+2H+2T.$ First, a case where a finite field is defined by a normal basis is considered. As described above, when using a normal basis, only the complexity of M and I may be taken into account. According to the document [A. Menezes. Elliptic Curve Public Key Cryptosystems. Kluwer Academic Publishers, 1993.], assuming that finite fields are Fq, $q=2^n$, one inversion operation is equivalent to the number of multiplication operations computed by the following expression, that is:

$\lfloor \log_2(n-1) \rfloor + w(n-1) - 1$ [Formula 23]

In this case, $w(n-1)$ denotes the number of 1's in the binary representation of $n-1$. For example, if $n=83, 89, 113$, then $I=8M$, and if $n=103$, then $I=9M$.

Here, assuming that $I=8M$, the complexity of $\text{HEC\_HLV}(h_2=1, f_4=0)$ is represented as $25.5M+1I=33.5M.$ On the other hand, in the case of HarleyDBL, its complexity is represented as $21M+1I=29M,$ so HarleyDBL is about 13% faster than HEC_HLV. Further, when the table-lookup method is used, the complexity becomes $22M+1I=30M,$ so HarleyDBL is about 3% faster than HEC_HLV.

Further, in the case of HEC_HLV($h_2=h_1=1, f_4=0$), the complexity is, on average, $19.5M+3S+1I+3SR+2H+2T.$ In this case, $19.5M+1I=27.5M.$ On the other hand, in the case of HarleyDBL, the complexity is represented as $18M+1I=26M,$ so HarleyDBL is about 5% faster than HEC_HLV. Further, when the table-lookup method is used, the complexity becomes $18M+1I=26M,$ so HarleyDBL and HEC_HLV are equal in complexity.

Further, the complexity of HEC_HLV($h_2=h_1=h_0=1, f_4=0$) is, on average, $18.5M+3S+1I+3SR+2H+2T.$ In this case, $18.5M+1I=26.5M.$ On the other hand, in the case of HarleyDBL, its complexity is $$15M+1I=23M,$$

so HarleyDBL is about 13% faster than HEC_HLV. Further, when the table-lookup method is used, the complexity becomes $$17M+1I=25M,$$

so HarleyDBL is about 8% faster than HEC_HLV.

Further, speed comparison was carried out for the case of a polynomial basis through software implementation.

The software implementation was carried out under the environment as indicated below:
CPU: PentiumII 300 MHx
OS: RedHat7.3
Compiler: gcc2.96.

The operations of M (multiplication) and S (squaring), I (inversion), SR (square root operation) and T (trace (determination as to whether roots exist for a quadratic equation)), and H (half-trace) (operation to find the root of a quadratic equation)) were carried out in the manner as disclosed in the following documents: [D. Hankerson, J. Hernandez, and A. Menezes. Software Implementation of Elliptic Curve Cryptography over Binary Fields. CHES 2000, LNCS 1965, pp. 1-24, 2000. Algorithm 4.6, 4.7]; [S. Shantz. From Euclid's GCD to Montgomery Multiplication to the Great Divide. TR-2001-95, Sun Microsystems, Inc., 2001.]; [K. Fong, D. Hankerson, J. Lopez, and A. Menezes. Field inversion operation and point halving revised. Technical Report CORR2003-18, www.cacr.math.uwaterloo.ca/techreports/2003/corr2003-18.pdf]; and [K. Fong, D. Hankerson, J. Lopez, and A. Menezes. Field inversion operation and point halving revised. Technical Report CORR2003-18, www.cacr.math.uwaterloo.ca/techreports/2003/corr2003-18.pdf Algorithm 4.7], respectively.

M, S, I, SR, H, T were implemented with respect to three finite fields of n=83, 89, 113, and the ratios to M were found. In this case, the following irreducible polynomials were used:
in the case of n=3, $$z^{83}+z^7+z^4+z^2+1=0;$$

in the case of n=9, $$z^{89}+z^{38}+1=0;\text{ and}$$

in the case of n=113, $$z^{113}+z^9+1=0.$$

The complexities in the respective cases were as follows.
n=83: S/M=0.12, I/M=7.96, SR/M=0.57, H/M=0.58
n=89: S/M=0.05, I/M=8.74, SR/M=0.14, H/M=0.61
n=113: S/M=0.06, I/M=8.56, SR/M=0.10, H/M=0.50

Applying these to the complexity of HarleyDBL, 21M+5S+1I, yields the following.
n=83: HarleyDBL 29.56M
n=89: HarleyDBL 29.99M
n=113: HarleyDBL 29.86M Applying these to the complexity of HEC_HLV($h_2$=1, $f_4$=0), 25.5M+2S+1I+3SR+2H+2T, yields the following.
n=83: HEC_HLV($h_2$=1, $f_4$=0) 36.57M
n=89: HEC_HLV($h_2$=1, $f_4$=0) 35.98M
n=113: HEC_HLV($h_2$=1, $f_4$=0) 35.48M In this case, when n=83, 89, 113, HarleyDBL is 20%, 17%, 16% faster than HEC_HLV, respectively.

Further, applying these to the complexity of HEC_HLV ($h_2$=1, $f_4$=0) to which the table-lookup method is applied, 22M+2S+1I+2SR+2H, yields the following.
n=83: HEC_HLV($h_2$=1, $f_4$=0 with table-lookup) 32.5M
n=89: HEC_HLV($h_2$=1, $f_4$=0 with table-lookup) 32.34M
n=113: HEC_HLV($h_2$=1, $f_4$=0 with table-lookup) 31.88M In this case, when n=83, 89, 113, HarleyDBL is 9%, 7%, 6% faster than HEC_HLV, respectively.

Further, in the case of $h_2$=$h_1$=1, $f_4$=0, applying these to the complexity of HarleyDBL, 18M+7S+1I, yields the following.
n=83: HarleyDBL 27.4M
n=89: HarleyDBL 27.09M
n=113: HarleyDBL 26.98M Next, applying these to the complexity of HEC_HLV ($h_2$=$h_1$=1, $f_4$=0), 19.5M+3S+1I+3SR+2H+2T, yields the following.
n=83: HEC_HLV($h_2$=$h_1$=1, $f_4$=0) 30.69M
n=89: HEC_HLV($h_2$=$h_1$=1, $f_4$=0) 30.03M
n=113: HEC_HLV($h_2$=$h_1$=1, $f_4$=0) 29.54M In this case, when n=83, 89, 113, HarleyDBL is 13%, 12%, 9% faster than HEC_HLV, respectively.

Further, applying these to the complexity of HEC_HLV ($h_2$=$h_1$=1, $f_4$=0) to which the table-lookup method is applied, 18M+3S+1I+2SR+2H, yields the following.
n=83: HEC_HLV($h_2$=$h_1$=1, $f_4$=0 with table-lookup) 28.62M
n=89: HEC_HLV($h_2$=$h_1$=1, $f_4$=0 with table-lookup) 28.39M
n=113: HEC_HLV($h_2$=$h_1$=1, $f_4$=0 with table-lookup) 27.94M In this case, when n=83, 89, 113, HarleyDBL is 4%, 5%, 3% faster than HEC_HLV, respectively.

Further, in the case of $h_2$=$h_1$=$h_0$=1, $f_4$=0, applying these to the complexity of HarleyDBL, 15M+7S+1I, yields the following.
n=83: HarleyDBL 23.8M
n=89: HarleyDBL 24.09M
n=113: HarleyDBL 23.98M Next, applying these to the complexity of HEC_HLV ($h_2$=$h_1$ $h_0$=1, $f_4$=0), 18.5M+3S+1I+3SR+2H+2T, yields the following.
n=83: HEC_HLV($h_2$=$h_1$=$h_0$=1, $f_4$=0) 29.69M
n=89: HEC_HLV($h_2$=$h_1$=$h_0$=1, $f_4$=0) 29.03M
n=113: HEC_HLV($h_2$=$h_1$=$h_0$=1, $f_4$=0) 28.54M In this case, when n=83, 89, 113, HarleyDBL is 20%, 17%, 16% faster than HEC_HLV, respectively.

Further, applying these to the complexity of HEC_HLV ($h_2$=$h_1$=$h_0$=1, $f_4$=0) to which the table-lookup method is applied, 17M+3S+1I+2SR+2H, yields the following.
n=83: HEC_HLV($h_2$=$h_1$=$h_0$=1, $f_4$=0 with table-lookup) 27.62M
n=89: HEC_HLV($h_2$=$h_1$=$h_0$=1, $f_4$=0 with table-lookup) 27.39M
n=113: HEC_HLV($h_2$=$h_1$=$h_0$=1, $f_4$=0 with table-lookup) 26.94M In this case, when n=83, 89, 113, HarleyDBL is 14%, 12%, 11% faster than HEC_HLV, respectively.

Next, a comparison with HarleyDBL is made with respect to each of Algorithm 12 [Algorithm 12] described above, that is, [Algorithm 12 HEC_HLV(h(x)=x, f(X)=$x^5$+$f_1$x+$f_0$)], and Algorithm 13 [Algorithm 13] to which the table-lookup method is applied, that is, [Algorithm 13 HEC_HLV(h(x)=x, f(X)=$x^5$+$f_1$x+$f_0$, with table-lookup)].

The complexity of [Algorithm 12 HEC_HLV(h(x)=x, f(X)=$x^5$+$f_1$x+$f_0$)] is 11.5M+2S+1I+4.5SR+1H+1T, and the complexity of [Algorithm 13 HEC_HLV(h(x)=x, f(X)=$x^5$+

$f_1x+f_0$, with table-lookup)] is 9.5M+2S+1I+3.5SR+1H. According to the document [(Non-patent Document 19: T. Lange. Efficient Doubling on Genus Two Curves over Binary Fields, SAC 2004, pre-proceedings, pp. 189-202, 2004.)], the complexity of HarleyDBL is 6M+5S+1I. As described above, when a finite field is defined by a normal basis, the complexities of S (squaring), SR (square root operation), H (half-trace (operation to find the root of a quadratic equation)), and T (trace (determination as to whether roots exist for a quadratic equation)) can be ignored, and only the complexities of M (multiplication) and I (inversion) need to be taken into account.

Therefore, the complexity of Algorithm 12 [Algorithm 12 HEC_HLV(h(x)=x, f(X)=$x^5+f_1x+f_0$)] becomes $$11.5M+2S+1I+4.5SR+1H+1T,$$

$$=11.5M+1I.$$

Further, the complexity of Algorithm 13 [Algorithm 13 HEC_HLV(h(x)=x, f(X)=$x^5+f_1x+f_0$, with table-lookup)] becomes $$9.5M+2S+1I+3.5SR+1H$$

$$=9.5M+1I.$$

The complexity of HarleyDBL becomes $$6M+1I.$$

Therefore, HarleyDBL is faster than HEC_HLV.

As described above, in the case of curve parameters $h_2=h_1=1$, $f_4=0$, the complexity in the case where the table-look-up method is applied to HEC_HLV, 18M+3S+1I+2SR+2H, is substantially equal to the complexity of HarleyDBL, 18M+7S+1I, and represents the fastest algorithm upon comparison between HEC_HLV and HarleyDBL under equivalent conditions.

Next, the complexity of scalar multiplication using Algorithm 14 [Algorithm 14 scalar multiplication] is considered. The complexity of scalar multiplication is considered with respect to a method in which $h_2=h_1=1$, $f_4=0$ allowing the fastest computation in comparison to HarleyDBL under equivalent conditions are used as the curve parameters, and the table look-up method is used for HEC_HVL.

Since the ratio of steps 1, 2 to the entire scalar multiplication process in Algorithm 14 is very small, the complexity thereof is ignored. Here, the complexity is considered for the cases of n=83, 89, 113 for both a normal basis and a polynomial basis. Further, the order of the base point is assumed to be 165 bits, 177 bits, 225 bits with respect to n=83, 89, 113, respectively. Further, in the repeating portion of step 4, the repetition is made for the number of bits of the order of the base point. Divisor addition is carried out in the manner as disclosed in the document [T. Lange, Efficient arithmetic on genus 2 hyperelliptic curves over finite fields via explicit formulae. Cryptology ePrint Archive, 2002/121, IACR, 2002]. It should be noted that the curve parameters are $h_2=h_1=1$, $f_4=0$. The complexity required for the divisor addition in this case is 21M+3S+1I. It is assumed that binary expression of the scalar value results in the appearance of 0, 1 at equivalent ratios. The complexity is computed as follows: ((the complexity of addition)/2+(the complexity of halving or doubling))×(the number of bits of the order of the base point). First, the case of a normal basis will be considered. It is assumed that I=8M.

In the case of $h_2=h_1=1$, $f_4=0$,
n=83: addition•doubling: 6682.5M
n=89: addition•doubling: 7168.5M
n=113: addition•doubling: 9112.5M In the case of $h_2=h_1=1$, $f_4=0$,
n=83: addition•halving: 6930M
n=89: addition•halving: 7434M
n=113: addition•halving: 9450M In the case of $h_2=h_1=1$, $f_4=0$+table loop-up method (the complexity is equal to that in the case of addition•doubling)
n=83: addition•doubling: 6682.5M
n=89: addition•doubling: 7168.5M
n=113: addition•doubling: 9112.5M Next, the case of a polynomial is considered.
In the case of $h_2=h_1=1$, $f_4=0$,
n=83: addition•doubling: 6913.5M
n=89: addition•doubling: 7361.3M
n=113: addition•doubling: 9333M In the case of $h_2=h_1=1$, $f_4=0$,
n=83: addition•halving: 7456.35M
n=89: addition•halving: 7881.8M
n=113: addition•halving: 9909M In the case of $h_2=h_1=1$, $f_4=0$+table loop-up method (the complexity is equal to that in the case of addition•doubling)
n=83: addition•doubling: 7114.8M
n=89: addition•doubling: 7591.53M
n=113: addition•doubling: 9540M As has been described above, according to the processing examples of the present invention described above, halving on elliptic curve cryptography is extended to hyperelliptic curve cryptography to thereby realize fast computation. In the case of cryptographic computation employing computations on a divisor on a hyperelliptic curve, an arithmetic computation that puts a large load on the processing is the scalar multiplication of a divisor. In this regard, the processing according to the present invention as described above enables the scalar multiplication to be computed at a speed equivalent to that of the related art. As a result, even when using halving, hyperelliptic curve cryptography can be processed at a speed equivalent to that of the related art.

Next, Processing Examples 7 to 11 representing improvements over the processing examples described above, that is,
(Processing Example 1: Proposed Method A1)
(Processing Example 2: Proposed Method F1)
(Processing Example 3: Proposed Method B1)
(Processing Example 5: Proposed Method C1)
(Processing Example 6: Proposed Method D1), will be described. Specifically, Processing Examples 7 to 11 refer to the following methods.

(Processing Example 7: Proposed Method A2): A technique aimed at a further increase in the operation speed of the processing example mentioned above (Processing Example 1: Proposed Method A1), which includes computing the halving of a divisor D on a hyperelliptic curve of genus 2 in characteristic 2 with random parameters.

(Processing Example 8: Proposed Method F2): A technique aimed at a further increase in the operation speed of Processing Example mentioned above (Processing Example 2: Proposed Method F1), which includes computing the halving of a divisor D on a hyperelliptic curve of genus 2 in characteristic 2 with parameters h(x)=$x^2+h_1x+h_0$, $f_4=0$ (Processing Example 9: Proposed Method B2): A technique aimed at a further increase in the operation speed of Processing Example mentioned above (Processing Example 3: Proposed Method B1), which includes computing the halving of a divisor D on a hyperelliptic curve of genus 2 in characteristic 2 with parameters h(x)=$x^2+x+h_0$, $f_4=0$ (Processing Example 10: Proposed Method C2): A technique aimed at a further increase in the operation speed of Processing Example mentioned above (Processing Example 5: Proposed Method C1). That is, when computing the halving of a divisor D on a hyperelliptic curve of genus 2 in characteristic 2 with random parameters, a hyperelliptic curve of genus 2 in characteristic 2 with parameters $h(x)=x^2+h_1x+h_0$, $f_4=0$, and a hyperelliptic curve of genus 2 in characteristic 2 with parameters $h(x)=x^2+x+h_0$, $f_4=0$, two candidates of the halved value arise. In this case, it is necessary to select the one with the correct value from the two candidates. When selecting the correct one, it is necessary to compute the trace, multiplication, and square root of a finite field. Which one of the two candidates is correct depends on the divisor D. Hence, if the divisor D is fixed, information as to which one of the two candidates is correct is retained in a table in advance, and this table is looked up when selecting the correct value, thereby omitting the above-mentioned extra computations.

(Processing Example 11: Proposed Method D2): A technique aimed at a further increase in the operation speed of Processing Example mentioned above (Processing Example 6: Proposed Method D1), which includes computing the scalar multiplication of a divisor by using the method of computing the halving of a divisor as set forth in each of Processing Examples 7 to 10.

The respective processing examples mentioned above will be sequentially described below in detail.

Processing Example 7

Proposed Method A2

Processing Example 7 (Proposed Method A2) relates to a technique aimed at a further increase in the operation speed of Processing Example mentioned above (Processing Example 1: Proposed Method A1), which includes computing the halving of a divisor D on a hyperelliptic curve of genus 2 in characteristic 2 with random parameters.

In the following processing examples as well, it is assumed that the order of the divisors used in the processing below is r. That is, the divisors have no ramification point. It is assumed that the input divisors are as follows:

$$D_2=(U_2,V_2)$$

$$U_2=u_{22}x^2+u_{21}x+u_{20}; \text{ and}$$

$$V_2=v_{21}x+v_{20},$$

where:
$u_{22}=1$ if the weight of the divisor $D_2$ is 2; and
$u_{22}=1$, $U_{21}=1$, and $v_{21}=0$ if the weight of the divisor $D_2$ is 1.

Since no ramification point is included, as the halving operation, it suffices to consider four inversion operations, ExHarDBL$^{1+1 \to 2}$, ExHarDBL$^{2+2 \to 1}$, ExHarDBL$^{2+2 \to 2}$, and HarleyDBL. Those other than HarleyDBL represent exceptional cases.

Here, ExHarDBL$^{2+2 \to 1}$ represents a computation in the case where the weight of the input divisor is 2, and the weight of the output divisor is 1. Further, ExHarDBL$^{2+2 \to 2}$ represents a computation in the case where the weight of the input divisor is 2, and the coefficient of the first order term of $U_2$ satisfies $u_{21}=0$ and the weight of the output divisor is 2. However, while ExHarDBL$^{2+2 \to 2}$ can be computed by HarleyDBL, since halving as the inversion operation thereof becomes an exceptional case, ExHarDBL$^{2+2 \to 2}$ is herein treated as an exceptional case.

The halving operations corresponding to ExHarDBL$^{1+1 \to 2}$, ExHarDBL$^{2+2 \to 1}$, ExHarDBL$^{2+2 \to 2}$, and HarleyDBL mentioned above are defined as ExHEC_HLV$^{2 \to 1+1}$, ExHEC_HLV$^{1 \to 2+2}$, ExHEC_HLV$^{2 \to 2+2}$, and HEC_HLV, respectively.

When carrying out the halving operation of a divisor, first, as described above with reference to (Processing Example 1: Proposed Method A), a case-by-case differentiation is made depending on the input divisor as shown in FIG. 2. If the weight of the input divisor is 2, and the coefficient of the first order term of $U_2$ satisfies $u_{21} \ne 0$, the computation is performed by HEC_HLV. Further, if the weight of the input divisor is 2, and the coefficient of the term of $U_2$ satisfies $u_{21}=0$, the computation is performed by ExHEC_HLV$^{2 \to 2+2}$ or ExHEC_HLV$^{2 \to 1+1}$. Further, if the weight of the input divisor is 1, the computation is performed by ExHEC_HLV$^{1 \to 2+2}$. The algorithm of HEC_HLV is as descried above with reference to FIG. 3.

The halving operation of a divisor is realized by the reverse operation of the algorithm for performing the doubling operation of a divisor, that is, the [Algorithm 1 Harley DBL] below.

Algorithm 1 *HarleyDBL* [Formula 24]

Input: $D_1 = (U_1, V_1)$

Output: $D_2 = (U_2, V_2)$ $U_i(x) = x^2 + u_{i1}x + u_{i0}, V_i(x) = v_{i1}x + v_{i0}, gcd(h, U_1) = 1$ 1. $U_1' \leftarrow U_1^2$ 2. $S \leftarrow h^{-1}(f + hV_1 + V_1^2)/U_1 \bmod U_1$ 3. $V_1' \leftarrow SU_1 + V_1$ 4. $U_2' \leftarrow (f + hV_1' + V_1'^2)/U'$ 5. $U_2 \leftarrow MakeMonic(U_2')$ 6. $V_2 \leftarrow V_1' + h \bmod U_2$ 7. return $D_2 = (U_2, V_2)$ In step 6 of Algorithm 1, there is a unique polynomial:

$$k(x)=k_1x+k_0,$$

which satisfies:

$$V_1'+h=(k_1x+k_0)U_2+V_2.$$

This is transformed as follows:

$$V_1'=h+(k_1x+k_0)U_2+V_2.$$

Substituting this into the expression that appears in step 4, $$(f+hV_1'+V_1'^2)$$

results in the following:

$$U_2'U_1'=f+h(kU_2+V_2)+k^2U_2^2+V_2^2 \qquad \text{Expression (1).}$$

In the above expression, since $(U_2,V_2)$ is known, from Expression (1), the relational expression between k and $U_1'$ can be obtained.

In this case, it is to be noted that $$U_2'=k_1^2U_2.$$

The above equation (1) is expanded and rearranged to yield the following:

$$U_1' = x^4 + ((k_1h_2 + k_1^2u_{21} + 1)/k_1^2)x^3 +$$
$$((k_1h_1 + k_0h_2 + k_1^2u_{20} + k_0^2 + c_2)/k_1^2)x^2 +$$
$$((k_1h_0 + k_0h_1 + k_0^2u_{21} + c_1)/k_1^2)x +$$
$$(k_0h_0 + k_0^2u_{20} + c_0)/k_1^2.$$

Expression (2)

Here, $c_2 = f_4 + u_{21}$, $c_1 = f_3 + h_2v_{21} + u_{21} + c_2u_{21}$, and $c_0 = f_2 + h_2v_{20} + h_1v_{21} + v_{21}^2 + c_2u_{20} + c_1u_{21}$ are satisfied.

Further, from step 1, $$U_1' = U_1^2.$$

That is, the following expression holds:

$$U_1' = x^4 + u_{11}^2x^2 + u_{10}^2 \quad \text{Expression (3)}$$

A relational expression is derived through comparison between the respective coefficients of Expressions (2) and (3) mentioned above, and halving operation can be computed by solving this relational expression. The algorithm prescribing the above-mentioned procedure is shown below as Algorithm 4 [Algorithm 4 Sketch HEC_HLV].

Algorithm 4 Sketch HEC_HLV [Formula 25]

Input: $D_2 = (U_2, V_2)$

Output: $D_1 = (U_1, V_1) = [1/2]D_2$ $U_i(x) = x^2 + u_{i1}x + u_{i0}$,
$V_i(x) = v_{i1}x + v_{i0}$,
$\gcd(h, U_i) = 1, i = 1, 2$ 1. reconstruct $k_0, k_1$ 1.1 $V_1' \leftarrow V_2 + h + kU_2, k(x) = k_1x + k_0$ 1.2 $U_1' \leftarrow (f + hV_1' + V_1'^2)/(k_1^2U_2)$ 1.3 derive $k_0, k_1$ from $coeff(U_1', 3) = 0, coeff(U_1', 1) = 0$ 2. compute $u_{11}$ by substituting $k_0, k_1$ in $coeff(U_1', 2)$ 3. compute $u_{10}$ by substituting $k_0, k_1$ in $coeff(U_1', 0)$ 4. $U_1 \leftarrow x^2 + u_{11}x + u_{10}$ 5. $V_1 \leftarrow V_2 + h + kU_2 \mod U_1$ 6. return $D_1 = (U_1, V_1)$ Specifically, the following relational expressions can be obtained.
[Formula 26]

$$k_1h_2 + k_1^2u_{21} + 1 = 0 \quad \text{Expression (4)}$$

$$k_1h_0 + k_0h_1 + k_0^2u_{21} + c_1 = 0 \quad \text{Expression (5)}$$

$$u_{11} = \sqrt{k_1h_1 + k_0h_2 + k_1^2u_{20} + k_0^2 + c_2}/k_1 \quad \text{Expression (6)}$$

$$u_{10} = \sqrt{k_0h_0 + k_0^2u_{20} + c_0}/k_1 \quad \text{Expression (7)}$$

It is necessary to compute the correct $k_0, k_1$ from these relational expressions. This can be computed using the lemma as described below.

[Lemma 1]

It is assumed that that h(x) is an irreducible polynomial. In this case, there is only one $k_1$ that satisfies the expressions (4) and (5). Further, the expression (5) has roots only for the correct $k_1$. Further, there is only one $k_0$ that allows the computation of the halved divisor $D_1$ in Algorithm 4. Further, the following expression:

$$xh_2 + x^2u_{11} + 1 = 0$$

has roots only for the correct $k_0$.

The above-mentioned Lemma 1 was applied to Algorithm 4. The detailed computation method of halving is shown as Algorithm 5a [Algorithm 5a Sketch HEC_HLV] below.

Algorithm 5a HEC_HLV [Formula 27]

Input: $D_2 = (U_2, V_2)$

Output: $D_1 = (U_1, V_1) = [1/2]D_2$ $U_i(x) = x^2 + u_{i1}x + u_{i0}$,
$V_i(x) = v_{i1}x + v_{i0}$,
$\gcd(h, U_i) = 1, i = 1, 2$ 1. Solve $k_1h_2 + k_1^2u_{21} + 1 = 0$ $invu \leftarrow 1/u_{21}, invh \leftarrow 1/h_2^2, \alpha \leftarrow h_2invu, \gamma \leftarrow u_{21}invh$ $k_1 \leftarrow H(\gamma)\alpha, k_1' \leftarrow k_1 + \alpha$ 2. Select correct $k_1$ by solving $k_1h_0 + k_0h_1 + k_0^2u_{21} + c_1 = 0$ $c_2 \leftarrow f_4 + u_{21}, c_1 \leftarrow f_3 + h_2v_{21} + u_{20} + c_2u_{21}$ $c_0 \leftarrow f_2 + h_2v_{20} + h_1v_{21} + v_{21}^2 + c_2u_{20} + c_1u_{21}$ $\alpha \leftarrow h_1invu, w \leftarrow u_{21}/h_1^2, \gamma \leftarrow (c_1 + k_1h_0)w$ if $Tr(\gamma) = 1$ then $k_1 \leftarrow k_1', \gamma \leftarrow (c_1 + k_1h_0)w$ $k_0 \leftarrow H(\gamma)\alpha, k_0' \leftarrow k_0 + \alpha$ 3. Select correct $k_0$ by checking trace of $xh_2 + x^2u_{11} + 1 = 0$ $invk \leftarrow 1/k_1$, $u_{11} \leftarrow invk\sqrt{k_1(h_1 + k_1u_{20}) + k_0(h_2 + k_0) + c_2}$, $\gamma \leftarrow u_{11}invh$ if $Tr(\gamma) = 1$ then $k_0 \leftarrow k_0', u_{11} \leftarrow u_{11} + invk\sqrt{\alpha(h_2 + \alpha)}$ 4. Compute $U_1$ $u_{10} \leftarrow invk\sqrt{k_0(h_0 + k_0u_{20}) + c_0}$ 5. Compute $V_1 = V_2 + h + kU_2 \mod U_1$ $w \leftarrow h_2 + k_1(u_{11} + u_{21}) + k_0$ $v_{11} \leftarrow v_{21} + h_1 + k_1(u_{10} + u_{20}) + k_0u_{21} + u_{11}w$ $v_{10} \leftarrow v_{20} + h_0 + k_0u_{20} + w$ -continued 6. $U_1(x) \leftarrow x^2 + u_{11}x + u_{10}, V_1(x) \leftarrow v_{11}x + v_{10}$ 7. return $D_1 = (U_1, V_1)$ In Algorithm 5a [Algorithm 5a] mentioned above, if $k_1'$, $k_0'$ are correct values (in other words, if $k_1$, $k_0$ are not correct values), the complexity of the algorithm is:

29M+1S+4I+3SR+2H+2T.

Here, M, S, SR, H, and T mean multiplication, squaring, inversion, square root operation, half-trace (operation to find the root of a quadratic equation), and trace (determination as to whether roots exist for a quadratic equation), respectively. The complexity becomes the largest if these $k_1'$, $k_0'$ are correct values.

Next, if $k_1$, $k_0$ are correct values (in other words, if $k_1'$, $k_0'$ are not correct values), the complexity becomes the smallest, so the complexity can be reduced by 2M in step 2, and the complexity can be reduced by 2M+1SR in step 3. That is, the complexity in this case is

25M+1S+4I+2SR+2H+2T, and the complexity becomes the smallest.

Next, if $k_1$, $k_0'$ are correct values (in other words, if $k_1'$, $k_0$ are not correct values), the complexity can be reduced by 2M+1SR in step 3. That is, the complexity in this case becomes:

27M+1S+4I+2SR+2H+2T.

Lastly, if $k_1'$, $k_0$ are correct values (in other words, if $k_1$, $k_0'$ are not correct values), the complexity can be reduced by 2M in step 2. That is, the complexity in this case becomes:

27M+1S+4I+3SR+2H+2T.

Upon checking the probabilities with which the above-mentioned four cases occur by computer experiment, it was confirmed that they occur at substantially the same ratio. In the description that follows, it is assumed that the probabilities with which the above-mentioned four cases occur are substantially equal. The averaging of the complexities in the above-mentioned four cases yields

27M+1S+4I+2.5SR+2H+2T.

Next, the exceptional cases:
ExHEC_HLV$^{2 \to 1+1}$;
ExHEC_HLV$^{1 \to 2+2}$; and
ExHEC_HLV$^{2 \to 2+2}$
are considered. Since the probabilities with which these exceptional cases occur are so low as to be negligible, no evaluation on complexity will be made.

Figure 5:
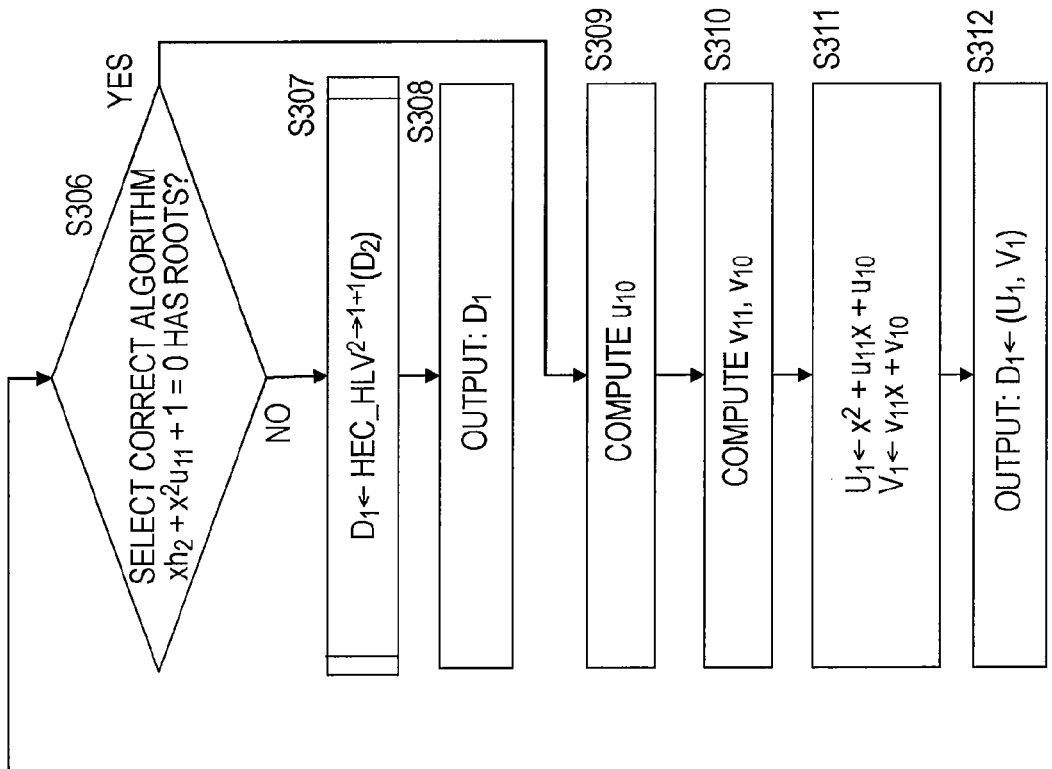
FIG. 5 is a flow chart illustrating the algorithm of HEC_HLV$^{2\rightarrow 2+2}$.
Figure 5:
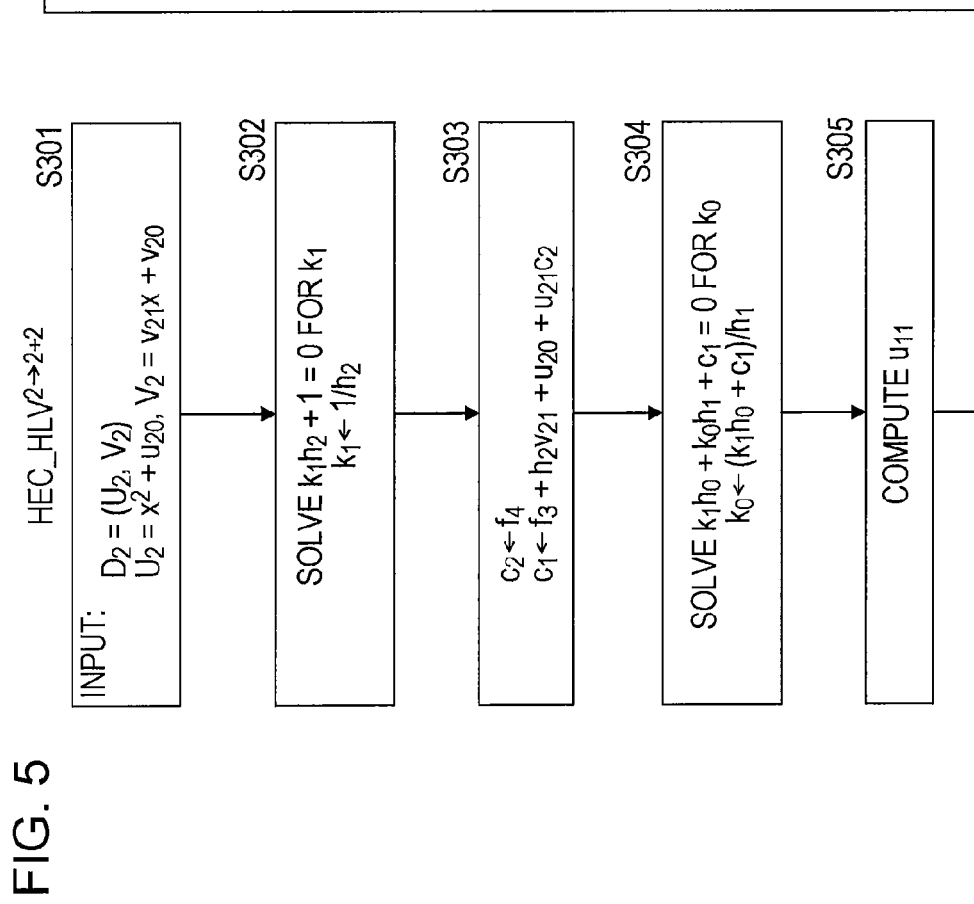
Figure 6:
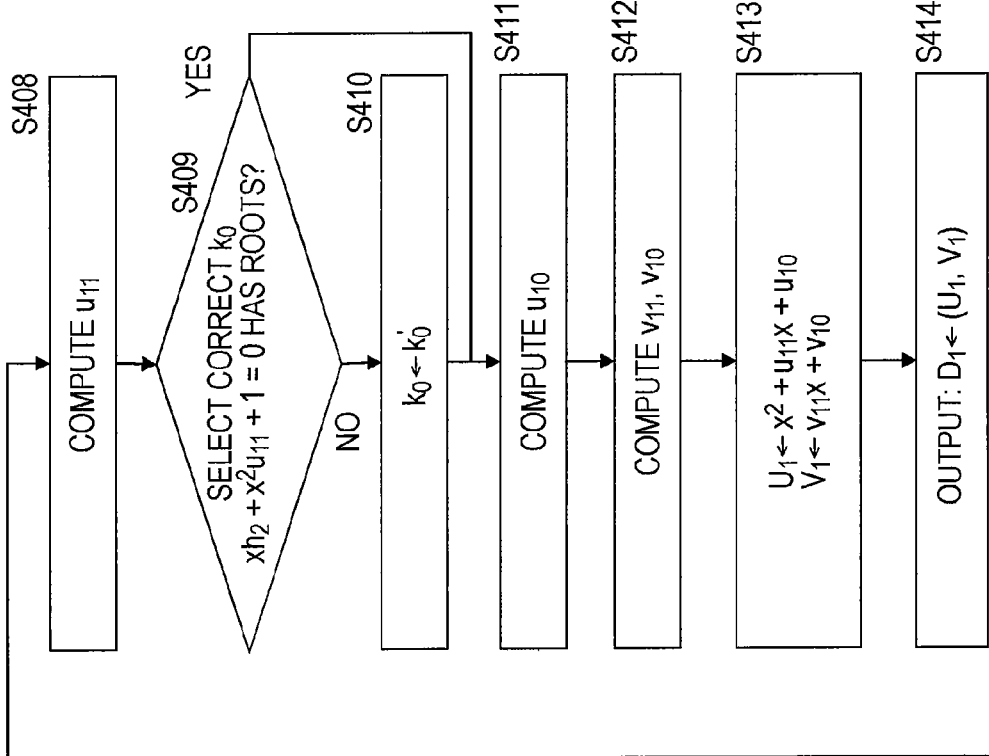
FIG. 6 is a flow chart illustrating the algorithm of HEC_HLV$^{1\rightarrow 2+2}$.
Figure 6:
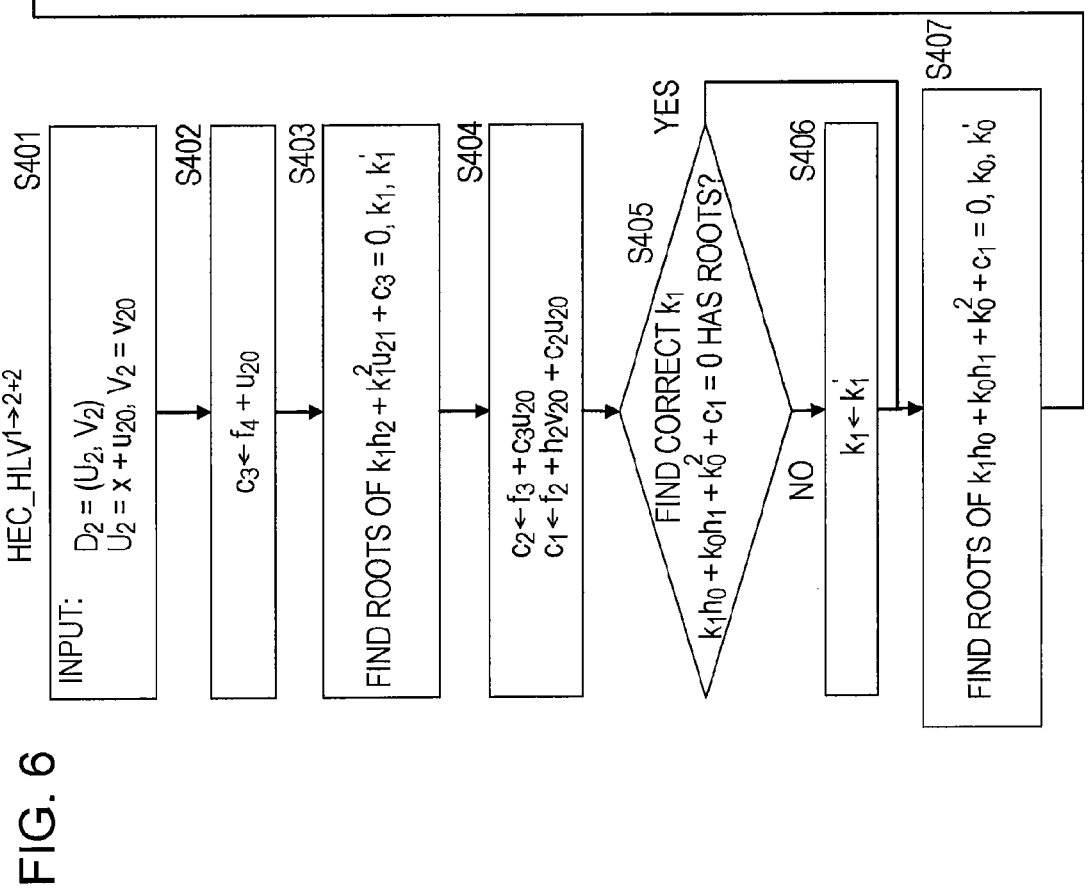

It should be noted that the computation algorithms for these exceptional cases are of the same processing as those described with reference to the flowcharts shown in FIGS. 4 to 6 in the section of (Processing Example 1: Proposed Method A1) described above, that is:

For the algorithm of ExHEC_HLV$^{2 \to 1+1}$, the flowchart shown in FIG. 4;

For the algorithm of ExHEC_HLV$^{1 \to 2+2}$, the flowchart shown in FIG. 5; and For the algorithm of ExHEC_HLV$^{2 \to 2+2}$, the flowchart shown in FIG. 6.

Further, as for the computation procedure for ExHEC_HLV$^{2 \to 2+2}$ as well, the processing is the same as that of Algorithm 6 [Algorithm 6] described above in the section of (Processing Example 1: Proposed Method A1), and as for the computation procedure for ExHEC_HLV$^{1 \to 2+2}$ as well, the processing is the same as that of Algorithm 7 [Algorithm 7] described above in the section of (Processing Example 1: Proposed Method A1).

Processing Example 8

Proposed Method F2

Processing Example 8 (Proposed Method F2A) relates to a technique aimed at a further increase in the operation speed of the processing example mentioned above (Processing Example 2 Proposed Method F1), which includes computing the halving of a divisor D on a hyperelliptic curve of genus 2 in characteristic 2 with parameters $h(x)=x^2+h_1 x+h_0$, $f_4=0$ A close look at Algorithm 5a applied to above-mentioned processing example (processing Example 7: Proposed Method A2) will reveal that Algorithm 5a contains a large number of multiplication operations by a coefficient h(x) and inversion operations of the coefficient h(x). This means that the complexities of multiplication and inversion operations can be reduced by manipulating the coefficient h(x). It should be noted that according to the document (Non-patent Document 19: T. Lange. Efficient Doubling on Genus Two Curves over Binary Fields, SAC 2004, pre-proceedings, pp. 189-202, 2004.), $h_2=1$, $f_4=0$ are used to achieve fast computation. The complexity of HarleyDBL in the case where these parameters are used is 21M+5S+1I.

While the conditions for Processing Example 8 (Proposed Method F2) described here are also set in conformity with those mentioned above, since an irreducible polynomial is assumed for h(x) due to Lemma 1, $h(x)=x^2+h_1 x+h_0$, and $Tr(h_0/h_1^2)=1$ are set (the necessary and sufficient condition for the quadratic equation $ax^2+bx+c=0$ to be an irreducible polynomial is $Tr(ac/b^2)=1$). The computation method in this case is shown in Algorithm 8 [Algorithm 8] HEC_HLV($h_2=1$, $f_4=0$).

Algorithm 8a HEC_HLV($h_2 = 1$, $f_4 = 0$)      [Formula 28]

Input: $D_2 = (U_2, V_2)$, $1/h_1^2$

Output: $D_1 = (U_1, V_1) = [1/2]D_2$ $U_i(x) = x^2 + u_{i1}x + u_{i0}$, $V_i(x) = v_{i1}x + v_{i0}$, $\gcd(h, U_i) = 1$, $i = 1, 2$ 1. Solve $k_1 + k_1^2 u_{21} + 1 = 0$ $\alpha \leftarrow 1/u_{21}, k_1 \leftarrow H(u_{21})\alpha, k_1' \leftarrow k_1 + \alpha$ 2. Select correct $k_1$ by solving $k_1 h_0 + k_0 h_1 + k_0^2 u_{21} + c_1 = 0$ $c_1 \leftarrow f_3 + v_{21} + u_{20} + u_{21}^2$ $c_0 \leftarrow f_2 + v_{20} + v_{21}(h_1 + v_{21}) + u_{21}(u_{20} + c_1)$ $w_0 \leftarrow u_{21}/h_1^2, \alpha \leftarrow h_1 \alpha, \gamma \leftarrow (c_1 + k_1 h_0) w_0$ if $Tr(\gamma) = 1$ then $k_1 \leftarrow k_1', \gamma \leftarrow (c_1 + k_1 h_0) w_0$ $k_0 \leftarrow H(\gamma)\alpha, k_0' \leftarrow k_0 + \alpha$ 3. Select correct $k_0$ by checking trace of $x + x^2 u_{11} + 1 = 0$ $w_0 \leftarrow k_1^2, w_1 \leftarrow w_0 u_{20} + k_1 h_1 + u_{21}$ $w_2 \leftarrow k_0 + \sqrt{w_1 + k_0}$, $w_4 \leftarrow k_1 u_{21} + 1, u_{11} \leftarrow w_2 w_4$ -continued if $Tr(u_{11}) = 1$ then $$k_0 \leftarrow k'_0, w_2 \leftarrow k_0 + \sqrt{w_1 + k_0}, u_{11} \leftarrow w_2 w_4$$

4. Compute $U_1$ $w_1 \leftarrow k_0 u_{20}, w_5 \leftarrow w_4 + 1, w_6 \leftarrow (k_0 + k_1)(u_{20} + u_{21})$ $u_{10} \leftarrow w_4 \sqrt{k_0(w_1 + h_0) + c_0}$ 5. Compute $V_1 = V_2 + h + kU_2 \bmod U_1$ $w_4 \leftarrow w_5 + k_0 + 1, w_5 \leftarrow w_1 + w_5 + w_6 + v_{21} + h_1$ $w_6 \leftarrow w_1 + v_{20} + h_0, w_7 \leftarrow w_2 + w_4$ $w_1 \leftarrow w_7 u_{10}, w_3 \leftarrow (k_1 + w_7)(u_{10} + u_{11})$ $v_{11} \leftarrow w_1 + w_2 + w_3 + w_5$ $v_{10} \leftarrow w_1 + w_6$ 6. $U_1(x) \leftarrow x^2 + u_{11}x + u_{10}, V_1(x) \leftarrow v_{11}x + v_{10}$ 7. return $D_1 = (U_1, V_1)$ Here, a method of reducing the number of inversion operations is considered. While Algorithm 5a [Algorithm 5a] requires four inversion operations of $1/u_{21}$, $1/h_2^2$, $1/h_1^2$, $1/k_1$, here, by setting as $h_2 = 1$, the number of required inversion operations can be reduced to three. Further, since $h_1$ is a curve parameter, by computing $1/h_1^2$ and giving this as an input in advance, the number of required inversion operations can be reduced to two of $1/u_{21}$ and $1/k_1$.

Further, with regard to $1/k_1$, this can be found by one multiplication operation and one addition operation on the basis of Expression 4 described with reference to [Processing Example 7: Proposed Method A2] mentioned above, that is, $1/k_1 = h_2 + k_1 u_{21}$.

Due to these operations, the number of inversion operations required for Algorithm 8a [Algorithm 8a] HEC_HLV($h_2 = 1$, $f_4 = 0$) mentioned above is only one, $1/u_{21}$.

As a result, the complexity of Algorithm 8a [Algorithm 8a] HEC_HLV($h_2 = 1$, $f_4 = 0$) mentioned above is as follows.

(a) If $k_1$, $k_0$ are correct values: 18M+2S+1I+2SR+2H+2T (b) If $k_1$, $k_0'$ are correct values: 19M+2S+1I+3SR+2H+2T (c) If $k_1'$, $k_0$ are correct values: 20M+2S+1I+2SR+2H+2T (d) If $k_1'$, $k_0'$ are correct values: 21M+2S+1I+3SR+2H+2T The averaging of all of the above-mentioned cases (a) to (d) yields 19.5 M+2S+1I+2.5SR+2H+2T.

The complexity of HarleyDBL was 21M+5S+1I. Here, according to the document [(Non-patent Document 15) E. Knudsen. Elliptic Scalar Multiplication Using Point Halving. ASIACRYPTO '99, LNCS 1716, pp. 135-149, Springer-Verlag, 1999.], it is known that when a finite field is defined by a normal basis, the complexities of S (squaring), SR (square root operation), H (half-trace) (operation to find the root of a quadratic equation)), and T (trace (determination as to whether roots exist for a quadratic equation)) can be ignored, and only the complexities of M (multiplication) and I (inversion) need to be taken into account. Therefore, when using a normal basis, Algorithm 8a is faster than HarleyDBL by 1.5M.

Further, when a finite field is defined by a polynomial basis, according to the document [(Non-patent Document 16) K. Fong, D. Hankerson, J. Lopez, and A. Menezes. Field inversion operation and point halving revised. Technical Report CORR2003-18, www.cacr.math.uwaterloo.ca/techreports/2003/corr2003-18.pdf18], it is known that in comparison to the complexity of M (multiplication), generally, the complexities of SR (square root operation) and H (half-trace) (operation to find the root of a quadratic equation)) are about SR=H=0.5M. Further, the complexity of T (trace (determination as to whether roots exist for a quadratic equation)) can be ignored. Further, the complexity of S (squaring) is known to be only about several tenths of M (multiplication). However, it is also known that depending on the way in which the polynomial basis is chosen, the complexity of SR may become less than 0.5M. It should be noted that exceptional cases can be computed on the basis of the exceptional cases in Processing Example 7 (proposed Method A2) described above.

Processing Example 9

Proposed Method B2

Processing Example 9 (Proposed Method B2) relates to a technique aimed at a further increase in the operation speed of Processing Example mentioned above (Processing Example 3: Proposed Method B1), which includes computing the halving of a divisor D on a hyperelliptic curve of genus 2 in characteristic 2 with parameters $h(x)=x^2+x+h_0$, $f_4=0$ As has been described with reference to Processing Example 8 (Proposed Method F2) mentioned above, a close look at the computation algorithm for halving described with reference to Processing Example 7 (Proposed Method A2), that is, Algorithm 5a [Algorithm 5a HEC_HLV] will reveal that Algorithm 5a contains a large number of multiplication operations by a coefficient h(x) and inversion operations of the coefficient h(x). This means that the complexities of multiplications and inversion operations can be reduced by manipulating the coefficient h(x). In the document [J. Pelzl, T. Wollinger, J. Guajardo, and C. Paar. Hyperelliptic curve Cryptosystems: Closing the Performance Gap to Elliptic Curves. Cryptology ePrint Archive, 2003/026, IACR, 2003], there is disclosed an example in which $h_2$, $h_1 \in \{0, 1\}$, $f_4 = 0$ is used to achieve fast computation.

The complexity of HarleyDBL in the case where these parameters are used is $18M+7S+1I$.

While the conditions for Processing Example 9 (Proposed Method B2) are also set in conformity with those mentioned above, since an irreducible polynomial is assumed for h(x) due to Lemma 1 mentioned above, $h(x)=x^2+x+h_0$, and $Tr(h_0)=1$ are set (the necessary and sufficient condition for the quadratic equation $ax^2+bx+c=0$ to be an irreducible polynomial is $Tr(ac/b^2)=1$)

The computation method in this case is shown below as Algorithm 10a [Algorithm 10a HEC_HLV($h_2 = h_1 = 1$, $f_4 = 0$).

Algorithm 10a HEC_HLV($h_2 = h_1 = 1$, $f_4 = 0$)  [Formula 29]

Input: $D_2 = (U_2, V_2)$

Output: $D_1 = (U_1, V_1) = [1/2]D_2$

-continued $U_i(x) = x^2 + u_{i1}x + u_{i0},$ $V_i(x) = v_{i1}x + v_{i0},$ $\gcd(h, U_i) = 1, i = 1, 2$ 1. Solve $k_1 + k_1^2 u_{21} + 1 = 0$ $\alpha \leftarrow 1/u_{21}, k_1 \leftarrow H(u_{21})\alpha, k_1' \leftarrow k_1 + \alpha$ 2. Select correct $k_1$ by solving $k_1 h_0 + k_0 + k_0^2 u_{21} + c_1 = 0$ $c_1 \leftarrow f_3 + v_{21} + u_{20} + u_{21}^2$ $c_0 \leftarrow f_2 + v_{20} + v_{21} + v_{21}^2 + u_{21}(u_{20} + c_1)$ $\gamma \leftarrow (c_1 + k_1 h_0)u_{21}$ if $Tr(\gamma) = 1$ then $k_1 \leftarrow k_1', \gamma \leftarrow \gamma + h_0$ $k_0 \leftarrow H(\gamma)\alpha, k_0' \leftarrow k_0 + \alpha$ 3. Select correct $k_0$ by checking trace of $x + x^2 u_{11} + 1 = 0$ $w_0 \leftarrow k_1^2, w_1 \leftarrow w_0 u_{20} + k_1 + u_{21}$ $w_2 \leftarrow k_0 + \sqrt{w_1 + k_0}, w_4 \leftarrow k_1 u_{21} + 1, u_{11} \leftarrow w_2 w_4$ if $Tr(u_{11}) = 1$ then $k_0 \leftarrow k_0', w_2 \leftarrow k_0 + \sqrt{w_1 + k_0}, u_{11} \leftarrow w_2 w_4$ 4. Compute $U_1$ $w_1 \leftarrow k_0 u_{20}, w_5 \leftarrow w_4 + 1, w_6 \leftarrow (k_0 + k_1)(u_{20} + u_{21})$ $u_{10} \leftarrow w_4 \sqrt{k_0(w_1 + h_0) + c_0}$ 5. Compute $V_1 = V_2 + h + kU_2 \bmod U_1$ $w_4 \leftarrow w_5 + k_0 + 1, w_5 \leftarrow w_1 + w_5 + w_6 + v_{21} + 1$ $w_6 \leftarrow w_1 + v_{20} + h_0, w_7 \leftarrow w_2 + w_4$ $w_1 \leftarrow w_7 u_{10}, w_3 \leftarrow (k_0 + w_7)(u_{10} + u_{11})$ $v_{11} \leftarrow w_1 + w_2 + w_3 + w_5$ $v_{10} \leftarrow w_1 + w_6$ 6. $U_1(x) \leftarrow x^2 + u_{11}x + u_{10}, V_1(x) \leftarrow v_{11}x + v_{10}$ 7. return $D_1 = (U_1, V_1)$ The complexity of Algorithm 10a [Algorithm 10a HEC_HLV($h_2=h_1=1, f_4=0$) mentioned above is as follows.
(a) If $k_1, k_0$ are correct values: 14M+3S+1I+2SR+2H+2T
(b) If $k_1, k_0'$ are correct values: 15M+3S+1I+3SR+2H+2T
(c) If $k_1', k_0$ are correct values: 14M+3S+1I+2SR+2H+2T
(d) If $k_1', k_0'$ are correct values: 15M+3S+1I+3SR+2H+2T
The averaging of all of the above-mentioned cases (a) to (d) yields:

14.5M+3S+1I+3SR+2H+2T.

The complexity of HarleyDBL was 18M+7S+1I. Here, as described above, according to the document [E. Knudsen. Elliptic Scalar Multiplication Using Point Halving. ASIA-CRYPTO '99, LNCS 1716, pp. 135-149, Springer-Verlag, 1999.], it is known that when a finite field is defined by a normal basis, the complexities of S (squaring), SR (square root operation), H (half-trace) (operation to find the root of a quadratic equation)), and T (trace (determination as to whether roots exist for a quadratic equation)) can be ignored, and only the complexities of M (multiplication) and I (inversion) need to be taken into account.

Therefore, when using a normal basis, Algorithm 10a [Algorithm 10a] described above is faster than the conventional algorithm [HarleyDBL] by 3.5M. Further, when a finite field is defined by a polynomial basis, according to the document [K. Fong, D. Hankerson, J. Lopez, and A. Menezes. Field inversion operation and point halving revised. Technical Report CORR2003-18, www.cacr.math.uwaterloo.ca/techreports/2003/corr2003-18.pdf18], it is known that generally, the complexities of SR and H are about SR=H=0.5M. Further, the complexity of T can be ignored. Further, it is known that the complexity of S is only about several tenths of M. However, it is also known that depending on the way in which the polynomial basis is chosen, the complexity of SR may become less than 0.5M.

The curve of Algorithm 10a [Algorithm 10a] mentioned above is also subject to the constraint $h_0=1$. Since Algorithm 10a [Algorithm 10a] mentioned above involves one multiplication operation of $h_0$, by setting as $h_0=1$, the complexity can be reduced by 1M. The complexity found by the averaging of all of the above-mentioned cases (a) to (d) is 13.5M+3S+1I+2.5SR+2H+2T.

On the other hand, the complexity of HarleyDBL is

15M+7S+1I.

It should be noted that when a finite field is defined by a normal basis, the complexities of S, SR, H, T can be ignored, and when a normal basis is used, Algorithm 10a [Algorithm 10a] becomes faster than the conventional algorithm [HarleyDBL] by 1.5M. It should be noted that exceptional cases can be computed on the basis of the exceptional cases in Processing Example 7 (proposed Method A2) described above.

Processing Example 10

Proposed Method C2

Processing Example 10 (Proposed Method C2) relates to a technique aimed at a further increase in the operation speed of the processing example mentioned above (Processing Example 5: Proposed Method C1). That is, when computing the halving of a divisor D on a hyperelliptic curve of genus 2 in characteristic 2 with random parameters, a hyperelliptic curve of genus 2 in characteristic 2 with parameters $h(x)=x^2+h_1x+h_0$, $f_4=0$, and a hyperelliptic curve of genus 2 in characteristic 2 with parameters $h(x)=x^2+x+h_0$, $f_4=0$, two candidates of the halved value arise. In this case, it is necessary to select the one with the correct value from the two candidates. When selecting the correct one, it is necessary to compute the trace, multiplication, and square root of a finite field. Which one of the two candidates is correct depends on the divisor D. Hence, if the divisor D is fixed, information as to which one of the two candidates is correct is retained in a table in advance, and this table is looked up when selecting the correct value, thereby omitting the above-mentioned extra computations.

Which one of $k_1, k_1'$ ($k_0, k_0'$) is correct depends on the input divisor D. Accordingly, if D is fixed, for example, when the base point is previously determined as in the case of Phase 1 of ECDH key exchange, ECDSA signature generation or verification, or the like, $[\frac{1}{2}^i]D$ is computed and information as to which of $k_1, k_1'$ ($k_0, k_0'$) is correct is recorded in a table in advance.

For example, two tables $T_1, T_0$ of the same bit size as the order of the base point are prepared, and the binary expression of these tables is defined as:

$T_1 = (t_{1,r-1}, \ldots, t_{1,0})$, and $T_0 = (t_{0,r-1}, \ldots, t_{0,0})$.

When finding $[\frac{1}{2}^i]D$, if such information that if $k_1$ is correct, then $t_{1,i}=0$ or else if $k_1$ is correct, then $t_{1,i}=1$; and if $k_1$ is correct, then $t_{1,i}=0$ or else if $k_0'$ is correct, then $t_{0,i}=1$ is stored in the tables, a bit string only about twice the size of the order of the base point suffices as the table size. By looking up these tables, the complexity of halving can be reduced.

The above-mentioned method as applied to Algorithm 8a [Algorithm 8a] HEC_HLV($h_2=1$, $f_4=0$) is represented as Algorithm 9a [Algorithm 9a] HEC_HLV($h_2=1$, $f_4=0$, with table-lookup). The complexity of the algorithm is $$18M+2SR+1I+2SR+2H.$$

Algorithm 9a HEC_HLV($h_2 = 1$, $f_4 = 0$, table-lookup)     [Formula 30]

Input: $D_2 = (U_2, V_2)$, $1/h_1^2$, $t_0$, $t_1$

Output: $D_1 = (U_1, V_1) = [1/2]D_2$ $U_i(x) = x^2 + u_{i1}x + u_{i0}$, $$V_i(x) = v_{i1}x + v_{i0}, \gcd(h, U_i) = 1, i = 1, 2$$

1. Solve $k_1 + k_1^2 u_{21} + 1 = 0$ $\alpha \leftarrow 1/u_{21}$ if $t_1 = 0$ then $k_1 \leftarrow H(u_{21})\alpha$ else $k_1 \leftarrow (H(u_{21}) + 1)\alpha$ 2. Solve $k_1 h_0 + k_0 h_1 + k_0^2 u_{21} + c_1 = 0$ $c_1 \leftarrow f_3 + v_{21} + u_{20} + u_{21}^2$ $c_0 \leftarrow f_2 + v_{20} + v_{21}(h_1 + v_{21}) + u_{21}(u_{20} + c_1)$ $w_0 \leftarrow u_{21}/h_1^2$, $\alpha \leftarrow h_1 \alpha$, $\gamma \leftarrow (c_1 + k_1 h_0)w_0$ if $t_0 = 0$ then $k_0 \leftarrow H(\gamma)\alpha$ else $k_0 \leftarrow (H(\gamma) + 1)\alpha$ 3. Compute $U_1$ $w_0 \leftarrow k_1^2$, $w_1 \leftarrow w_0 u_{20} + k_1 h_1 + u_{21}$, $w_2 \leftarrow k_0 + \sqrt{w_1 + k_0}$ $w_4 \leftarrow k_1 u_{21} + 1$, $u_{11} \leftarrow w_2 w_4$ $w_1 \leftarrow k_0 u_{20}$, $w_5 \leftarrow w_4 + 1$, $w_6 \leftarrow (k_0 + k_1)(u_{20} + u_{21})$ $u_{10} \leftarrow w_4 \sqrt{k_0(w_1 + h_0) + c_0}$ 4. Compute $V_1 = V_2 + h + kU_2 \bmod U_1$ $w_4 \leftarrow w_5 + k_0 + 1$, $w_5 \leftarrow w_1 + w_5 + w_6 + v_{21} + h_1$ $w_6 \leftarrow w_1 + v_{20} + h_0$, $w_7 \leftarrow w_2 + w_4$ $w_1 \leftarrow w_7 u_{10}$, $w_3 \leftarrow (k_1 + w_7)(u_{10} + u_{11})$ $v_{11} \leftarrow w_1 + w_2 + w_3 + w_5$ $v_{10} \leftarrow w_1 + w_6$ 6. $U_1(x) \leftarrow x^2 + u_{11}x + u_{10}$, $V_1(x) \leftarrow v_{11}x + v_{10}$ 7. return $D_1 = (U_1, V_1)$ Specifically, the above-mentioned method as applied to Algorithm 10a [Algorithm 10a HEC_HLV($h_2=h_1=1$, $f_4=0$, with table-lookup)] described above is represented as Algorithm 11a [Algorithm 11a HEC_HLV($h_2=h_1=1$, $f_4=0$, with table-lookup) below.

Algorithm 11a HEC_HLV     [Formula 31]

($h_2 = h_1 = 1$, $f_4 = 0$, with table − lookup)

-continued

Input: $D_2 = (U_2, V_2)$, $t_0$, $t_1$

Output: $D_1 = (U_1, V_1) = [1/2]D_2$ $U_i(x) = x^2 + u_{i1}x + u_{i0}$, $$V_i(x) = v_{i1}x + v_{i0}, \gcd(h, U_1) = 1$$

1. Solve $k_1 + k_1^2 u_{21} + 1 = 0$ and select correct $k_1$ via $t_1$ $\alpha \leftarrow 1/u_{21}$ if $t_1 = 0$ then $k_1 \leftarrow H(u_{21})\alpha$ else $k_1 \leftarrow (H(u_{21}) + 1)\alpha$ 2. Solve $k_1 h_0 + k_0 + k_0^2 u_{21} + c_1 =$ 0 and select correct $k_0$ via $t_0$ $c_1 \leftarrow f_3 + v_{21} + u_{20} + u_{21}^2$ $c_0 \leftarrow f_2 + v_{20} + v_{21} + v_{21}^2 + u_{21}(u_{20} + c_1)$ $\gamma \leftarrow (c_1 k_1 h_0) u_{21}$ $k_0 \leftarrow H(\gamma)\alpha$ if $t_0 = 0$ then $k_0 \leftarrow H(\gamma)\alpha$ else $k_0 \leftarrow (H(\gamma) + 1)\alpha$ 3. Compute $U_1$ $w_0 \leftarrow k_1^2$, $w_1 \leftarrow w_0 u_{20} + k_1 + u_{21}$ $w_2 \leftarrow k_0 + \sqrt{w_1 + k_0}$ $w_4 \leftarrow k_1 u_{21} + 1$, $u_{11} \leftarrow w_2 w_4$ $w_1 \leftarrow k_0 u_{20}$, $w_5 \leftarrow w_4 + 1$, $w_6 \leftarrow (k_0 + k_1)(u_{20} + u_{21})$ $u_{10} \leftarrow w_4 \sqrt{k_0(w_1 + h_0) + c_0}$ 5. Compute $V_1 = V_2 + h + kU_2 \bmod U_1$ $w_4 \leftarrow w_5 + k_0 + 1$, $w_5 \leftarrow w_1 + w_5 + w_6 + v_{21} + 1$ $w_6 \leftarrow w_1 + v_{20} + h_0$, $w_7 \leftarrow w_2 + w_4$ $w_1 \leftarrow w_7 u_{10}$, $w_3 \leftarrow (k_0 + w_7)(u_{10} + u_{11})$ $v_{11} \leftarrow w_1 + w_2 + w_3 + w_5$ $v_{10} \leftarrow w_1 + w_6$ 6. $U_1(x) \leftarrow x^2 + u_{11}x + u_{10}$, $V_1(x) \leftarrow v_{11}x + v_{10}$ 7. return $D_1 = (U_1, V_1)$ The complexity of Algorithm 11a [Algorithm 11a HEC_HLV($h_2=h_1=1$, $f_4=0$, with table-lookup) is $$14M+3S+1I+2SR+2H,$$

and further, by setting as $h_0=1$, the complexity can be reduced by 1M. The complexity in this case becomes $$13M+3S+1I+2SR+2H.$$

Processing Example 11

Proposed Method D2

Processing Example 11 (Proposed Method D2) relates to a method of computing the scalar multiplication of a divisor by using the method of computing the halving of a divisor as set forth in each of Processing Examples 7 to 10.

A method of computing scalar multiplication using the halving of a rational point on an elliptic curve is disclosed in each of the documents [E. Knudsen. Elliptic Scalar Multiplication Using Point Halving. ASIACRYPTO '99, LNCS 1716, pp. 135-149, Springer-Verlag, 1999.] and [K. Fong, D. Hankerson, J. Lopez, and A. Menezes. Field inversion operation and point halving revised. Technical Report CORR2003-18, www.cacr.math.uwaterloo.ca/techreports/2003/corr2003-18.pdf]. A method of computing scalar multiplication using the halving of a divisor on a hyperelliptic curve is executed on the basis of the scalar multiplication disclosed in those documents. Here, it is assumed that the divisor D subject to scalar multiplication is a prime number of a large order. Further, it is assumed that a scalar value d is an integer 0<d<r. To perform scalar multiplication using halving, first, the scalar value d expressed in binary representation needs to be expressed in half representation.

Here, it is assumed that $$m = \lfloor \log_2 r \rfloor \quad \text{[Formula 32]}$$

Further, the remainder when d is multiplied by $2^m$ and then divided by r, that is, $$\sum_{i=0}^{m} \hat{d}_i 2^i \leftarrow 2^m d (\bmod r) \quad \text{[Formula 33]}$$

is found. Next, this is divided by $2^m$ to yield $$\sum_{i=0}^{m} d_i / 2^i \leftarrow \sum_{i=0}^{m} \hat{d}_i 2^{i-m}. \quad \text{[Formula 34]}$$

The scalar value expressed by $$\sum_{i=0}^{m} d_i / 2^i \quad \text{[Formula 35]}$$

in the above-mentioned expression is used for scalar multiplication [halve-and-add binary] method using halving. Here, $$d_i, \hat{d}_i \in \{0, 1\} \quad \text{[Formula 36]}$$

The halve-and-add binary method (right-to-left) and halve-and-add binary method (left-to-right) are represented below as Algorithm 12a [Algorithm 12a] and Algorithm 13a [Algorithm 13a], respectively.

Algorithm 12a Halve-and-add binary Method(right-to-left) [Formula 37]

Input: $D \in J(F_{2^n})$ such that $2D \neq O$, $d \in Z, r: \text{order of } D, m = \lfloor \log_2 r \rfloor$ Output: scalar multiplication $dD$ 1. $\sum_{i=0}^{m} \hat{d}_i 2^i \leftarrow n^m d \bmod r, \hat{d}_i \in \{0, 1\}$ 2. $\sum_{i=0}^{m} d_i / 2^i \leftarrow \sum_{i=0}^{m} \hat{d}_i 2^{i-m}, d_i \in \{0, 1\}$ 3. $Q \leftarrow O, R \leftarrow D$ 4. for $i$ from 0 to $m$ do:

if $d_i = 1$ then $Q \leftarrow Q + R$ $R \leftarrow \text{HEC\_HLV}(R)$ 5. return $Q$ Algorithm 13a Halve-and-add binary Method(left-to-right) [Formula 38]

Input: $D \in J(F_{2^n})$ such that $2D \neq O, d \in Z$, $r: \text{order of } D, m = \lfloor \log_2 r \rfloor$ Output: scalar multiplication $dD$ 1. $\sum_{i=0}^{m} \hat{d}_i 2^i \leftarrow 2^m d \bmod r, \hat{d}_i \in \{0, 1\}$ 2. $\sum_{i=0}^{m} d_i / 2^i \leftarrow \sum_{i=0}^{m} \hat{d}_i 2^{i-m}, d_i \in \{0, 1\}$ 3. $Q \leftarrow O$ 4. for $i$ from $m$ downto 0 do:

$Q \leftarrow \text{HEC\_HLV}(Q)$ if $d_i = 1$ then $Q \leftarrow Q + D$ 5. return $Q$ HEC_HLV that appears in step 4 of each of Algorithm 12a [Algorithm 12a] and Algorithm 13a [Algorithm 13a] mentioned above may be HEC_HLV of Algorithm 5a [Algorithm 5a] described above using a random curve, HEC_HLV with constraints $h_2=1$, $f_4=0$ provided to the curve parameters of Algorithm 8a [Algorithm 8a], HEC_HLV with constraints $h_2=h_1=1$, $f_4=0$ provided to the curve parameters of Algorithm 10a [Algorithm 10a], or HEC_HLV with constraints $h_2=h_1=h_0=1$, $f_4=0$ provided to the curve parameters of Algorithm 10a [Algorithm 10a].

In the case of the halving operation descried with reference to Processing Examples 1 to 6 above, for example, $1/u_{21}$ and $1/u_{11}$ are required for the input and output, respectively, in Algorithm 10 shown in [Processing Example 3 (Proposed Method B1)] or Algorithm 11 shown in [Processing Example 5 (Proposed Method C1)] described above. Accordingly, $\frac{1}{2}^i$-times multiplication of the base point D, that is, $(\frac{1}{2})D, (\frac{1}{2^2})D, (\frac{1}{2^3})D, (\frac{1}{2^i})D \ldots$ can be given with the output $1/u_{11}$ of the previous halving operation taken as the input of the next halving operation, thereby enabling efficient computation. Accordingly, when computing a scalar multiple by the halve-and-add binary method (right-to-left), this can be accomplished by adding the $\frac{1}{2}^i$ multiple of the base point D as appropriate. Scalar multiplication can thus performed in an efficient manner in the case of the right-to-left method.

On the other hand, in the case of the left-to-right method, there are cases where the output of the previous halving operation cannot be taken as the input of the next halving operation. In step 4 of Algorithm 13a [Algorithm 13a] described above, first, an intermediate result Q obtained halfway through the algorithm is multiplied by $\frac{1}{2}$ ($Q \leftarrow \text{HEC\_HLV}(Q)$), and if one bit of the scalar value is 1, the base point is added to the intermediate result (if di=1 then $Q \leftarrow Q+D$). Accordingly, if a bit is 1, for the next bit, the output $1/u_{11}$ of the previous halving operation cannot be given as the input of the next halving operation, so it is necessary to compute an input value $1/u_{21}$ anew. Inversion of a finite field involves much more complexity than multiplication. Therefore, in the case of the halving method described in Processing Examples 1 to 6 above, when the left-to-right is applied, it is necessary to perform an extra inversion operation for generating the input value of halving, which detracts from the efficiency of computation. However, according to the proposed methods described with reference to the processing examples from Processing Example 7 onward, $1/u_{21}$ is not required for the input, so computation can be performed with the same complexity irrespective of whether the left-to-right or right-to-left method is employed.

Further, HEC_HLV in step 4 of the halve-and-add binary method (right-to-left) of Algorithm 12a [Algorithm 12a] described above may be HEC_HLV with the table-lookup method applied to Algorithm 5a [Algorithm 5a] using a random curve, HEC_HLV with constraints $h_2=1$, $f_4=0$ provided and the table-lookup method applied to the curve parameters of Algorithm 8a [Algorithm 8a], HEC_HLV with constraints $h_2=h_1=1$, $f_4=0$ provided and the table-lookup method applied to the curve parameters of Algorithm 10a [Algorithm 10a], or HEC_HLV with constraints $h_2=h_1=h_0=1$, $f_4=0$ provided and the table-lookup method applied to the curve parameters of Algorithm 10a [Algorithm 10a].

Further, the window method can be applied other than the binary method. Let D represent the input divisor and w represent the window width. The divisor for which the intermediate result is substituted is represented as Q(O.

With respect to integer $i=(i_{w-1}, i_{w-2} \ldots i_0)2 \in \{0, 1, \ldots, 2_w-1\}$, the following preliminary computation:

$$D_i \leftarrow \sum_{j=0}^{w-1} \frac{i_j}{2^j} D \qquad \text{[Formula 39]}$$

is carried out to compute a table composed of $2^w$ divisors in advance.

Further, the scalar value d is expanded in $\frac{1}{2}^w$-ary representation as follows.

$$\sum_{i=0}^{l} c_i / (2^w)^i \leftarrow \sum_{i=0}^{m} d_i / 2^i \qquad \text{[Formula 40]}$$

First, halving is applied to Q for w times to give $Q \leftarrow (\frac{1}{2}^w)Q$.

Next, a scalar value $c_l$ is scanned from the most significant bits of d with the window width w, and a corresponding divisor value in the table is looked up, and this is added to the result as follows.

$Q \leftarrow Q+D_{c_l}$

This is repeated down to $c_0$.

This computation method [halve-and-add window method] is represented below as Algorithm 14a [Algorithm 14a].

Algorithm 14a Halve-and-add Window Method [Formula 41]

Input: $D \in J(F_{2^n})$ such that $2D \ne O$, $d \in Z$, r: order of D, $m = \lfloor \log_2 r \rfloor$ Output: scalar multiplication dD 1. $\sum_{i=0}^{m} \hat{d}_i 2^i \leftarrow 2^m d \bmod r$, $\hat{d}_i \in \{0,1\}$ 2. $\sum_{i=0}^{m} d_i / 2^i \leftarrow \sum_{i=0}^{m} \hat{d}_i 2^{i-m}$, $d_i \in \{0,1\}$ 3. $\sum_{i=0}^{l} c_i / (2^w)^i \leftarrow \sum_{i=0}^{m} d_i / 2^i$, $c_i \in \{0, 1, \ldots, 2^w - 1\}$ 4. $D_i \leftarrow \frac{i_{w-1}}{2^{w-1}} D + \ldots + \frac{i_0}{2^0} D$, for $i = (i_{w-1} \ldots i_0)_2 \in \{0, 1, \ldots, 2^w - 1\}$ 5. $Q \leftarrow O$ 6. for i from l downto 0 do:

for j from 1 to w do:

$Q \leftarrow \text{HEC\_HLV}(Q)$ $Q \leftarrow Q + D_{c_i}$ 7. return Q

Further, the inverse of divisor $D=(U,V)$, $U=x^2+u_1x+u_0$, and $V=v_1x$ and $v_0$, can be represented as follows:

$-D=(U, V+h \bmod U)=(U,(v_1+h_2u_1+h_1)x+(v_0+h_2u_0+h_0))$.

In particular, if $h_2=1$, no finite field multiplication is required, and four finite field addition operations suffices to find $-D$ from D. The subtraction of the divisor D can be computed by the addition of the divisor $-D$. That is, the addition and subtraction of a divisor can be found with the same complexity.

Accordingly, it is possible to express a scalar value by also using negative values, and carry out scalar multiplication using the negative values. First, using NAK (Non-Adjacent Form), a given integer s is expressed by $\{-1, 0, 1\}$. In NAF, the scalar value of the integer s expressed in binary representation is scanned from the least significant bits. If there is a spot where number 1's appear adjacent to each other, this is expressed as follows, for example:

in the case of (11), this is expressed as (10-1), that is, $3=2^2-1$; and in the case of (111), this is expressed as (100-1), that is, $7=2^3-1$.

The computation method for NAF is represented below as Algorithm 15a [Algorithm 15a].

Algorithm 15a Conversion to NAF [Formula 42]

Input: $s = \sum_{j=0}^{l-1} s_j 2^j \in Z, s_j \in \{0,1\}$

Output: $NAF(s) = \sum_{j=0}^{l} s'_j 2^j, s'_j \in \{-1,0,1\}$

1. $c_0 \leftarrow 0, s_l \leftarrow 0$

2. For $j = 0$ to $l$ do:

$c_{j+1} \leftarrow \lfloor (s_j + s_{j+1} + c_j)/2 \rfloor$ $s'_j \leftarrow s_j + c_j - 2c_{j+1}$ 3. return $NAF(S) = (s'_l s'_{l-1} \ldots s'_0)$ NAF represents an expression with the least number of non-zero bits. Since divisor addition or subtraction is performed at the portions of non-zero bits, scalar multiplication can be computed faster as the number of non-zero bits becomes smaller. The scalar value expression using NAF can be applied to the halve-and-add binary method and the halve-and-add window method. HEC_HLV used in each of the halve-and-add binary method and halve-and-add window method may be HEC_HLV of Algorithm 5a [Algorithm 5a] using a random curve, HEC_HLV with constraints $h_2=1$, $f_4=0$ provided to the curve parameters of Algorithm 8a [Algorithm 8a], HEC_HLV with constraints $h_2=h_1=1$, $f_4=0$ provided to the curve parameters of Algorithm 10a [Algorithm 10a], or HEC_HLV with constraints $h_2=h_1=h_0=1$, $f_4=0$ provided to the curve parameters of Algorithm 10a [Algorithm 10a]. The halve-and-add binary method using NAF is represented below as Algorithm 16a [Algorithm 16a].

Algorithm 16a Halve-and-add NAF Binary Method [Formula 43]

Input: $D \in J(F_{2^n})$ such that $2D \neq O$, $d \in Z, r$: order of $D, m = \lfloor \log_2 r \rfloor$ Output: scalar multiplication $dD$ 1. $\sum_{i=0}^{m} \hat{d}_i 2^i \leftarrow NAF(2^m d \bmod r), \hat{d}_i \in \{-1,0,1\}$ 2. $\sum_{i=0}^{m} d_i / 2^i \leftarrow \sum_{i=0}^{m} \hat{d}_i 2^{i-m}, d_i \in \{-1,0,1\}$ 3. $Q \leftarrow O$ 4. for $i$ from $m$ downto 0 do:

$Q \leftarrow$ HEC_HLV($Q$)

if $d_i > 0$ then $Q \leftarrow Q + D$ if $d_i < 0$ then $Q \leftarrow Q - D$ 5. return $Q$

[Verification of Increased Computation Speed]

Next, the complexity of the computation applied to each of Processing Examples 7 to 11 described above is found, and verification is made as to an increase in computation speed.

In the case of HEC_HLV($h_2=1$, $f_4=0$), the required complexity is, on average, $19.5M+2S+1I+3SR+2H+2T$.

First, a case where a finite field is defined by a normal basis is considered. As described above, when using a normal basis, only the complexity of M and I may be taken into account. According to the document [A. Menezes. Elliptic Curve Public Key Cryptosystems. Kluwer Academic Publishers, 1993.], assuming that finite fields are Fq, $q=2^n$, one inversion operation is equivalent to the number of multiplication operations computed by the following expression, that is:

$\lfloor \log_2(n-1) \rfloor w(n-1)-1$ [Formula 44]

In this case, $w(n-1)$ denotes the number of 1's in the binary expression of $n-1$. For example, if $n=83, 89, 113$, then $I=8M$, and if $n=103$, then $I=9M$.

Here, assuming that $I=8M$, the complexity of

HEC_HLV($h_2=1, f_4=0$)

is represented as $19.5M+1I=27.5M$.

On the other hand, in the case of HarleyDBL, its complexity is represented as $21M+1I=29M$, so HEC_HLV is about 5% faster than HarleyDBL. Further, when the table-lookup method is used, the complexity becomes $18M+1I=26M$, so HEC_HLV is about 10% faster than HarleyDBL.

Further, in the case of HEC_HLV($h_2=h_1=1, f_4=0$), the complexity is, on average, $14.5M+3S+1I+2.5SR+2H+2T$.

In this case, $14.5M+1I=22.5M$.

On the other hand, in the case of HarleyDBL, the complexity is represented as $18M+1I=26M$, so HEC_HLV is about 13% faster than HarleyDBL. Further, when the table-lookup method is used, the complexity becomes $14M+1I=22M$, so HEC_HLV is about 15% faster than HarleyDBL.

Further, the complexity of HEC_HLV($h_2=h_1=h_0=1, f_4=0$) is, on average, $13.5M+3S+1I+2.5SR+2H+2T$.

In this case, $13.5M+1I=21.5M$.

On the other hand, in the case of HarleyDBL, its complexity is $15M+1I=23M$, so HEC_HLV is about 6% faster than HarleyDBL. Further, when the table-lookup method is used, the complexity becomes $17M+1I=25M$, so HEC_HLV is about 14% faster than HarleyDBL.

Next, the complexity in the case of a polynomial basis will be evaluated. It is assumed that the complexities of S, I, SR, H, T are as follows: $S=0.1M$, $I=8M$, $SR=0.5M$, $H=0.5M$, $T=0.5M$. In the case of HEC_HLV($h_2=1, f_4=0$), the complexity is, on average, $19.5M+2S+1I+2.5SR+2H+2T=29.95M$.

On the other hand, in the case of HarleyDBL, the complexity is $$21M+5S+1I=29.5M,$$

so HarleyDBL is about 1% faster than HEC_HLV.

Further, when the table-lookup method is used, the complexity becomes $$18M+2S+1I+2SR+2H=28.2M,$$

so HEC_HLV is about 4% faster than HarleyDBL.

Further, in the case of HEC_HLV($h_2=h_1=1$, $f_4=0$), the complexity is, on average, $$14.5M+3S+1I+2.5SR+2H+2T=25.05M.$$

On the other hand, in the case of HarleyDBL, the complexity is $$18M+7S+1I=26.7M,$$

so HEC_HLV is about 6% faster than HarleyDBL.

Further, when the table-lookup method is used, the complexity becomes $$14M+3S+1I+2SR+2H=24.3M,$$

so HEC_HLV is about 9% faster than HarleyDBL.

Further, the complexity of HEC_HLV($h_2=h_1=h_0=1$, $f_4=0$) is, on average, $$13.5M+3S+1I+2.5SR+2H+2T=24.05M.$$

On the other hand, in the case of HarleyDBL, its complexity is $$15M+7S+1I=23.7M,$$

so HarleyDBL is about 1% faster than HEC_HLV. Further, when the table-lookup method is used, the complexity becomes $$13M+3S+1I+2SR+2H=23.3M,$$

so HEC_HLV is about 2% faster than HarleyDBL.

Further, speed comparison was carried out for the case of a polynomial basis through software implementation.

The software implementation was carried out under the environment as indicated below:
CPU: PentiumII 300 MHx
OS: RedHat7.3
Compiler: gcc2.96.

The operations of M (multiplication) and S (squaring), I (inversion), SR (square root operation) and T (trace (determination as to whether roots exist for a quadratic equation)), and H (half-trace) (operation to find the root of a quadratic equation)) were carried out in the manner as disclosed in the following documents: [D. Hankerson, J. Hernandez, and A. Menezes. Software Implementation of Elliptic Curve Cryptography over Binary Fields. CHES 2000, LNCS 1965, pp. 1-24, 2000. Algorithm 4.6, 4.7]; [S. Shantz. From Euclid's GCD to Montgomery Multiplication to the Great Divide. TR-2001-95, Sun Microsystems, Inc., 2001.]; [K. Fong, D. Hankerson, J. Lopez, and A. Menezes. Field inversion operation and point halving revised. Technical Report CORR2003-18, www.cacr.math.uwaterloo.ca/techreports/2003/corr2003-18.pdf]; and [K. Fong, D. Hankerson, J. Lopez, and A. Menezes. Field inversion operation and point halving revised. Technical Report CORR2003-18, www.cacr.math.uwaterloo.ca/techreports/2003/corr2003-18.pdf Algorithm 4.7], respectively.

M, S, I, SR, H, T were implemented with respect to three finite fields of n=83, 89, 113, and the ratios to M were found. In this case, the following irreducible polynomials were used:
in the case of n=3, $$z^{83}+z^7+z^4+z^2+1=0;$$

in the case of n=9, $$z^{89}+z^{38}+1=0; \text{ and}$$

in the case of n=113, $$z^{113}+z^9+1=0$$

The complexities in the respective cases were as follows.
n=83: S/M=0.12, I/M=7.96, SR/M=0.57, H/M=0.58
n=89: S/M=0.05, I/M=8.74, SR/M=0.14, H/M=0.61
n=113: S/M=0.06, I/M=8.56, SR/M=0.10, H/M=0.50

Applying these to the complexity of HarleyDBL, 21M+5S+1I, yields the following.
n=83: HarleyDBL 29.56M
n=89: HarleyDBL 29.99M
n=113: HarleyDBL 29.86M Applying these to the complexity of HEC_HLV($h_2=1$, $f_4=0$), 19.5M+2.5SR+2H+2T, yields the following.
n=83: HEC_HLV($h_2=1$, $f_4=0$) 30.285M
n=89: HEC_HLV($h_2=1$, $f_4=0$) 29.91M
n=113: HEC_HLV($h_2=1$, $f_4=0$) 29.43M In this case, when n=83, HarleyDBL is 2% faster than HEC_HLV. Further, when n-89, 113, HEC_HLV is about 0.3%, 1.5% faster than HarleyDBL, respectively.

Further, applying these to the complexity of HEC_HLV ($h_2=1$, $f_4=0$) to which the table-lookup method is applied, 18M+2S+1I+2SR+2H, yields the following.
n=83: HEC_HLV($h_2=1$, $f_4=0$, with table-lookup) 28.5M
n=89: HEC_HLV($h_2=1$, $f_4=0$, with table-lookup) 28.34M
n=113: HEC_HLV($h_2=1$, $f_4=0$, with table-lookup) 27.88M In this case, when n=83, 89, 113, HEC_HLV is 4%, 5%, 6% faster than Harley DBL, respectively.

Further, in the case of $h_2=h_1=1$, $f_4=0$, applying these to the complexity of HarleyDBL, 18M+7S+1I, yields the following.
n=83: HarleyDBL 27.4M
n=89: HarleyDBL 27.09M
n=113: HarleyDBL 26.98M Next, applying these to the complexity of HEC_HLV ($h_2=h_1=1$, $f_4=0$), 14.5M+3S+1I+2.5SR+2H+2T, yields the following.
n=83: HEC_HLV($h_2=1$, $f_4=0$) 25.405M
n=89: HEC_HLV($h_2=1$, $f_4=0$) 24.96M
n=113: HEC_HLV($h_2=1$, $f_4=0$) 24.49M In this case, when n=83, 89, 113, HEC_HLV is 7%, 8%, 10% faster than HarleyDBL, respectively.

Further, applying these to the complexity of HEC_HLV ($h_2=h_1=1$, $f_4=0$) to which the table-lookup method is applied, 14M+3S+1I+2SR+2H, yields the following.
n=83: HEC_HLV($h_2=h_1=1$, $f_4=0$, with table-lookup) 24.62M
n=89: HEC_HLV($h_2=h_1=1$, $f_4=0$, with table-lookup) 24.39M
n=113: HEC_HLV($h_2=h_1=1$, $f_4=0$, with table-lookup) 23.94M In this case, when n=83, 89, 113, HEC_HLV is 10%, 8%, 11% faster than Harley DBL, respectively.

Further, in the case of $h_2=h_1=h_0=1$, $f_4=0$, applying these to the complexity of HarleyDBL, 15M+7S+1I, yields the following.
  n=83: HarleyDBL 23.8M
  n=89: HarleyDBL 24.09M
  n=113: HarleyDBL 23.98M Next, applying these to the complexity of HEC_HLV ($h_2=h_1\,h_0=1$, $f_4=0$), 13.5M+3S+1I+2.5SR+2H+2T, yields the following.
  n=83: HEC_HLV($h_2=h_1=h_0=1$, $f_4=0$) 24.405M
  n=89: HEC_HLV($h_2=h_1=h_0=1$, $f_4=0$) 23.96M
  n=113: HEC_HLV($h_2=h_1=h_0=1$, $f_4=0$) 23.49M In this case, when n=83, HarleyDBL is 2% faster than HEC_HLV. Further, when n=89, 113, HEC_HLV is 0.5%, 2% faster than Harley DBL, respectively.

Further, applying these to the complexity of HEC_HLV ($h_2=h_1=h_0=1$, $f_4=0$) to which the table-lookup method is applied, 13M+3S+1I+2SR+2H, yields the following.
  n=83: HEC_HLV($h_2=h_1=h_0=1$, $f_4=0$ with table-lookup) 23.62M
  n=89: HEC_HLV($h_2=h_1=h_0=1$, $f_4=0$ with table-lookup) 23.39M
  n=113: HEC_HLV($h_2=h_1=h_0=1$, $f_4=0$ with table-lookup) 22.94M In this case, when n=83, 89, 113, HEC_HLV is 1%, 3%, 4% faster than Harley DBL, respectively.

From the foregoing, it can be said that HEC_HLV is faster than HarleyDBL in most of the cases. When the curve parameters are $h_2=h_1=1$, $f_4=0$, in particular, HEC_HLV is faster than HarleyDBL in all the cases.

Next, the complexity of scalar multiplication is considered. With regard to the above-mentioned examples, in the cases where HEC_HLV is faster than HarleyDBL, scalar multiplication using the combination of addition and halving is faster than scalar multiplication using the combination of addition and doubling. Now, a comparison will be made on the specific complexity of scalar multiplication in each individual case. As for the curve parameters, $h_2=h_1=1$, f4=0 are used. Further, as the scalar multiplication algorithm, the above-described NAF+binary method (Algorithm 16a [Algorithm 16a]) is used. Since the ratio of steps 1, 2 to the entire scalar multiplication process in this algorithm is very small, the complexity thereof is ignored. Here, the complexity is considered for the cases of n=83, 89, 113 for both a normal basis and a polynomial basis. Further, the order of the base point is assumed to be 165 bits, 177 bits, 225 bits with respect to n=83, 89, 113, respectively. Further, in the repeating portion of step 4, the repetition is made for the number of bits of the order of the base point. Divisor addition is carried out in the manner as disclosed in the document [T. Lange, Efficient arithmetic on genus 2 hyperelliptic curves over finite fields via explicit formulae. Cryptology ePrint Archive, 2002/121, IACR, 2002]. It should be noted that the curve parameters are $h_2=h_1=1$, $f_4=0$.

The complexity required for the divisor addition in this case is 21M+3S+1I. The scalar value is expressed by {−1, 0, 1} using NAF. If the scalar value is defined as m, there are about m/3 non-zero bits. Therefore, the complexity of NAF+ binary method is computed as follows: ((the complexity of addition•subtraction)/3+(the complexity of halving or doubling))×(the number of bits of the order of the base point).

First, the case of a normal basis will be considered.
It is assumed that I=8M.
In the case of $h_2=h_1=1$, $f_4=0$,
  n=83: addition•doubling: 5885M
  n=89: addition•doubling: 6313M
  n=113: addition•doubling: 8025M In the case of $h_2=h_1=1$, $f_4=0$,
  n=83: addition•halving: 5307.5M
  n=89: addition•halving: 5693.5M
  n=113: addition•halving: 7237.5M
In the case of $h_2=h_1=1$, $f_4=0$+table loop-up method,
  n=83: addition•halving: 5225M
  n=89: addition•halving: 5605M
  n=113: addition•halving: 7125M Next, the case of a polynomial basis is considered.
In the case of $h_2=h_1=1$, $f_4=0$,
  n=83: addition•doubling: 6116M
  n=89: addition•doubling: 6505.93M
  n=113: addition•doubling: 8245.5M
In the case of $h_2=h_1=1$, $f_4=0$,
  n=83: addition•halving: 5786.82M
  n=89: addition•halving: 6128.92M
  n=113: addition•halving: 7685.25M
In the case of $h_2=h_1=1$, $f_4=0$+table loop-up method
  n=83: addition•halving: 5657.3M
  n=89: addition•halving: 6028.03M
  n=113: addition•halving: 7561.5M It can be said that (scalar multiple of addition•halving) is faster than (scalar multiple of addition•doubling) by about 10 to 11% in the case of a normal basis, and by about 5 to 8% in the case of a polynomial basis.

As has been described above, according to the processing of the present invention, halving on elliptic curve cryptography is extended to hyperelliptic curve cryptography to thereby realize fast computation.

In the case of cryptographic computation employing computations on a divisor on a hyperelliptic curve, an arithmetic computation that puts a large load on the processing is the scalar multiplication of a divisor. In this regard, the processing according to the present invention as described above enables faster scalar multiplication to achieve a considerable improvement in the processing of hyperelliptic curve cryptography.

As described above, HECC (Hyper-Elliptic Curve Cryptography) is a generalized concept of ECC (Elliptic Curve Cryptography). Hence, the present invention can be applied to cryptographic processing using ECC (Elliptic Curve Cryptography) employed in a variety of applications, specifically including signature processing, generation of encrypted data, decryption, key pre-distribution system, and authentication processing. Faster computation can be achieved by replacing the portion of scalar multiplications in the computing processing of ECC (Elliptic Curve Cryptography) by the above-mentioned scalar multiplications.

[Functional Configuration of the Cryptographic System]

Figure 7:
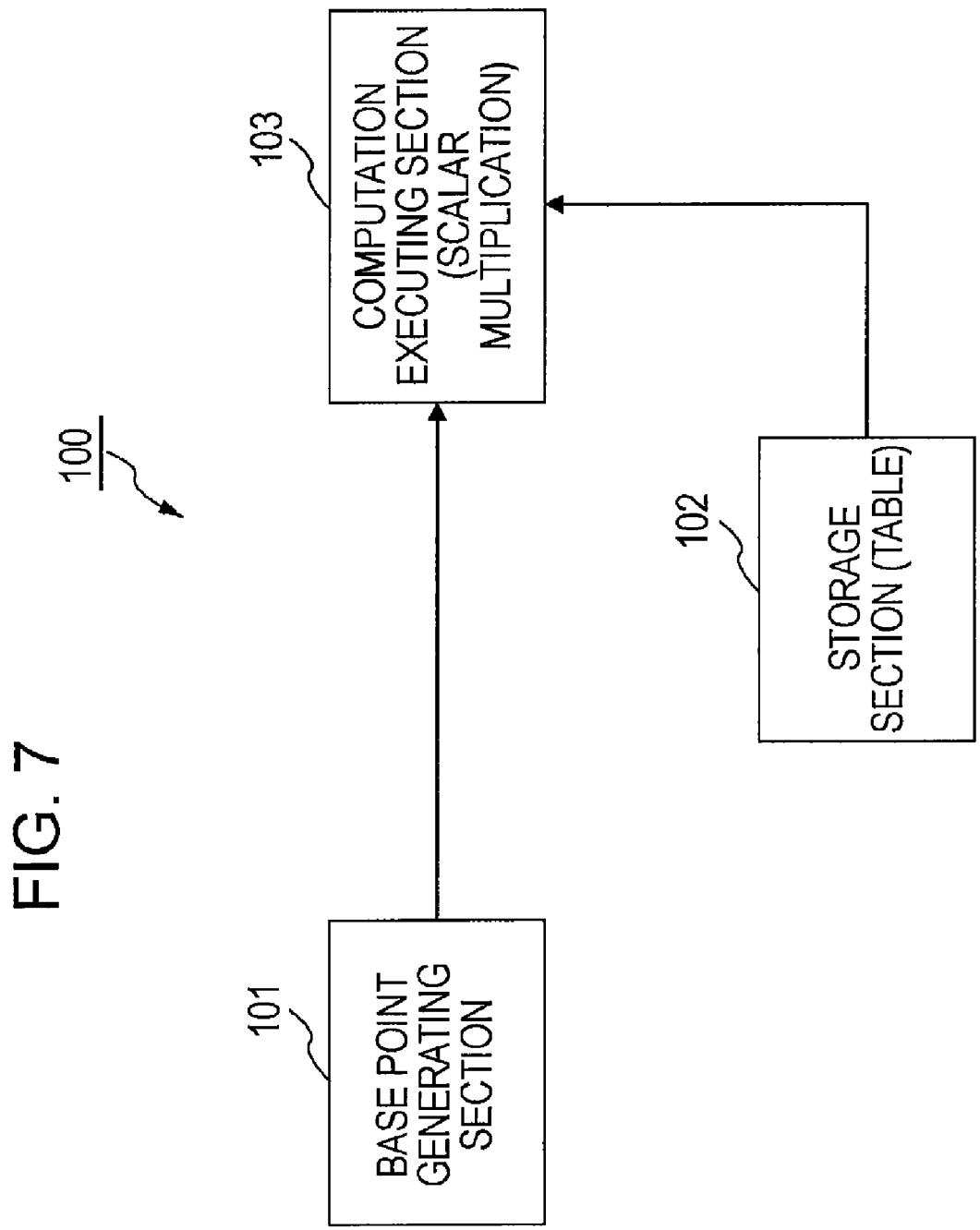
FIG. 7 is a block diagram showing the functional configuration of a cryptographic system executing cryptographic computation according to the present invention.

FIG. 7 is a block diagram showing the functional configuration of a cryptographic system according to the present invention. A cryptographic system 100 includes a base-point generating section 101 that generates a divisor D as a base point, a storage section 102 storing the table described with reference to Processing Example 5 mentioned above, that is, a table recording information as to which of $k_1$, $k_1'$, ($k_0$, $k_0'$) is correct on the basis of the computed value of $[½^i D]$ with respect to a divisor D fixed in advance, and a computation executing section 103.

The computation executing section 103 executes computing operations including as computing processing in the computation of scalar multiplication with respect to a divisor D on a hyperelliptic curve. Specifically, the computation executing section executes computing operations including in the scalar multiplication with respect to a divisor on a hyperelliptic curve of genus 2 in characteristic 2 with random parameters.

For example, computation executing section 103 executes computing operations including in the scalar multiplication with respect to a divisor D on a hyperelliptic curve of genus 2 in characteristic 2 with parameters $h(x)=x^2+x+h_0$, $f_4=0$, or in the scalar multiplication with respect to a divisor D on a hyperelliptic curve of genus 2 in characteristic 2 with a parameter $h(x)=x$.

[Applications of the Invention to an Algorithm for Generating and Verifying a Digital Signature]

The following description explains a case in which the computation technique according to the present invention is applied to the scalar multiplication of an ECDSA (EC-Digital Signature Algorithm), which is an algorithm for generation and verification of a digital signature and to which elliptic curve cryptography is applied, as an example of a specific cryptographic algorithm to which the processing of the present invention can be applied. In accordance with the IEEE1363, a digital signature is generated and verified by execution of the following sequence.

(1): Inputs
(1-1): Input domain parameters and a base point G (order r) of an elliptic curve
(1-2): Input a secret key s of the signatory.
(1-3): Input a plain text M.
(2): Generation of a Key
(2-1): Use W=sG as a public key for the secret key s.
(3): Generation of a Signature
(3-1): Generate a random integer u, where 0<u<r.
(3-2): Compute $V=uG=(x_v, y_v)$.
(3-3): Convert $x_v$ into an integer i.
(3-4): Compute c=i mod r. If c=0, go to step 3-1.
(3-5): f=h (M), where h is a hash function.
(3-6): Compute $d=u^{-1}$ (f+sc) mod r. If d=0, go to step 3-1.
(3-7): Use (c, d) as a signature for the plain text M.
(4): Verification of a Signature
(4-1): Check whether relations 0<c<r and 0<d<r hold true. If they do not hold true, output "invalid".
(4-2): Compute $h=d^{-1}$ mod r, $h_1$=fh mod r, and $h_2$=ch mod r.
(4-3): Compute $P=(x_p, y_p)=h_1G+h_2W$ If P=0, output "invalid".
(4-4): Convert $x_p$ into an integer i.
(4-5): Compute c'=i mod r.
(4-6): If c'=c, output "valid". Otherwise, output "invalid".

The proposed techniques using a hyperelliptic curve can be applied to the following steps of the above algorithm:
(2-1): Use W=sG as a public key for the secret key s;
(3-2): Compute $V=uG=(x_v, y_v)$; and
(4-3): Compute $P=(x_p, y_p)=h_1G+h_2W$ If P=0, output "invalid".

The computing processing W=sG, V=uG, and $P=(x_p, y_p)=h_1G+h_2W$ in each of the respective steps (2-1), (3-2), and (4-3) represents scalar multiplication processing on a divisor and can be carried out faster through the application of the present invention. Further, the computing processing sG, uG, and $h_1G$ represents scalar multiplication processing on a fixed divisor and can be carried out faster through the application of the table-lookup method according to the present invention.

[Hardware Configuration Example of the Cryptographic System]

Finally, an example configuration of an IC module 200 serving as a device for executing the cryptographic processing described above will be described with reference to FIG. 8. The processing described above can be executed by a variety of information processing apparatus such as a PC, an IC card, and a reader/writer. The IC module 200 shown in FIG. 8 can be incorporated in these information-processing apparatus.

Figure 8:
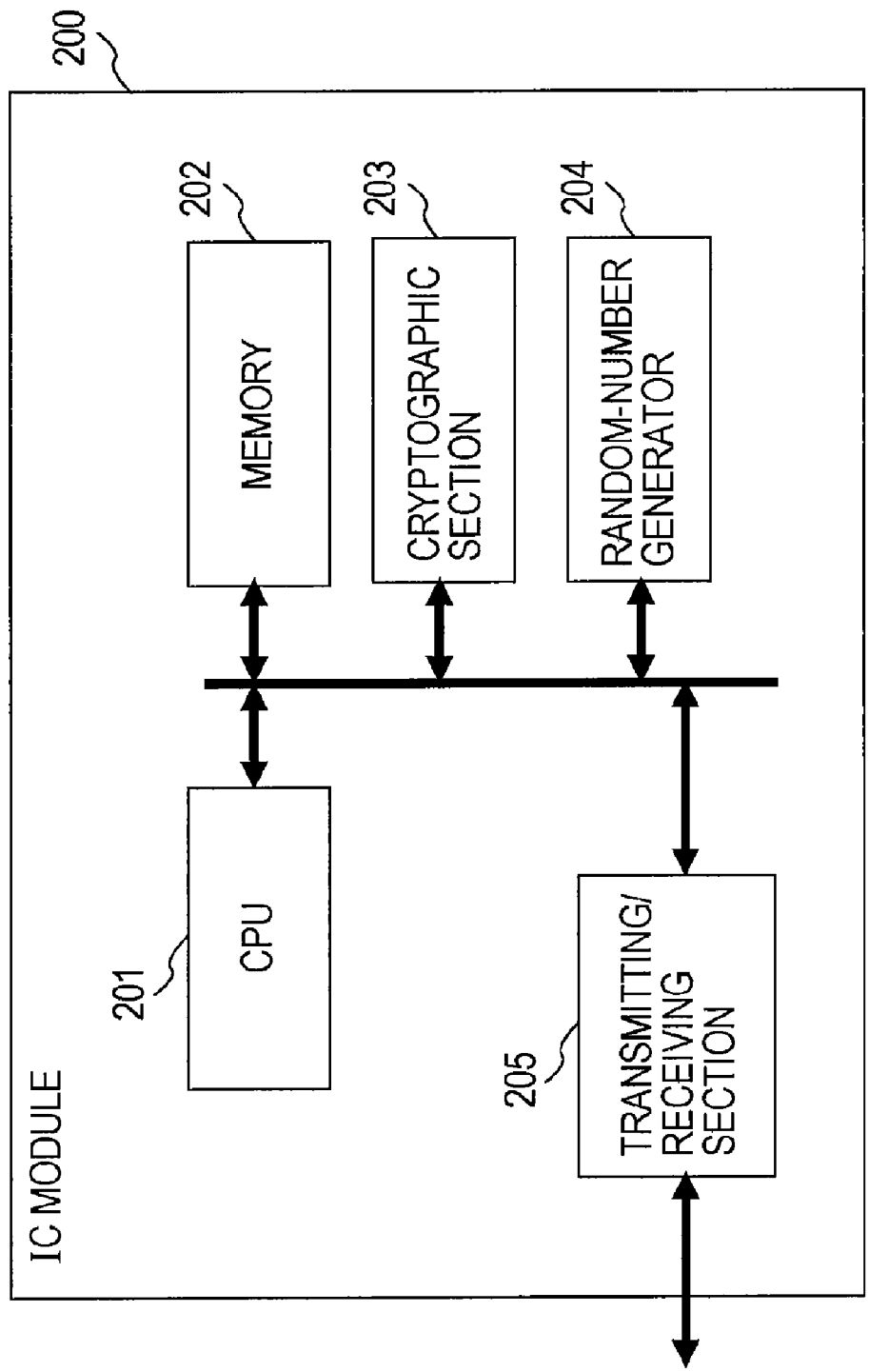
FIG. 8 is a diagram showing an example of the configuration of an IC module as an example of a cryptographic processing executing device that executes the cryptographic computation according to the present invention.

A CPU (Central Processing Unit) 201 shown in FIG. 8 is a processor for executing a variety of programs to start and end cryptographic processing, control transmissions and receptions of data, and control transfers of data among respective components. A memory 202 includes a ROM (Read Only Memory) and a RAM (Random Access Memory). The ROM stores programs to be executed by the CPU 201 or fixed data as computational parameters. The RAM is used as the storage area/work area for storing programs to be executed by the CPU 201 to carry out processing, and computational parameters that change as the processing of programs proceeds.

It should be noted that a computation executing program stored in the memory 202 is set as a program including the sequence of execution of the addition and doubling, which are performed as the base point setting processing and the scalar multiplication processing described above. In addition, the memory 202 can also serve as a storage area for key data or the like required for cryptographic processing. It is preferable to design the storage area for data or the like as a memory area having a tamper-proof structure.

A cryptographic section 203 executes processing such as cryptographic processing including the scalar multiplication described above and decryption processing. It should be noted that while the cryptographic section 203 is shown as an independent module, such an independent cryptographic processing module may not be provided. That is, a configuration may be adopted in which, for example, a cryptographic program can be stored in the ROM, and the CPU 201 reads out the cryptographic program from the ROM and executes the program.

A random-number generator 204 executes the processing of generating a random number required for the generation of a key or the like necessary for cryptographic processing.

A transmitting/receiving section 205 is a data-communication processing unit for executing data communications with an external apparatus. The transmitting/receiving section 205 executes data communications with an IC module such as a reader/writer, and executes such processing as the outputting of encrypted text generated in the IC module or inputting of data from an external apparatus such as a reader/writer.

The present invention has been described in detail so far with reference to its specific embodiments. It is obvious, however, that a person skilled in the art can anticipate various modifications and alternatives to the embodiments without departing from the scope of the present invention. That is, the foregoing disclosure of the present invention has been made only by way of examples and should not be construed restrictively. The scope of the present invention should be determined by reference to the appended claims.

The series of processing described in this specification can be executed by hardware, software or a composite configuration of both. If the series of processing is to be executed by software, the series of processing can be executed by installing a program recording the processing sequence into a memory of a computer built in dedicated hardware, or by installing the program into a general purpose computer capable of executing various processing.

For example, the program may be stored in advance in a hard disc or a ROM (Read Only Memory) as a recording medium. Alternatively, the program may be stored (recorded) temporarily or permanently in a removable recording medium such as a flexible disc, a CD-ROM (Compact Disc Read Only Memory), an MO (Magneto-optical) disc, a DVD (Digital Versatile Disc), a magnetic disc, and a semiconductor memory. Such a removable recording medium can be provided in the form of so-called package software.

Other than being installed into a computer from the above-described removable recording medium, the program can be wireless-transferred to a computer from a download site, or wired-transferred to a computer via a network such as a LAN (Local Area Network) or the Internet. The computer receives the program thus transferred and installs the program into a built-in recording medium such as a hard disk.

The various processing described in this specification may be executed not only time sequentially in the order as they appear in the description but may be executed in parallel or independently depending on the throughput of the device executing the processes. Further, the term system as used in this specification refers to a logical assembly of a plurality of devices, and is not limited to one in which devices of respective configurations are located within the same casing.

INDUSTRIAL APPLICABILITY

According to the configuration of the present invention, halving on elliptic curve cryptography is extended to hyperelliptic curve cryptography to thereby realize fast computation. In the case of cryptographic computation employing computations on a divisor on a hyperelliptic curve, a computing operation that puts a large load on the processing is the scalar multiplication of a divisor. Hence, by realizing faster scalar multiplication by the processing according to the present invention as described above, a considerable improvement can be achieved in terms of the processing of hyperelliptic curve cryptography. The present invention can be thus applied to apparatuses, devices, and the like required to perform fast and secure cryptographic computations, such as an IC card.

According to the configuration of the present invention, in scalar multiplication with respect to a divisor D in hyperelliptic curve cryptography, faster scalar multiplication can be realized by executing computing operations including halving as computing processing. For example, fast computation is realized by executing computing operations including halving in scalar multiplication with respect to a divisor D on a hyperelliptic curve of genus 2 in characteristic 2 having $h(x)=x^2+x+h_0$, $f_4=0$ as parameters, a hyperelliptic curve of genus 2 in characteristic 2 having $h(x)=x^2+h_1x+h_0$, $f_4=0$ as parameters, or a hyperelliptic curve of genus 2 in characteristic 2 having $h(x)=x$ as a parameter. The present invention can be thus applied to apparatuses, devices, and the like required to perform fast and secure cryptographic computations, such as an IC card.

According to the configuration of the present invention, a further reduction in the complexity of scalar multiplication of a divisor and hence faster computation can be achieved through the application of a table that records which of $k_1$, $k_1'$, ($k_0$, $k_0'$) is correct on the basis of a computed value of $[\frac{1}{2}^iD]$ with respect to a divisor D fixed in advance. The present invention can be thus applied to apparatuses, devices, and the like required to perform fast and secure cryptographic computations, such as an IC card.

According to the configuration of the present invention, in scalar multiplication with respect to a divisor D in hyperelliptic curve cryptography, computing operations including halving are executed as computing processing, and an algorithm for reducing the number of inversion operations executed in the halving computation processing is applied, thereby making it possible to achieve a further reduction in the complexity of scalar multiplication of a divisor and hence faster computation.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method of operating a cryptographic system including instructions, the method comprising:
 (a) causing a base point generator to generate a divisor of a hyperelliptic curve of genus 2 in characteristic 2, the hyperelliptic curve being defined by $y^2+h(x)y=f(x)$, the divisor being equal to a formal sum of points, wherein: (a) y is a first point on the hyperelliptic curve; (b) x is a second point on the hyperelliptic curve; (c) h(x) is a first polynomial; and (d) f(x) is a second polynomial;
 (b) causing a processor to execute the instructions to cause the processor to perform halving on the generated divisor of the hyperelliptic curve of genus 2 in characteristic 2; and
 (c) causing the processor to execute the instructions to cause the processor to perform scalar multiplication using the halved divisor of the hyperelliptic curve of genus 2 in characteristic 2.

2. The method of claim 1, wherein the first polynomial includes a random integer.

3. The method of claim 1, wherein the $h(x)=x^2+x+h_0$.

4. The method of claim 1, wherein the $h(x)=x^2+h_1x+h_0$.

5. The method of claim 1, wherein the $h(x)=x$.

6. The method of claim 1, which includes causing the processor to execute the instructions to cause the processor to reduce the complexity of the halving by determining processing based on a lookup of a table that records which of $k_1$, $k_1'$, ($k_0$, $k_0'$) is correct based on a computed value of $[\frac{1}{2}^iD]$ with respect to a divisor D fixed in advance.

7. The method of claim 1, which includes causing the processor to execute the instructions to cause the processor to calculate a value of an inverse $1/k_1$ by multiplication and addition processing without performing an inversion, by application of the following relational expression:

$$1/k_1 = h_2 + k_1 u_{21},$$

which is derived from a halving computation algorithm in which
Input: $D_2=(U_2, V_2)$, and
Output: $D_1=(U_1, V_1)=[\frac{1}{2}]D_2$,
where $U_i(x)=x^2+u_{i1}x+u_{i0}$, $V_i(x)=v_{i1}x+v_{i0}$, $\gcd(h, U_i)=1$, $i=1, 2$.

8. The method of claim 1, which includes causing the processor to execute the instructions to cause the processor to execute a computation according to an algorithm having a setting for not applying $1/u_{21}$ as an input value, in a halving computation algorithm in which
Input: $D_2=(U_2, V_2)$; and
Output: $D_1=(U_1, V_1)=[\frac{1}{2}]D_2$,
where $U_i(x)=x^2+u_{i1}x+u_{i0}$, $V_i(x)=v_{i1}x+v_{i0}$, $\gcd(h, U_i)=1$, $i=1, 2$.

9. The method of claim 1, which includes causing the processor to execute the instructions to cause the processor to:
 (a) set, as an input value, $1/h_1^2$ that is a previously calculated value; and
 (b) apply the previously calculated input value $1/h_1^2$ without executing processing of calculating an inverse $1/h_1^2$, wherein the $h(x)=x^2+h_1x+h_0$.

10. A cryptographic system comprising:
a processor;
a base point generator operatively connected to the processor, the base point generator which generates a divisor of a hyperelliptic curve of genus 2 in characteristic 2, the hyperelliptic curve being defined by $y^2+h(x)y=f(x)$, the divisor being equal to a formal sum of points, wherein: (a) y is a first point on the hyperelliptic curve; (b) x is a second point on the hyperelliptic curve; (c) h(x) is a first polynomial; and (d) f(x) is a second polynomial; and
a memory device operatively coupled to the processor, the memory device storing instructions which when executed by the processor, cause the processor, in cooperation with the memory device to:
(a) perform halving on the generated divisor of the hyperelliptic curve of genus 2 in characteristic 2; and
(b) perform scalar multiplication using the halved divisor of the hyperelliptic curve of genus 2 in characteristic 2.

11. The cryptographic system of claim 10, wherein the first polynomial includes a random integer.

12. The cryptographic system of claim 10, wherein the $h(x)=x^2+x+h_0$.

13. The cryptographic system of claim 10, wherein the $h(x)=x^2+h_1x+h_0$.

14. The cryptographic system of claim 10, wherein the $h(x)=x$.

15. The cryptographic system of claim 10, wherein the instructions, when executed by the processor, cause the processor to reduce the complexity of the halving by determining processing based on a lookup of a table recording which of $k_1$, $k_1'$, ($k_0$, $k_0'$) is correct based on a computed value of $[½^i D]$ with respect to a divisor D fixed in advance.

16. The cryptographic system of claim 10, wherein the instructions, when executed by the processor, cause the processor to calculate a value of an inverse $1/k_1$ by multiplication and addition processing without performing an inversion, by application of the following relational expression:

$$1/k_1 = h_2 + k_1 u_{21},$$

which is derived from a halving computation algorithm in which
Input: $D_2=(U_2, V_2)$, and
Output: $D_1=(U_1, V_1)=[½]D_2$,
where $U_i(x)=x^2+u_{i1}x+u_{i0}$, $V_i(x)=v_{i1}x+v_{i0}$, $\gcd(h, U_i)=1$, $i=1, 2$.

17. The cryptographic system of claim 10, wherein the instructions, when executed by the processor, cause the processor to execute:
(a) a halving computation algorithm in which
Input: $D_2=(U_2, V_2)$, and
Output: $D_1=(U_1, V_1)=[½]D_2$,
where $U_i(x)=x^2+u_{i1}x+u_{i0}$, $V_i(x)=v_{i1}x+v_{i0}$, $\gcd(h, U_1)=1$, $i=1, 2$; and
(b) computation according to an algorithm having a setting for not applying $1/u_{21}$ as an input value.

18. The cryptographic system of claim 10, wherein:
(a) $h(x)=x^2+h_1x+h_0$; and
(b) the instructions, when executed by the processor, cause the processor to execute computation to which, with $1/h_1^2$ that is a previously calculated value being set as an input value, the previously calculated input value $1/h_1^2$ is applied without executing processing of calculating an inverse $1/h_1^2$.

19. A non-transitory computer-readable medium storing instructions structured to cause a computer to:
(a) generate a divisor of a hyperelliptic curve of genus 2 in characteristic 2, the hyperelliptic curve being defined by $y^2+h(x)y=f(x)$, the divisor being equal to a formal sum of points, wherein: (a) y is a first point on the hyperelliptic curve; (b) x is a second point on the hyperelliptic curve; (c) h(x) is a first polynomial; and (d) f(x) is a second polynomial; and
(b) perform halving on the generated divisor of the hyperelliptic curve of genus 2 in characteristic 2; and
(c) perform scalar multiplication using the halved divisor of the hyperelliptic curve of genus 2 in characteristic 2.

* * * * *